(12) United States Patent
Cragun et al.

(10) Patent No.: US 11,741,559 B1
(45) Date of Patent: Aug. 29, 2023

(54) CUSTOMER RELATIONSHIP MANAGEMENT WITH GEOSPATIAL TOOLS

(71) Applicant: Avenu, LLC, Provo, UT (US)

(72) Inventors: Jason Cragun, Pleasant Grove, UT (US); Lonnie Kyser, Pleasant Grove, UT (US); Dave Zitting, Bountiful, UT (US); Brett Iverson, Woodland Hills, UT (US)

(73) Assignee: Avenu LLC, Salt Lake City, UT (US)

( * ) Notice: Subject to any disclaimer, the term of this patent is extended or adjusted under 35 U.S.C. 154(b) by 1534 days.

(21) Appl. No.: 15/586,018

(22) Filed: May 3, 2017

Related U.S. Application Data

(60) Provisional application No. 62/331,176, filed on May 3, 2016.

(51) Int. Cl.
| | |
|---|---|
| *G06Q 50/16* | (2012.01) |
| *G06Q 30/06* | (2012.01) |
| *G06F 16/29* | (2019.01) |
| *G06F 3/0482* | (2013.01) |
| *G09G 5/377* | (2006.01) |
| *G06F 3/0484* | (2013.01) |

(Continued)

(52) U.S. Cl.
CPC .......... *G06Q 50/16* (2013.01); *G06F 3/04845* (2013.01); *G06F 16/29* (2019.01); *G06Q 30/0613* (2013.01); *G06F 3/0482* (2013.01); *G06F 2203/04806* (2013.01); *G09G 5/377* (2013.01); *G09G 2370/022* (2013.01)

(58) Field of Classification Search
None
See application file for complete search history.

(56) References Cited

U.S. PATENT DOCUMENTS

| | | | | |
|---|---|---|---|---|
| 2008/0109757 | A1* | 5/2008 | Stambaugh | ........... G06F 3/0481 715/835 |
| 2012/0323931 | A1* | 12/2012 | Buchmueller | ...... G06F 16/9537 707/749 |

(Continued)

OTHER PUBLICATIONS

Reverse Address Search, www.archive.org; 3 pages, from Nov. 27, 2015 (Year: 2015).*

(Continued)

*Primary Examiner* — Dennis W Ruhl

(57) ABSTRACT

In accordance with embodiments disclosed herein, there is provided systems, apparatuses, and methods for customer relationship management (CRM) with geospatial tools. A server device receives a request to display a map image via a graphical user interface (GUI). The server device accesses a data store to retrieve property data items corresponding to the map image. The server device generates and assigns, for each of the property data items, a property quadkey. The server device filters, using a first map quadkey of the map image, the property data items to obtain two or more property data items. The server device aggregates the two or more property data items into an aggregate property marker and generates an aggregate quadkey for the aggregate property marker. The server device transmits a response to cause the user device to display, via the GUI, the aggregate property marker overlaid on the map image.

19 Claims, 33 Drawing Sheets

(51) Int. Cl.
*G06Q 30/0601* (2023.01)
*G06F 3/04845* (2022.01)

(56) References Cited

U.S. PATENT DOCUMENTS

| | | | | |
|---|---|---|---|---|
| 2013/0227078 A1* | 8/2013 | Wei | ..................... | H04L 67/2871 |
| | | | | 709/219 |
| 2014/0229336 A1* | 8/2014 | Wormhoudt | ....... | G06Q 30/0627 |
| | | | | 705/26.63 |
| 2015/0364118 A1* | 12/2015 | Dai | ........................ | G06F 3/147 |
| | | | | 345/629 |
| 2016/0217611 A1* | 7/2016 | Pylvaenaeinen | ...... | G06T 3/4038 |

OTHER PUBLICATIONS

QuadTiles, www.archive.org; 13 pages, from Mar. 18, 2014 (Year: 2014).*
Clustering a million points on Virtual Earth using AJAX and .Net, www.archive.org; 9 pages, from Apr. 10, 2013 (Year: 2013).*
Stacking Chips-Showing many points that share the same location, 12 pages, carto.com; Jan. 12, 2016 (Year: 2016).*

\* cited by examiner

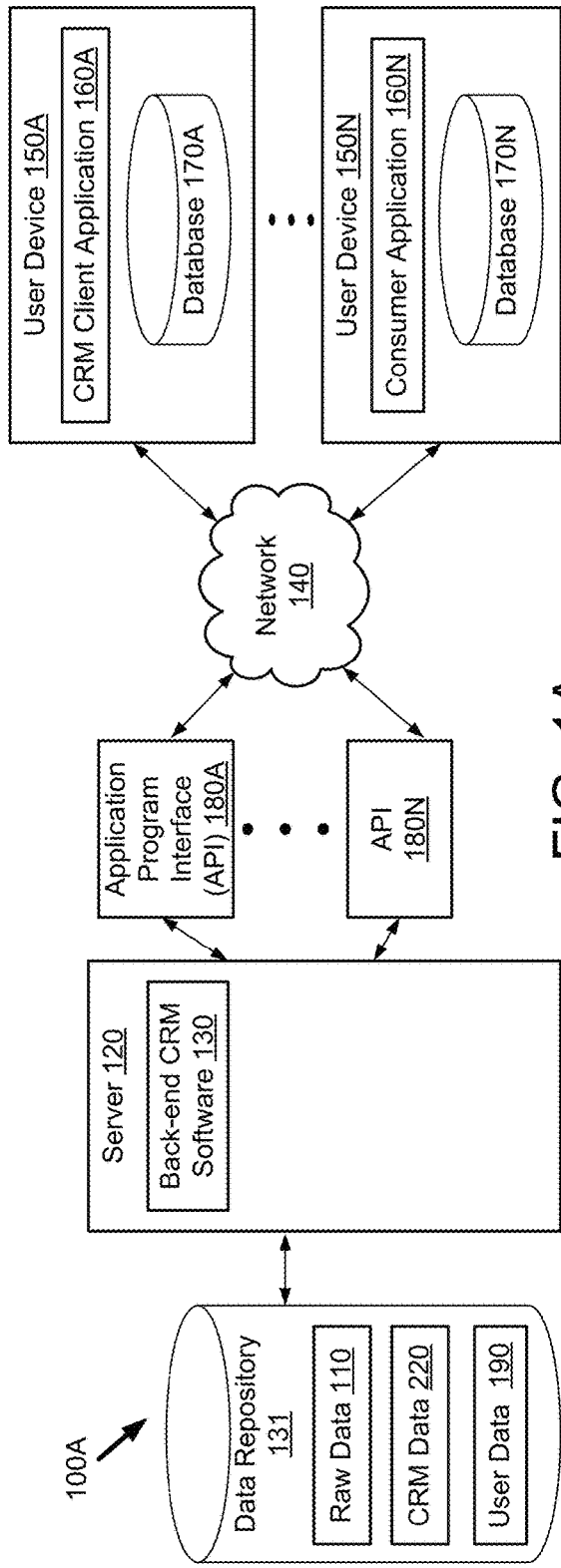
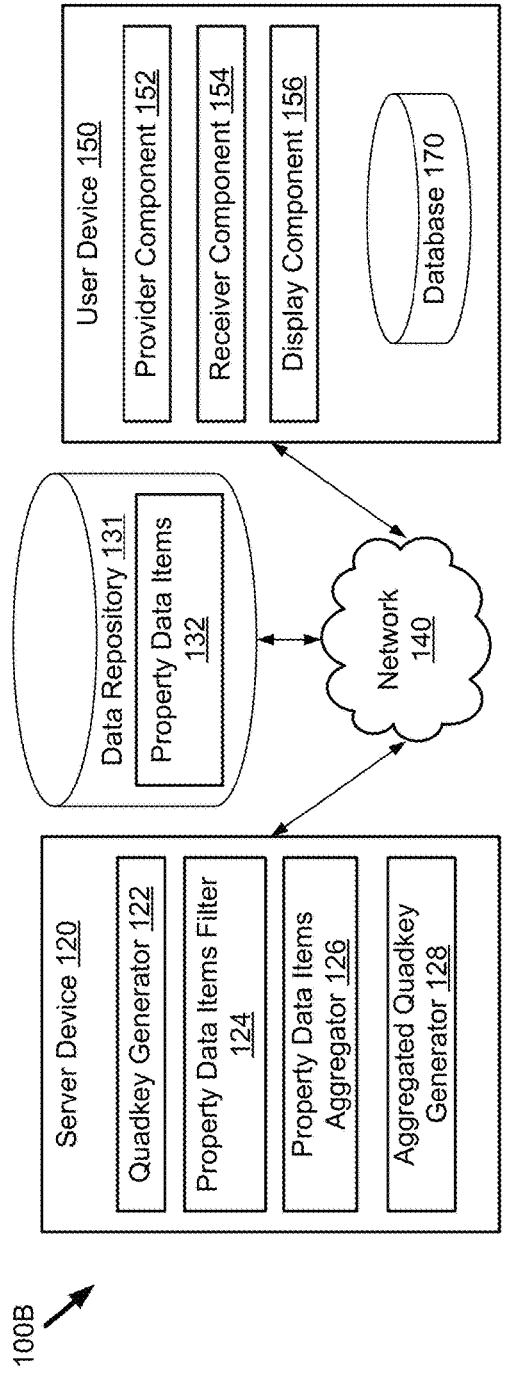
FIG. 1A
FIG. 1B

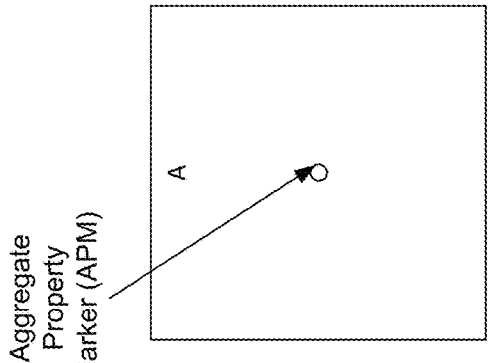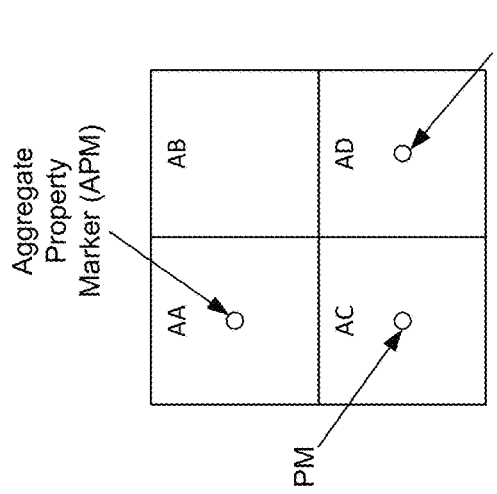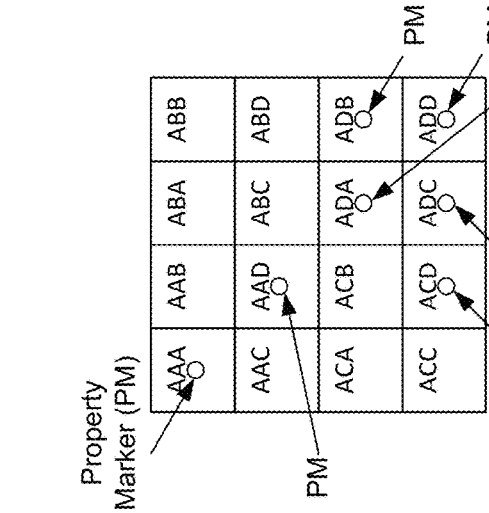

Campaigns

Buyer Finder campaign

Find the people most likely to buy your client's home! Using a number of variables like age, income, current home size, and family size, a list of likely buyers is created for your listing and helps you create a targeted mail campaign.

○ NEW CALL CAMPAIGN

Seller Finder campaign

The next listing is always just around the corner! Choose a home profile and a list of ideal potential home sellers are created and scored. Use that list of potential sellers to create a targeted call campaign or a customized mail campaign.

○ NEW CALL CAMPAIGN

Mail campaign

Marketing made simple! Customize your own premium materials with design templates and automated mail fulfillment. Choose from a collection of quality mail collateral including flyers, newsletters, holiday greetings and birthday cards.

○ CREATE NEW

CUSTOMER RELATIONSHIP MANAGEMENT WITH GEOSPATIAL TOOLS

PRIORITY CLAIM

This application is claims benefit to U.S. Provisional Patent Application No. 62/331,176 filed May 3, 2016, the entire content is hereby incorporated by reference.

BACKGROUND

There are approximately 2 million licensed real estate agents in the United States, of which 1.1 million belong to the National Association of REALTORS® (NAR), and 600,000 mortgage loan originators (MLOs, commonly referred to as loan officers). About 58% percent of REALTORS® are licensed as sales agents, and 80% of NAR members specialize in residential brokerage. There are approximately 115 million occupied housing units in the United States. The typical home owner has lived in their current home for 14 years. In 2013, 65.2% of families owned their primary residence. There were 4,940,000 existing homes sold in 2014 and 437,000 were new construction. Among buyers who financed their home purchase, 88% of buyers purchased their home through a real estate agent. The real estate industry makes up roughly 24% of the US gross domestic product (ancillary products and services considered).

Home buyers used the following information sources in home search: real estate agent: 89%; yard sign: 51%; mobile application: 45%; open house: 45%; mobile or tablet search engine: 42%; print newspaper advertisement: 23%. About 53% of home buyers undertook a home improvement project within three months of buying, typically spending $4,550 in improvement projects.

Conventional tools remove the agent from the selling process, thus devaluing the agent. The data displayed can be inaccurate and may not have integration to data from various multiple listing services (MLSs) nationwide. Conventional tools compete with agents for business and offer limited features. A potential buyer often knows more about the home than the showing agent, thus the agent loses trust and credibility and the agent's value is called into question, which makes for an awkward and ineffective sales process. Agents are slowly being pushed out of the market as buyers become more and more intelligent and sophisticated. Buyers often spend hours doing their own research online with data sources that often provide inaccurate data and false home values. Conventional tools also provide leads that are overpriced, stale, sold to many parties, and not scrubbed for data accuracy or quality.

Big data and the visualization of geospatial data are emerging technologies, which are not utilized by conventional tools. Conventional tools also do not use geospatial CRM technologies.

There is a need for a system that provides real estate agents and MLOs with information and tools to build leads and market ancillary products, for all segments and verticals within the real estate and real estate finance industry. There is also a need for a system to provide home buyers with information and tools for their home search that does not compete with the information and tools provided to the real estate agents and MLOs.

BRIEF DESCRIPTION OF THE DRAWINGS

The present disclosure is illustrated by way of example, and not by way of limitation, in the figures of the accompanying drawings.

FIG. 1A is a network diagram including a server device coupled to a user device via a network, in accordance with one embodiment.

FIG. 1B is a network diagram including a server device coupled to a user device via a network, in accordance with another embodiment.

FIGS. 1C-1E illustrate quadkeys and aggregate quadkeys, in accordance with certain embodiments.

FIGS. 1F-1H illustrate property markers and aggregate property markers, in accordance with certain embodiments.

FIG. 8A is a screenshot of a GUI for initiating a buyer finder campaign, a seller finder campaign, or a mail campaign, and displaying past campaigns, in accordance with one embodiment.

FIG. 8C is a screenshot of a view of the GUI for viewing potential buyers in the buyer finder campaign, in accordance with one embodiment.

FIG. 10D is a screenshot of a view of the GUI for viewing seller scores in the seller finder campaign, in accordance with another embodiment.

FIG. 12B is a screenshot of a view of the GUI for editing the template for a mail campaign, in accordance with one embodiment.

FIG. 12D is a screenshot of a view of the GUI for sending the mail campaign to a campaign, in accordance with one embodiment.

FIG. 12E is a screenshot of a GUI for sending the mail campaign to a specific client type, in accordance with one embodiment.

DESCRIPTION OF EMBODIMENTS

Figure 2:
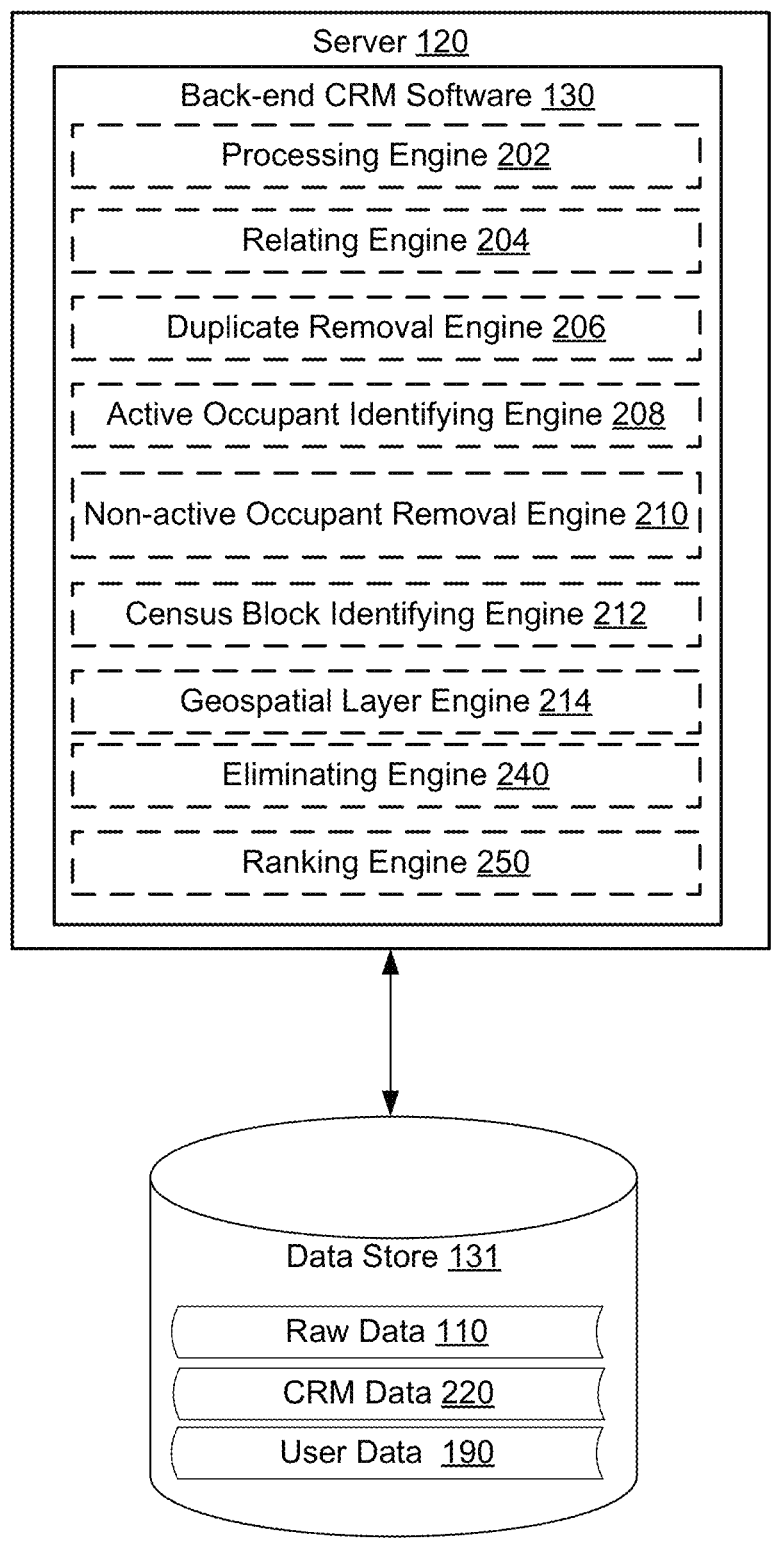
FIG. 2 is a block diagram illustrating the server including back-end customer relationship management (CRM) software, in accordance with one embodiment.

The embodiments described herein are directed to customer relationship management software with geospatial tools. There is a trend or movement in the market to remove the agent from the selling process, by using tools that often display inaccurate data, and may not have integration to multiple MLSs. Also, as described above, conventional tools do not handle raw data such as big data, or the visualization of big data. Big data is data from disparate data sets that may not necessarily correlate. Big data is extremely large data sets that may be analyzed computationally to reveal patterns, trends, and associations, especially relating to human behavior and interactions. The embodiments described herein provide real estate agents and MLOs with information and tools to build leads and market ancillary products, for all segments and verticals within the real estate and real estate finance industry. The embodiments described herein enrich data for agents and MLOs and provide tools for enriching their services to clients in home selling and home searching that does not compete with the information and tools traditionally known as MLS.

FIG. 1A is a network diagram 100A including a server 120 coupled to a user device 150A, 150N (hereinafter user device 150) via a network 140, in accordance with one embodiment. The server 120 may include one or more of servers, a collection of devices, staging servers, a geoserver, and so forth. The server 120 may include back-end CRM software 130. The server 120 may store raw data 110 (e.g., big data) in a data repository 131 (e.g., database repository, data store). Data repository 131 may be implemented on one or more machines, such as server computers, desktop computers, or any other computing device. An example of the data repository 131 is a persistent storage that is capable of storing data that is collected from various data sources including local and remote computing devices such as desktop computers, laptop computers, handheld computers, server computers, gateway computers, mobile communications devices, cell phones, smart phones, or similar computing device. In some embodiments, data repository 131 might be a network-attached file server, while in other embodiments administration data repository 131 might be some other type of persistent storage such as an object-oriented database, a relational database, and so forth. The data repository 131 may be part of the back-end CRM software 130 or coupled to the server 120 executing the back-end CRM software 130 directly or via a network. In an example, the data repository 131 can be a relational database management system (RDBMS) used for the storage of information used for the CRM data described herein, as well as raw data 110.

Raw data 110 may include extremely large data sets that may be analyzed computationally to reveal patterns, trends, and associations, especially relating to human behavior and interactions. Raw data 110 may include structure data, unstructured data, or both. As described herein, the raw data 110 can be processed to provide accurate and timely data to the users of the software. The raw data 110 can be analyzed and constrained by the software, as described herein, to provide insights that lead to better decisions and strategic business moves in the real estate context. Raw data 110 may include data available in a marketplace, including but not limited to lifestyle data, consumer data, trend data, miscellaneous demographic data, and so forth. The raw data may include occupant data, household data, mortgage data, statistical data, etc. The raw data 110 may be utilized for marketing and effective business practices. The raw data 110 may include real estate properties that are for sale (e.g., listed) and real estate properties that are not for sale (e.g., not listed). Real estate properties may include one or more of residential real estate (e.g., multi-unit dwelling (e.g., apartment, condominium, mid-rise, high-rise), semi-detached dwellings (e.g., duplex), single-family detached house, portable dwellings (e.g., mobile homes, houseboats)), commercial real estate (e.g., retail property, office building, restaurant, suite, clinics, lodging), industrial real estate (e.g., distribution facility, manufacturing facility, warehouse facility) development site (e.g., vacant land, existing structure to be demolished), land with natural resources (e.g., farm, ranch, mine, water rights, crops), and so forth. The back-end CRM software 130 may collect the raw data 110 from a variety of sources, including business transactions, public records, private records, social media, as well as other types of digital sources. The raw data 110 may come in a variety of formats—from structured, numeric data in a traditional database to unstructured text documents, email, video, audio, financial transactions, or the like. The back-end CRM software 130 may generate CRM data 220 (see FIG. 2) from the raw data 110 and may store the CRM data 220 in the data repository 131. The user may also use the back-end CRM software 130 to generate new CRM data, as described herein. The back-end CRM software 130 can process the raw data 110 to "clean" the data before analyzing the data for insights, as described herein. Cleaning the data includes processing the raw data 110 to remove unwanted data such as inaccurate data, outdated data, and duplicate data and to relate the data (see FIG. 2). The back-end CRM software 130 can process the data to connect and correlate relationships, hierarchies and multiple data linkages.

The user device 150 may be a personal computer (PC), laptop, mobile phone, tablet computer, or any other computing device. The user device 150 may run an operating system (OS) that manages hardware and software of the user device. An application may run on the user device (e.g., on the OS of each user device) to enable the functionality described herein. In particular, user device 150A executes CRM client application 160A, user device 150N executes consumer application 160N, and so forth (hereinafter application 160). In one embodiment, user device 150A is used by a real estate agent or a MLO and CRM client application 160A is a full version of the application 160. In another embodiment, user device 150N is used by a potential home buyer and consumer application 160N is a limited version of the application 160. The consumer application 160N may provide limited access to data and limited functionality. In other embodiments, these applications can be separate applications with different sets of functionality as described herein. In one embodiment, consumer application 160N provides granular views of properties and aligns potential home buyers with a "best fit" scenario based on buying and selling behaviors and lifestyle of the potential home buyers. In another embodiment, consumer application 160N brands the real estate agent and lender by displaying their photos and contact information throughout the application 160N. A simple touch on the screen of user device 150N may connect the potential home buyer to the real estate agent or lender with a phone call or a message.

The user device 150 may receive CRM data 220 from the server 120 via network 140. Network 140 may be a private network (e.g., a local area network (LAN), a wide area network (WAN), intranet, or other similar private networks) or a public network (e.g., the Internet). It should be noted that server 120 may be one or more machines, such as server computers, desktop computers, or any other computing device, and may include one or more data repositories in which the input data can be stored, as well as the processed data by the back-end CRM software 130. Application 160 may perform geofencing using location of the user device 150 and may display the results on the graphical user interface (GUI) of the user device 150. Geo-fencing is defining a geographic boundary around an area where to perform one or more functions such as property searches, big data viewing, and marketing.

The user device 150 may include a database 170A, database 170N, and so forth (hereinafter database 170). Database 170 may be implemented on one or more machines, such as server computers, desktop computers, smart phones, tablets, or any other computing device. An example of the database 170 is a persistent storage that is capable of storing data that is collected from various data sources including local and remote computing devices such as desktop computers, laptop computers, handheld computers, server computers, gateway computers, mobile communications devices, cell phones, smart phones, or similar computing device. In some embodiments, database 170 might be a network-attached file server, while in other embodiments administration database 170 might be some other type of persistent storage such as an object-oriented database, a relational database, and so forth. The database 170 may be part of the application 160 or coupled to the user device 150 executing the application 160 directly or via a network. In an example, the database 170 can be a relational database management system (RDBMS) used for the storage of information used for the CRM data 220, user selected data 230, ranked data 260, user constraints 410, viewable constraints 430, GUI elements 450, campaign 480, and so forth. As described herein, the CRM data 220 or ranked data 260 can be processed to provide accurate and timely data to the users of the software. The CRM data 220 or ranked data 260 can be analyzed and constrained by the software, as described herein, to provide insights that lead to better decisions and strategic business moves in the real estate context.

General enhancements are made to the application 160 to adapt to the size of the GUI (e.g., a smartphone GUI, a tablet GUI, and so forth) for mapping, route planning, pre-built layers, and an upgraded interface for finding potential buyers or potential sellers. In one embodiment, the application 160 allows users using different types of operating systems, devices, display sizes, and display resolutions to have the same experience. In another embodiment, the application 160 may display a first graphical user interface (GUI) when used by a smaller display and a second GUI when used by a larger display. The first GUI may display less information and the second GUI may display more information. For example, when application 160 is used on a tablet (e.g., a device with a larger display), more information may be shown on the GUI than when the application is used on a smartphone (e.g., a device with a smaller display).

Application 160 may access the CRM data 220 and perform one or more updates to the CRM data 220 to generate user data 190 (e.g., user selected data 230, list selection 474, campaign 480, and CRM data 220 in view of one or more of viewable constraints 430, user constraints 410, GUI elements 450, subselection 462, or the like, as described herein). Application 160 may transmit the user data 190 via network 140 to application program interface (API) 180A, 180N (hereinafter API 180; e.g., CRM client application 160A transmits to API 180A, consumer application 160N transmits to API 180N, and so forth). Server 120 may access the user data 190 via the API 180 and store the user data 190 in data repository 131. When a user updates the CRM data displayed in application 160, the updates may be stored in data repository 131 as user data 190. In one embodiment, updates from different users may be partitioned in user data 190 so that the updates in user data 190 may be accessible only by the user that made the updates. In another embodiment, users updates from different users may be accessible by one or more other users (e.g., all users of CRM client application 160A, all users of application 160, all users from the same brokerage or group, and so forth).

In one embodiment, user device 150 can communicate with server 120 via API 180. In another embodiment, server 120 can communicate with user device 150 via API 180. API 180 can include, for instance, defined function calls or calls to other routines, calculations, or features, as well as data structures and parameters associated with modeling operations. API 180 can include functions, routines, resources, and features can be called, invoked, or instantiated via API 180. Additional details of the back-end CRM software 130 is described below with respect to FIG. 2.

FIG. 2 is a block diagram illustrating server 120 including the back-end CRM software 130, in accordance with one embodiment. In one embodiment, the back-end CRM software 130 receives raw data 110 from data repository 131 and generates CRM data 220 to transmit to the user device 150 via the network 140. In another embodiment, the back-end CRM software 130 receives user selected data 230 from the user device 150 via network 140 and generates ranked data 260 to transmit to the user device 150 via network 140.

The back-end CRM software 130 may include one or more of processing engine 202, relating engine 204, duplicate removal engine 206, active occupant identifying engine 208, non-active occupant removal engine 210, census block identifying engine 212, geospatial layer engine 214, eliminating engine 240, and ranking engine 250.

In one embodiment, a premise of generating CRM data 220 and ranked data 260 is that people want to live near people who are like them (e.g., income, age and number of children, type of employment, demographic, and so forth). In another embodiment, people want enough space to live in (e.g., at least one bedroom per person in the household). In another embodiment, people like to upgrade their home every set number of years (e.g., five years, ten years, and so forth) and like nice neighborhoods (e.g., home value, average income in the neighborhood, parks, schools, shopping, distance to work, and so forth). Instead of finding all people that may want to buy the house, CRM data 220 and ranked data 260 includes people most likely to buy the house. A numeric score may be assigned to each potential buyer and then the score may be placed on a curved scale of 1 to 100, 100 being the highest potential match. In one embodiment, only the top 50% of potential buyers in the potential buyer pool will be evaluated. Home buyers may be categorized based on age for certain buyer tendencies (e.g., under 33, 34-38, 39-48, 49-58, 59-67, over 68 and so forth). Sellers may be categorized as "first time seller" or not. Buyers may be categorized as "first time owner" or not. The back-end CRM software 130 may receive raw data 110 and store raw data 110 in data repository 131. In one embodiment, the raw data 110 includes raw data files and server 120 includes staging servers. In another embodiment, the raw data 110 is big data from one geographical region (e.g., a state). In another embodiment, each piece of data of the raw data 110 corresponds to at least one of a corresponding physical address, a corresponding person, or a corresponding family.

The processing engine 202 may access the raw data 110 in data repository 131. Processing engine 202 inspects the raw data 110 line by line and appends additional information as needed. In one embodiment, processing engine 202 corrects addresses and standardizes the addresses. In another embodiment, processing engine 202 identifies each corresponding physical address by a corresponding geocode location, where each corresponding geocode location includes a corresponding latitude measurement and a corresponding longitude measurement. The processing engine 202 may generate a database from the raw data. The database may index the raw data by an identifier of each real estate properties (e.g., address, geolocation, latitude and longitude, census number, etc.). The database may include properties of each real estate property (e.g., size of house, age of house, garage included, etc.).

In another embodiment, processing engine 202 creates and assigns quadkeys (e.g., quadcodes, quadtiles, and so forth) to each real estate property in the raw data 110. Quadkeys are a geo-data storage and indexing strategy referred to as hierarchical binning. A geo-database is stored so that data for a specific location can be retrieved quickly, by dividing the data up by location and partitioning the world into tiles.

A first set of quadkeys is created for a map. For example, a flattened map of Earth may be divided into quadkeys. Earth has a circumference of about 40,000 km, so a flattened map of Earth would be about 40,000 km×40,000 km. At zoom level 1 (2 bits), the flattened map of Earth is divided into four tiles (e.g., top-left, top-right, bottom-left, bottom-right) and each tile is about 20,000 km×20,000 km. At zoom level 2 (4 bits), each tile from zoom level 1 is divided into four tiles, so that there are 16 tiles, each 10,000 km×10,000 km. At zoom level 3, each tile from zoom level 2 is divided into four tiles, so that there are 64 tiles, each 5,000 km×5,000 km. At zoom level 23, there are 70,368,744,177,664 tiles, each 4.77 m×4.77 m. The quadkey for each tile has as many digits as the corresponding zoom level. For example, at zoom level 1, the top-left tile has quadkey A, top-right tile has quadkey B, bottom-left tile has quadkey C, and bottom-right tile has quadkey D. At zoom level 2, quadkey A is split into four tiles: AA, AB, AC, and AD. At zoom level 3, quadkey AA is split into four tiles: AAA, AAB, AAC, and AAD. At zoom level 23, each quadkey would have 23 digits. An image can be stored for each quadkey (e.g., quadkey A, quadkey AA, quadkey AAA, and so forth), so that the image can be quickly retrieved and displayed depending on the zoom level. Each quadkey of the first set of quadkeys may have a corresponding location measurement (e.g., latitude and longitude, and so forth). At zoom level 23, each real estate property may have a separate quadkey (e.g., a high level of detail). In one embodiment, the back-end CRM software 130 retrieves the corresponding tiles for the map based on the request from a client device as described herein. For example, the back-end CRM software 130 can receive a request for a geographic area, designated either by quadkeys, titles, latitude-longitude coordinates, or the like. The back-end CRM software 130 can obtain the corresponding map tiles from a mapping application, such as a third-party mapping application. The back-end CRM software 130 can send the corresponding map tiles to the client device to display. In addition to the map tiles, the back-end CRM software 130 can enrich the map data with overlay data as described herein, such as data regarding each individual real estate property. However, given some areas of high density of properties, the back-end CRM software 130 may determine which properties to display, as well as aggregate properties given the limited number of pixels available to display the properties as described herein. Alternatively, the back-end CRM software 130 can generate its own map data, but the back-end CRM software 130 and data repository 131 can use fewer resources when using a third-party mapping application.

In order to aggregate data for the overlays, processing engine 202 may create a second set of quadkeys for each real estate property. Processing engine 202 may assign a quadkey of the second set of quadkeys to each real estate property in the raw data 110 (e.g., record identifier that matches a quadkey of the first set of quadkeys). The processing engine 202 may assign a quadkey by matching a location measurement (e.g., latitude and longitude) of a real estate property to a location measurement of a quadkey of the second set of quadkeys. For example, a first real estate property may have a location measurement that matches the location measurement of quadkey AAAAB at zoom level 5 and a second real estate property may have a location measurement that matches the location measurement of quadkey AAAAC at zoom level 5. When the display is at any of zoom level 5-23, first real estate property and the second real estate property have separate quadkeys. When the display is at any of zoom levels 1-4, the first real estate property and the second real estate property have the same quadkey (e.g., both located at A, AA, AAA, or AAAA). In one embodiment, the corresponding of latitude and longitude measurements may correspond to the centroid of the quadkey. Each tile may have an x-value, a y-value, and a z-value. The x-value and y-value may correspond to the tile number and the z-value may correspond to the zoom level.

Processing engine 202 may overlay the second set of quadkeys on the first set of quadkeys. As the application 160 zooms to different zoom levels, real estate properties will be grouped by quadkeys (e.g., real estate properties at AAAAB and AAAAC will be grouped into the same quadkey AAAA at zoom level 4, but will be displayed separately at zoom level 5). The quadkeys assigned to the individual real estate properties (e.g., each entry in the database) allow the back-end CRM software 130 to serve overlay data in a very quick manner (i.e., in real-time or near real-time), such as at similar speeds that the map data is retrieved and displayed on the client device. The application 160 may retrieve and display the first quantity of quadkeys (map data) and second quantity of quadkeys (real estate data) concurrently. In one embodiment, it takes less than 200 milliseconds per tile to retrieve the second quantity of quadkeys and overlay the second quantity of quadkeys on the first quantity of quadkeys. In another embodiment, it takes less than 100 milliseconds per tile to retrieve the second quantity of quadkeys and overlay the second quantity of quadkeys on the first quantity of quadkeys. The quadkeys assigned to the individual real estate properties also allow the aggregation of data points based on the pixels available for the particular display so that the overlay data can be displayed quickly and in a manner that is appropriate for the display, especially when viewing the data in a densely-populated area on a screen of a mobile device.

In another embodiment, processing engine 202 normalizes the raw data 110 into categories by the corresponding physical address, by the corresponding person, and the corresponding family. Each quadkey corresponding to a real estate property may be assigned to one or more categories. For example, a quadkey corresponding to a specific real estate property may be assigned to a under 33 category, a 4000-5000 square feet (sq ft, ft$^2$) category, and so forth. Each category may be bit mask overlaid on the quadkeys. To display a real estate property on the map, the corresponding quadkey must match all of the categories (all bit masks must be true) selected by the user (e.g., user constraints 410).

In another implementation, the processing engine 202 obtains a corresponding latitude and a corresponding longitude of each of the real estate properties from the raw data. The processing engine 202 converts the corresponding latitude and the corresponding longitude for each real estate property into a 24 digit quadkey. At the resolution of a 24 digit quadkey, an image (e.g., a rooftop) of each real estate property may be viewable. A 24 digit level may be a resolution identifier. The amount of digits in the quadkeys is scaled to allow the user to experience a corresponding view of the map image and property markers as the server device 120 receives requests of different zoom levels (e.g., as the user zooms in and out on a map). As the map zooms out, the number of digits in the quadkeys for the selected homes goes down and the property markers on the map become closer together or become aggregated markers. As the map zooms back in, the number of digits in the quadkeys is increased to eventually allow the individual property markers to be displayed on individual real estate properties The relating engine 204 may access the raw data 110 in data repository 131. The relating engine 204 relates each piece of data of the raw data 110 to the corresponding physical address. In one embodiment, relating engine 204 loads the raw data 110 into relational database for continued data preparation.

The duplicate removal engine 206 may access the raw data 110 in data repository 131. The duplicate removal engine 206 removes duplicate pieces of data (e.g., dedupes records in the raw data 110.)

The server device 120 may receive an active occupant request (e.g., from the user device 150 after receiving user input of an active occupant request, from the user device 150 after any request). The active occupant identifying engine 208 may access the raw data 110 in data repository 131. The active occupant identifying engine 208 identifies one or more active occupants of each corresponding physical address in view of recent file activity. In one embodiment, the active occupant identifying engine 208 accesses raw data 110 including buyer records (e.g., mail correspondence, mortgage transaction, etc.) and property records (e.g., deed records, title records, etc.). The raw data 110 may include multiple records of past and present occupants and tenants. The active occupant identifying engine 208 may match the buyer records with the property records to perform a first data scrub. The active occupant identifying engine 208 may compare dates of key events for the occupants and make a determination of who is the active occupant based on the most recent key event for each of the real estate properties.

The non-active occupant removal engine 210 may access the raw data 110 in data repository 131. The non-active occupant removal engine 210 removes non-active occupants. In one embodiment, non-active occupant removal engine 210 removes all occupants that were not identified by the active occupant identifying engine 208 as the active occupants.

The census block identifying engine 212 may access the raw data 110 in data repository 131. The census block identifying engine may access census block records (e.g., census block identifiers). The census block identifying engine 212 assigns a census block identifier to each corresponding physical address.

The geospatial layer engine 214 may access the raw data 110 in data repository 131. The geospatial layer engine 214 creates and compiles geospatial layers. In one embodiment, the geospatial layers are highly optimized indexed data summarizing specific data attributes corresponding to the zoom levels of quadkeys (e.g., geospatial quadkeys, the quadkeys described in conjunction with processing engine 202, and so forth). In another embodiment, geospatial data includes raw data 110 implemented as an overlay on a global positioning system (GPS) sources mapping system. Geospatial data may allow intelligent marketing, sales, and business management within a geographic area. In another embodiment, the raw data 110 may be imported into a geoserver (e.g., server 120 may include multiple servers including the geoserver) to create final indexes.

The raw data 110 is processed by one or more of processing engine 202, relating engine 204, duplicate removal engine 206, active occupant identifying engine 208, non-active occupant removal engine 210, census block identifying engine 212, and geospatial layer engine 214 to generate CRM data 220. In one embodiment, the CRM data 220 is partition swapped into production.

The CRM data 220 may be integration of MLS and raw data 110 and may be provided by 24-hour automation to provide information that is current and accurate. Agents must be more knowledgeable and be better equipped than high tech buyers and sellers. At an average age of 56, many agents have less information than the 87 million high tech millennials—today's largest buying segment. The only way to gain an advantage over these millennials is to use raw data 110 effectively. This data is impossible to manage personally, so professionals need automated and intelligent back-end CRM software 130 to mine the data effectively.

The back-end CRM software 130 empowers agents with the most accurate and current market information by effectively mining raw data 110, which helps agents regain trust, solidify their credibility and win back their role as a needed service provider in the real estate market.

Back-end CRM software 130 may receive user selected data 230 from the user device 150 via network 140. The back-end CRM software 130 may process the user selected data 230 by one or more of eliminating engine 240 or ranking engine 250 to generate ranked data 260 to transmit to user device 150 via network 140. The back-end CRM software 130 may store the user selected data 230 in data repository 131. Back-end CRM software 130 may first determine if a buyer is a first-home buyer, is upgrading, or is downgrading. Elimination engine 240 and ranking engine 250 may have different parameters for first-time, upgrade, or downgrade. For example, if upgrading, the buyer may be willing to move within 12 miles. If downgrading, the buyer may be willing to move within 25 miles.

Eliminating engine 240 may access the user selected data 230 in data repository 131. Eliminating engine 240 may one or more of eliminate potential buyers that live within a minimum distance of the address, eliminate potential buyers who moved to a corresponding real estate property less than a threshold period of time, eliminate potential buyers who do not meet other standards of an average potential buyer, eliminate potential sellers that are renting, or eliminate potential sellers who moved to a corresponding real estate property less than a threshold period of time. Elimination engine 240 may eliminate certain potential buyers. In one embodiment, if seller home is not a first home owned by the seller, then buyers cannot be renters. In another embodiment, if the seller home is "first home," then buyers must be renters. In another embodiment, if buyer is less than 49 years old, then the buyer must currently live within 12 miles of the potential home. In another embodiment, if buyer is greater than or equal to 49, then the buyer must currently live within 25 miles of the potential home. In another embodiment, buyer and seller neighborhood demographics must be within 10% variance with where the buyer or seller currently lives. In another embodiment, buyer must be married (e.g., 85% of home buyers are married). In another embodiment, if buyer is less than 49 years old, then seller bedrooms must be greater than or equal to bedrooms needed for the buyer (e.g., one bedroom per member of the household. Elimination engine 240 may eliminate certain potential sellers in a similar manner.

Ranking engine 250 may access the user selected data 230 in data repository 131. Ranking engine 250 may one or more of increase the rank when the real estate property is larger than the current real estate property of the potential buyer, increase the rank when the real estate property is at least 1000 ft$^2$ larger than the current real estate property of the potential buyer, increase the rank in view of sufficient rooms for each member of a potential buyer family, increase the rank in view of similarity of family makeup of the potential buyer to family makeup of the residents of real estate properties in the region of the real estate property, increase the rank in view of similarity of the potential seller to residents of real estate properties in the region of the real estate property, increase the rank when the real estate property is larger than the current real estate property of the potential seller, increase the rank when the real estate property is at least 1000 ft$^2$ larger than the current real estate property of the potential seller, increase the rank in view of sufficient rooms for each member of a potential seller family, or increase the rank in view of similarity of family makeup of the potential seller to family makeup of the residents of real estate properties in the region of the real estate property. In another embodiment, the back-end CRM software 130 performs ranking in view of data derived from the National Association of Realtor (NAR) data (e.g., average income of potential buyers, average buyers distance from the listing real estate property, most common prices ranges for real estate properties, and so forth) calculations based on real statistics of real estate transactions, and demographic data. In another embodiment, the back-end CRM software 130 eliminates potential buyers based on the NAR data that may not qualify to buy the real estate property.

Ranking engine 250 may score the remaining potential buyers and then place the scores on a curve for predictability. In one embodiment, if the buyer home does not have enough bedrooms in the current home (e.g., if number of people in household minus one is less than the bedroom count), then the score may increase (e.g., by 200 points). In another embodiment, if the seller bedroom equals the buyer bedroom needs (e.g., perfect match bonus), the score may increase (e.g., by 100 points). In another embodiment, if the seller bedroom count exceeds bedroom needs (e.g., bonus and penalty for extra rooms needed), the score may be increased by for being larger (e.g., by 100 points) and decreased for each bedroom greater than needed (e.g., by 10 points per bedroom exceeded). In another embodiment, if buyer income can afford the house and the buyer income is similar to income of the neighbors, the score may increase (e.g., by 60 points minus 5 points per 10% income variance). In another embodiment, if buyer has expendable income (e.g., has outgrown the house), the score may increase (e.g., by 50 plus 10 points per expendable rank to a maximum of 100 points). In another embodiment, if buyer is in the first home of the buyer, the score may increase (e.g., by 50 points minus 5 points per year under 11 years or plus 5 points per year after 11 years.) In another embodiment, if the buyer is greater than 49 years old, the score may increase (e.g., by 50 points minus 5 points per year under 15 years or plus 5 points per year after 15 years.) In another embodiment, the score may increase if the buyer is generation x (e.g., born from early 1960s to early 1980s; increase score by 30 points). In another embodiment, the score may increase if the buyer is generation y (e.g., millennials, born from early 1980s to around 2000; increase score by 20 points.) In another embodiment, the score may increase if seller home is the first home and buyer is generation y (e.g., by 50 points). In another embodiment, if buyer is in their first home, the score may increase for 900 ft$^2$ upgrade (e.g., by 50 points minus 10 points per 100 ft$^2$ variance). In another embodiment, if the seller home is detached and single family, the score may increase (e.g., by 50 points). In another embodiment, if seller average age of adults in a half mile radius of the potential home is comparable to the buyer age, the score may increase (e.g., by 50 points minus 5 points per 5 year variance). In another embodiment, if the number of families with children the same age within a half mile radius, the score may increase (e.g., by 10 points per child, to a maximum of 100 points. In another embodiment, if white collar to blue collar ratio within a half mile radius of the buyer and seller is similar, the score may increase (e.g., by 40 points minus 10 points per 10% variance). In another embodiment, potential homes may be ranked by home age (e.g., per 2 year bucket times 8 minus buyer age per decade times 10 minus home age up to a maximum of 70 points; e.g., a 15 year old home and a 50 year old buyer=7.5*8−50−15=−5; a 25 year old home and 30 year old buyer=12.5*10=30=25=75, so maximum of 70 points).

In one embodiment, the scores may be further adjusted in view of neighborhood quality score compared to current home (e.g., subdivision, home size, average income, compared to others in the country), if suburb increases matchability, commute time (average found in Census), distance to shopping, distance to schools, distance to parks, and so forth.

FIG. 1B is a network diagram 100B including a server device 120, data repository 131 (e.g., data store, and a user device 150 coupled via a network 140, in accordance with one embodiment. The server device 120, data repository 131, network 140, and user device 150 may include some or all of the same functionalities as described in relation to FIG. 1A.

The data repository 131 may include property data items 132. Each property data item 132 may correspond to a real estate property. Each property data item 132 may be CRM data for a real estate property. Each property data item 132 may include an address of the corresponding real estate property, one or more active occupants of the corresponding real estate property, attributes of the corresponding real estate property, attributes of the active occupants of the corresponding real estate property, a location (e.g., latitude and longitude, address, etc.) of the corresponding real estate property, etc.

The user device 150 may include a provider component 152, receiver component 154, and display component 156, and a database 170 (e.g., data store).

The provider component 152 of the user device 150 may transmit (e.g., to the server device 120) a request to display a map image via a GUI of the user device 150. The request may include an indication of a zoom level. The request may include visual constraints of the user device (e.g., size of the GUI, pixels, resolution, etc.). The request may include an indication of a geographical area or region (e.g., a geographical region displayed in response to searching for an address, panning to a location on a map, zooming to a location on a map, etc.). The request may include a request for active occupants. The request may include a request for a detail attribute (e.g., of the real estate property, of the occupant of the real estate property, etc.). The request may include an address (e.g., an address of a real estate property of a seller). The request may include a maximum number of results. The request may include tasks including a corresponding deadline and a corresponding address.

The receiver component 154 of the user device 150 may receive a response (e.g., from the server device 120) in response to the request transmitted by the provider component 152. The response may include instructions for the display component 156. The response may include ranked data (e.g., ranked potential sellers, ranked potential buyers, etc.).

The display component 156 of the user device 150 may display one or more objects or images via the GUI in response to the instructions received via the receiver component 154. In one implementation, the display component 156 displays, via the GUI, an aggregate property marker overlaid on a map image based on an aggregate property quadkey (e.g., aggregate quadkey) and a map quadkey. In one implementation, the display component 156 displays, via the GUI, property markers (e.g., corresponding to a ranked list of potential buyers, corresponding to ranked list of potential sellers, etc.) overlaid on a map image based on property quadkeys and map quadkeys.

The server device 120 may include a quadkey generator 122, property data items filter 124, property data items aggregator 126, and aggregated quadkey generator 128.

The server device 120 may receive a request from the user device 150 to display a map image via a GUI of the user device 150. The map image may be divided into map quadkeys. The server device may access the data repository 131 to retrieve property data items corresponding to the map image.

The quadkey generator 122 may generate and assign a property quadkey to each of the property data items. The property quadkeys may be a detailed property quadkey (e.g., $24^{th}$ level property quadkey). Each property data item may have a separate property quadkey. Each property data item may have a corresponding latitude and a corresponding longitude. The property quadkeys may be generated with a corresponding latitude and a corresponding longitude (e.g., the center of the corresponding quadkey). Each of the map quadkeys may have a corresponding latitude, a corresponding longitude, and a corresponding zoom level.

The property data items filter 124 may determine a detail level (e.g., level of detail) of a first map quadkey for filtering property data items. The property data items filter 124 may determine the first map quadkey based on the zoom level, and visual constraints of the user device. The first map quadkey may be the most detailed quadkey level where property markers can be displayed in adjacent quadkeys (e.g., each quadkey can only display one marker, markers displayed in adjacent quadkeys are still distinguishable from each other) at the zoom level and at the visual constraints. The property data items filter 124 may filter property data items per map quadkey at the determined detail level. For example, at the detail level shown in FIG. 1F, the property data items filter 124 may filter one property data item to quadkey AAA, one to quadkey AAD, one to quadkey ACD, one to quadkey ADA, one to quadkey ADB, one to quadkey ADC, and one to quadkey ADD. At the detail level shown in FIG. 1G, the property data items filter 124 may filter two property data items to aggregate quadkey AA, one to aggregate quadkey AC, and four to aggregate quadkey AD. At the detail level shown in FIG. 1H, the property data items filter 124 may filter seven property data items to aggregate quadkey A.

The property data items aggregator 126 may aggregate property data items into an aggregate property marker. The aggregate property marker may identify a location of corresponding real estate properties. For example, at the detail level shown in FIG. 1G, the property data items aggregator 126 may aggregate two property data items into an aggregate marker for aggregate quadkey AA and may aggregate four property data items into an aggregate marker for aggregate quadkey AD. At the detail level shown in FIG. 1H, the property data items aggregator 126 may aggregate seven property data items into an aggregate marker for aggregate quadkey A.

The aggregated quadkey generator 128 may generate an aggregate quadkey for each of the aggregate property markers. The aggregate quadkey may be a truncated portion of corresponding property quadkeys of the property data items. For example, at the detail level shown in FIG. 1G, the aggregated quadkey generator 128 may generate aggregate quadkeys AA and AD for the corresponding aggregate property markers. The aggregated quadkey generator 128 may generate aggregate quadkey AC for the corresponding property marker.

The server device 120 may transmit a response to cause the user device to display via the GUI, one or more of property markers or aggregate property markers.

FIGS. 1C-1E illustrate quadkeys and aggregate quadkeys, in accordance with certain embodiments. Aggregate quadkey AA (FIG. 1D) is a truncated portion of quadkeys AAA, AAB, AAC, and AAD (FIG. 1C). Aggregate quadkey AA may be generated by aggregating quadkeys AAA, AAB, AAC, and AAD. Quadkeys AAA, AAB, AAC, and AAD may be generated by de-aggregating or dividing aggregate quadkey AA. A map image may be divided into a plurality of map quadkeys. A first map quadkey may be selected based on the zoom level and visual constraints (e.g., pixels, resolution, size, etc.) of a user device 150 (e.g., the GUI of user device 150). The area of the first map quadkey may be the smallest area on a GUI where only one property marker can be displayed (e.g., more than one property marker cannot be displayed in the area, a property marker can be displayed in the area and an adjacent area on the GUI). A property quadkey may be generated and assigned to each of the property data items.

FIGS. 1F-1H illustrate property markers and aggregate property markers, in accordance with certain embodiments. A property quadkey may be generated and assigned to each of the property data items. A property marker may be generated to identify a location (e.g., relative to the quadkey) of a property data item. The location may be relative to the quadkey (e.g., center of the quadkey, etc.), an absolute location (e.g., where the real estate property is located), an average location (e.g., an average of where the corresponding real estate properties are located), etc. For example, in FIG. 1F, each property marker may represent one real estate property that is located within the corresponding quadkey (e.g., a greater amount of the real estate property is located in the quadkey than in any other quadkey). One real estate property may be located in each of quadkeys AAA, AAD, ACD, ADA, ADB, ADC, and ADD. A corresponding property marker may be located in the center of each of quadkeys AAA, AAD, ACD, ADA, ADB, ADC, and ADD.

Referring to FIG. 1G, the property data items may be filtered (e.g., using a first map quadkey, using a size of quadkey corresponding to the zoom level and visual constraints of the user device) to obtain two or more property data items. The two or more property data items may be aggregated into an aggregate property marker that identifies a location (e.g., relative location, average location, etc.) of the two or more real estate properties. An aggregate quadkey may be generated for the aggregate property marker. The aggregate property marker may be a truncated portion of the corresponding property quadkeys.

For example, in FIG. 1G, the property data items corresponding to property markers in quadkeys AAA and AAD may be aggregated into an aggregate property marker in quadkey AA to represent the two real estate properties. The property data items corresponding to the property markers in quadkeys ADA, ADB, ADC, and ADD may be aggregated into an aggregate property marker in quadkey AD to represent the four real estate properties. Quadkey AC only corresponds to one real estate property located in quadkey ACD, so a property marker (e.g., non-aggregated) is displayed in quadkey AC. Each of the property markers and aggregate property markers may be located relative to the quadkey (e.g., center of the quadkey), relative to the location of the real estate property (e.g., the absolute location of the real estate property, an average of the absolute locations of the real estate properties, etc.).

In FIG. 1H, each of the property markers in FIG. 1F are aggregated into one aggregate property marker that represents the seven real estate properties.

Quadkeys may be aggregated and de-aggregated as a user zooms in and zooms out via the GUI of the user device 150. Quadkeys may be aggregated and de-aggregated according to the visual constraints of the user device (e.g., size of the user interface (flipping from landscape mode to portrait mode, etc.), resolution, pixels, etc.).

Property markers may be aggregated and de-aggregated as the number of real estate properties to be displayed is modified, as the zoom level is modified, as the visual constraints are modified, etc.

Figure 3A:
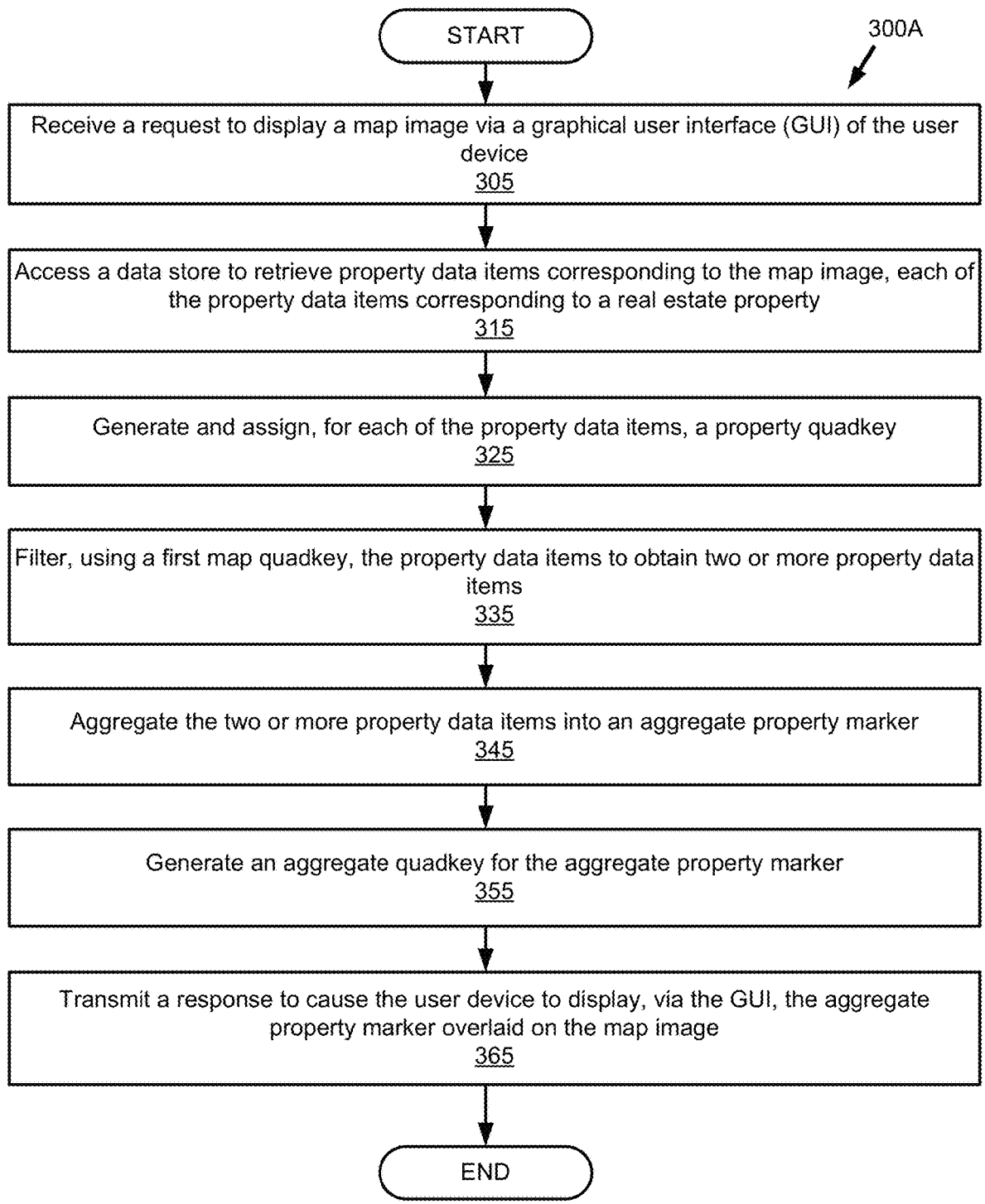
FIG. 3A is a flow diagram of a method of aggregating property data items to display on a map via a graphical user interface, in accordance with one embodiment.

FIG. 3A is a flow diagram of a method 300A of aggregating property data items to display on a map via a graphical user interface, in accordance with one embodiment. Method 300A may be performed by processing logic that may include hardware (e.g., circuitry, dedicated logic, programmable logic, microcode, etc.), software (such as instructions run on a processor, a general purpose computer system, or a dedicated machine), firmware, microcode, or a combination thereof. In one embodiment, method 300A may be performed, in part, by processor of server 120 described above with respect to FIG. 1A or FIG. 1B. Alternatively, the method 300A may be performed by other components of the system as described herein.

For simplicity of explanation, the method 300A is depicted and described as a series of acts. However, acts in accordance with this disclosure can occur in various orders and/or concurrently and with other acts not presented and described herein. Furthermore, not all illustrated acts may be performed to implement the method 300A in accordance with the disclosed subject matter. In addition, those skilled in the art will understand and appreciate that the method 300A could alternatively be represented as a series of interrelated states via a state diagram or events.

Referring to FIG. 3A, at block 305, the processing logic receives (e.g., from user device 150), a request to display a map image via a graphical user interface (GUI) of the user device 150. The request may include an indication of a zoom level. The map image may be divided into a plurality of map quadkeys. For example, upon launching the application 160, the application may have a default zoom level (e.g., $24^{th}$ level, able to see individual rooftops) and may display a map image of the geographical area surrounding the user device 150 (e.g., per the global positioning system (GPS) of the user device 150). In another example, the user device may receive user input of an address and may display a map image of the geographical area surrounding the address.

At block 315, the processing logic accesses a data store (e.g., data repository 131) to retrieve property data items 132 corresponding to the map image. Each of the property data items may correspond to a real estate property (e.g., of a set of real estate properties). The processing logic may retrieve property data items 132 corresponding to the geographical area of the map image. The processing image may retrieve property data items 132 that meet a data attribute included in the request. In one embodiment, the processing logic accesses the data store to retrieve map images that have corresponding latitudes and longitudes. The processing logic may generate map quadkeys and divide the map images into map quadkeys. In another embodiment, the processing device receives map images that have been divided into map quadkeys. In another embodiment, the user device receives the map images divided into map quadkeys (e.g., from a third party) and the processing logic generates, assigns, and aggregates property quadkeys to correspond to the map quadkeys.

At block 325, the processing logic generates and assigns, for each of the property data items 132, a property quadkey. Each of the property data items 132 may have a corresponding latitude and longitude. Property quadkeys may be generated at a detailed level (e.g., $24^{th}$ detail level) and each property quadkey may have a corresponding latitude and longitude. The processing logic may assign each property data item 132 to a corresponding property quadkey by aligning the corresponding latitudes and longitudes.

At block 335, the processing logic filters, using a first map quadkey, the property data items to obtain two or more property data items (e.g., corresponding to two or more real estate properties). The first map quadkey corresponds to a quadkey detail level where one property marker (or aggregate marker) can be displayed per quadkey. A first set of map quadkeys corresponds to the quadkey detail level and the map image (e.g., the quadkeys that will be displayed via the user device). The processing logic filters, for each of the first set of quadkeys, the property data items to determine how many property data items correspond to each of the first set of quadkeys.

At block 345, the processing logic aggregates the two or more property data items into an aggregate property marker. The aggregate property marker may identify a location of the two or more real estate properties (e.g., the center of a corresponding quadkey, an average of the absolute locations of the real estate properties, etc.). The processing logic aggregates the property data items that correspond to the same map quadkey for each of the first set of map quadkeys. The processing logic may generate a plurality of aggregate property markers (e.g., for quadkeys that have more than one property data item) and a plurality of property markers (e.g., for quadkeys that only have one property data item).

At block 355, the processing logic generates an aggregate quadkey for the aggregate property marker. The aggregate quadkey is a truncated portion of corresponding property quadkeys of the two or more property data items. The processing logic generates an aggregate quadkey for each of the plurality of aggregate property markers and each of the plurality of property markers.

At block 365, the processing logic transmits, to the user device 150, a response to cause the user device to display, via the GUI, the aggregate property marker overlaid on the map image based on the aggregate property quadkey and the first map quadkey. The response may cause the user device to display the plurality of aggregate property markers and the plurality of property markers. The aggregate property markers and the property markers are overlaid on the map by aligning the corresponding property quadkeys and the corresponding map quadkeys.

In one embodiment, the processing logic receives a second request to zoom out. The processing logic may receive a second request to display a second map image (e.g., a zoomed out map image, divided into map quadkeys) via the GUI. The second request may include a second zoom level (e.g., a less detailed zoom level). The processing logic may filter, using a second map quadkey (e.g., that matches the detail level of the zoom level and the visual constraints; corresponding to the first map quadkey), the property data items. For example, at the previous zoom level, the processing logic may have filtered the property data items to obtain two property data items that correspond to the first map quadkey. At the second zoom level, the processing logic may filter the property data items to obtain three property data items that correspond to the second map quadkey (that is less detailed that the first map quadkey). The processing logic aggregates the three property data items into the aggregate property marker that identifies a second location of the three properties. A second aggregate quadkey is generated for the aggregate property marker. The processing logic transmits a second response to the cause the user device to display the aggregate property marker overlaid on the second map image.

For example, to transition from FIG. 1G to FIG. 1H, the processing logic may receive a request to zoom out (e.g., a second zoom level). The processing logic may filter, using a map quadkey A, the seven property data items within A (at AAA, AAD, ACD, ADA, ADB, ADC, and ADD). The processing logic may aggregate the seven property data items into an aggregate property marker (shown in the center of quadkey A). The processing logic may generate a second aggregate quadkey (quadkey A) for the aggregate property marker. The processing logic may transmit a response to cause the user device to display the aggregate property marker overlaid on the second map image.

In another embodiment, the processing logic receives a third request to zoom in. The processing logic may receive a third request to display a third map image (e.g., a zoomed in map image, divided into map quadkeys) via the GUI. The third request may include a third zoom level (e.g., a more detailed zoom level). The processing logic may filter, using a third map quadkey, the property data items to obtain a first property data item and filter, using a fourth map quadkey, the property data items to obtain a second property data item. The processing logic may de-aggregate the property data items into a first property marker and a second property marker and identify corresponding property quadkeys. The processing logic may transmit a third response to cause the user device to display the first property marker and the second property marker overlaid on the third map.

For example, to transition from FIG. 1G to FIG. 1F, the processing logic may request a request to zoom in (e.g., a third zoom level). The processing logic may filter, using map quadkey AAA, the one property data item within AAA and filter, using map quadkey AAD, the one property data item within AAD. The processing logic may de-aggregate the two property data items from the aggregate property marker of quadkey AA into a first property marker in AAA and a second property marker in AAD. The processing logic may identify a property quadkey AAA for the first property marker and a property quadkey AAD for the second property marker. The processing logic may transmit a response to cause the user device to display the first property marker and the second property marker overlaid on the third map image.

Figure 3B:
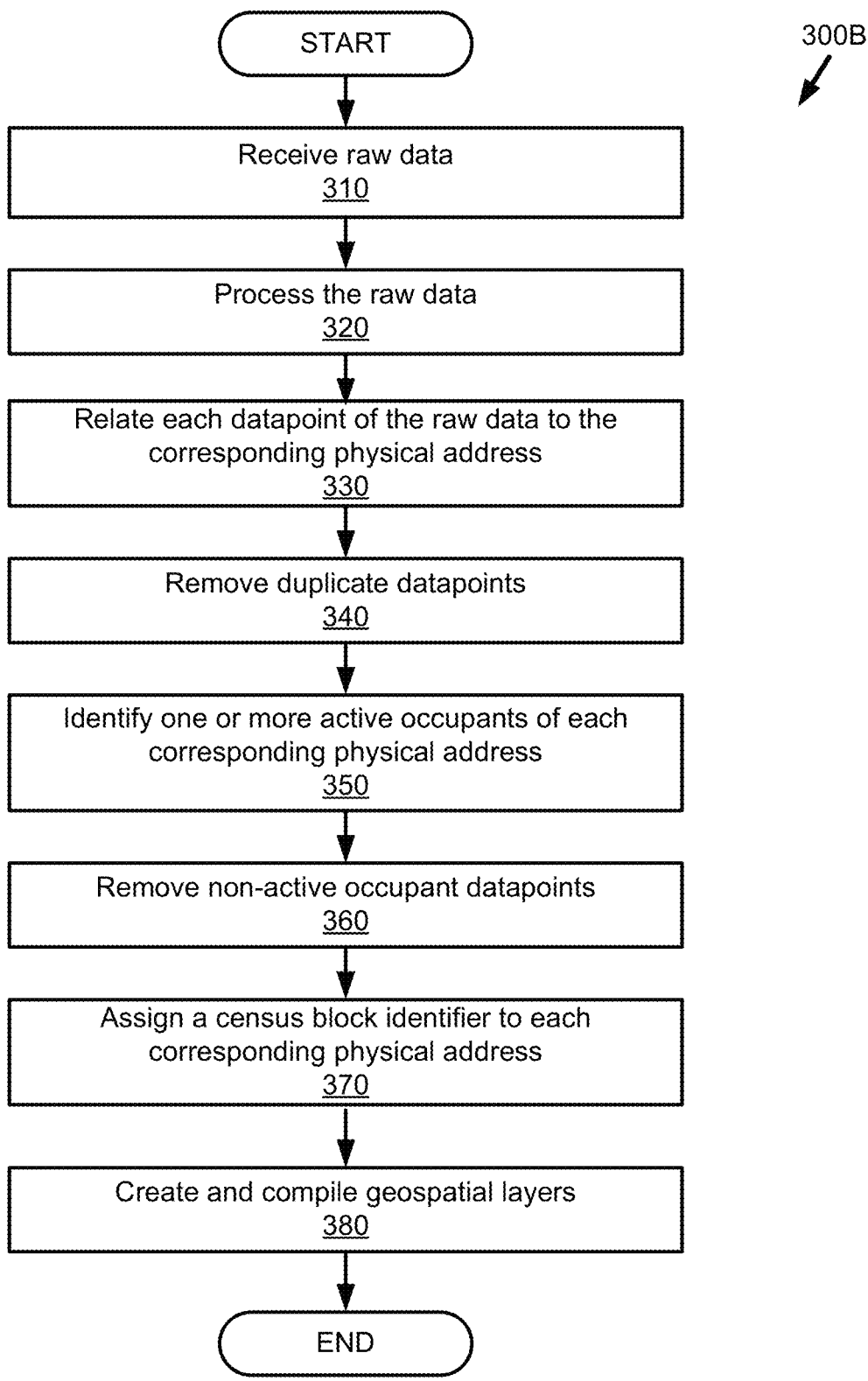
FIG. 3B is a flow diagram of a method of the back-end CRM software, in accordance with one embodiment.

FIG. 3B is a flow diagram of a method 300B of the back-end CRM software 130, in accordance with one embodiment. Method 300B may be performed by processing logic that may include hardware (e.g., circuitry, dedicated logic, programmable logic, microcode, etc.), software (such as instructions run on a processor, a general purpose computer system, or a dedicated machine), firmware, microcode, or a combination thereof. In one embodiment, method 300B may be performed, in part, by processor of server 120 described above with respect to FIG. 1A or FIG. 1B. Alternatively, the method 300B may be performed by other components of the system as described herein.

For simplicity of explanation, the method 300B is depicted and described as a series of acts. However, acts in accordance with this disclosure can occur in various orders and/or concurrently and with other acts not presented and described herein. Furthermore, not all illustrated acts may be performed to implement the method 300B in accordance with the disclosed subject matter. In addition, those skilled in the art will understand and appreciate that the method 300B could alternatively be represented as a series of interrelated states via a state diagram or events.

Referring to FIG. 3B, at 310 the processing logic receives raw data 110. At block 320, the processing logic processes the raw data 110. At block 330, the processing logic relates each datapoint of the raw data 110 to the corresponding physical address. At block 340, the processing logic removes duplicate datapoints. At block 350, the processing logic identifies one or more active occupants of each corresponding physical address. At block 360, the processing logic removes non-active occupant datapoints. At block 370, the processing logic assigns a census block identifier to each corresponding physical address. At block 380, the processing logic creates and compiles geospatial layers. One or more of the blocks may be eliminated from method 300B. One or more of the blocks may be rearranged in method 300B.

Figure 4:
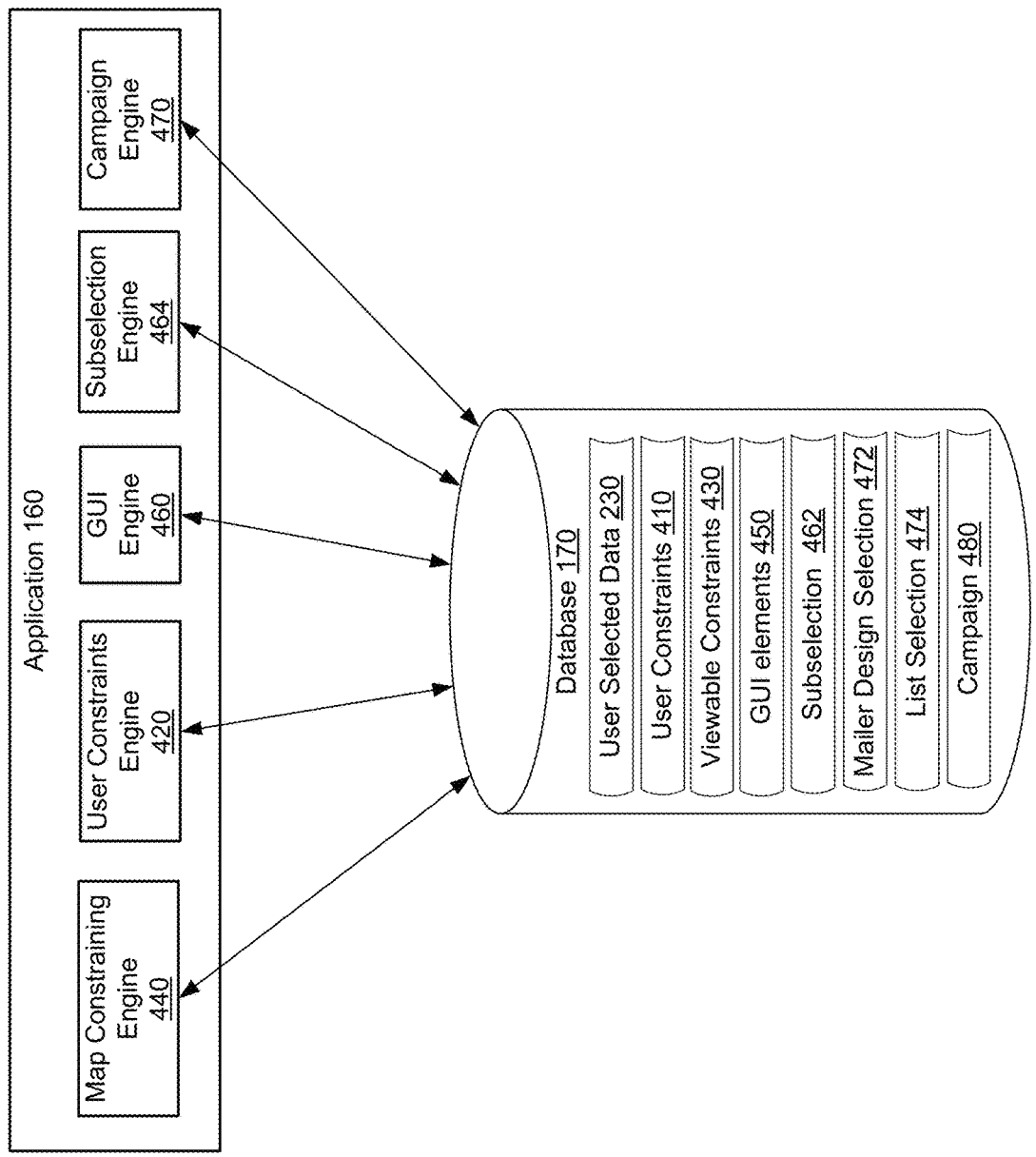
FIG. 4 is a block diagram illustrating an application executing by the user device, in accordance with one embodiment.

FIG. 4 is a block diagram illustrating an application 160 (e.g., CRM client application 160A, consumer application 160N, and so forth) executing by the user device 150, in accordance with one embodiment. The application 160 receives CRM data 220 from the server 120 via network 140. The application 160 may store the CRM data 220 in database 170. The application 160 receives viewable constraints 430. The application 160 may store the viewable constraints in database 170. In one embodiment, viewable constraints 430 are a user input of a zoom level on the GUI of the user device 150. In another embodiment, the viewable constraints 430 are in view of the size of the GUI. In another embodiment, the viewable constraints 430 are in view of the size of the display of the user device 150. In another embodiment, the viewable constraints 430 are in view of the resolution of the display of the user device 150.

The map constraining engine 440 may access the CRM data 220 and the viewable constraints 430 from database 170 to produce aggregation results for a given geography. The application 160 may store the aggregation results for a given geography in database 170. In one embodiment, the aggregation results for a given geography only include data viewable within the GUI viewable area from the viewable constraints 430.

The application 160 may store user constraints 410 in database 170. In one embodiment, the user constraints 410 include constraints relating to a prospective real estate property (e.g., house, building, plot of land). In another embodiment, the user constraints 410 include constraints relating to the prospective buyer or seller. In another embodiment, the user constraints 410 are a preset user profile.

The user constraints engine 420 may access the user constraints 410 and the aggregation results for a given geography stored in database 170 to generate filter results. The application 160 may store the filter results in database 170.

The application 160 may receive GUI elements 450 (e.g., user input, user profile, preprogrammed elements, template screens, views, and so forth). The application 160 may store the GUI elements 450 in database 170. The GUI engine 460 may access the GUI elements 450 and filter results stored in database 170 to generate a GUI to provide to the display of user device 150.

In one embodiment, application 160 receives subselection 462. The application may store the subselection 462 in database 170. In one embodiment, the subselection engine 464 accesses the subselection 462 and the filter results stored in database 170 to generate subselected data.

The application 160 may receive one or more user selections to generate user selected data 230 to transmit to server 120 via network 140. In one embodiment, the user selections include one or more of the user constraints 410, the viewable constraints 430, or subselection 462. In another embodiment, the user selections include selection of one or more real estate properties. In another embodiment, the user selections include a selection of a region of a map. In another embodiment, the user selections include selection of an address. In another embodiment, the user selections include a selection of a maximum number of results.

In another embodiment, the application 160 includes other features such as one or more of situational awareness, a visual CRM, a CRM filter, built-in communications, scrubbed leads, buyer finder, seller finder, a lead generator, associated product sales, real time transaction and information management, and so forth.

The application 160 may receive one or more of mailer design selection 472 and list selection 474. The application 160 may store one or more of mailer design selection 472 and list selection 474 in database 170. Mailer design selection 472 may include a selection of a template, configurations to the template, edits to the template, and so forth. List selection 474 may include recipient names and corresponding recipient contact information (e.g., mailing address, email address, and so forth) of potential buyers, a list of potential sellers, a list of previous clients, filter results, and so forth. The application 160 may include a campaign engine 470. The campaign engine 470 may access one or more of a mailer design selection 472 and a list selection 474 stored in database 170 to generate one or more campaigns 480. In one embodiment, the recipient names and corresponding recipient addresses correspond to one or more of the ranked potential buyers (see FIG. 7). In another embodiment, the recipient names and corresponding recipient addresses correspond to one or more of the ranked potential sellers (see FIG. 9). In another embodiment, the recipient names and corresponding recipient addresses correspond to a specific client type.

In another embodiment, the application 160 receives ranked data 260 from the server 120 via network 140. The application 160 may store the ranked data 260 in database 170. The ranked data 260 may be generated by the back-end CRM software 130 in view of the user selected data 230 (see FIG. 2). The map constraining engine 440 may access the ranked data 260 and the viewable constraints 430 stored in database 170 to produce aggregation results for a given geography. The user constraints engine 420 may access the user constraints 410 and the aggregation results for a given geography stored in database 170 to generate filter results. The GUI engine 460 may access the filter results and GUI elements 450 stored in database 170 to generate a GUI to provide to the display of user device 150. In one embodiment, the subselection engine 464 may access the filter results and subselection 462 stored in database 170 to generate subselected data. The application 160 may include a campaign engine 470 to access a mailer design selection 472 and a list selection 474 stored in database 170 to generate one or more campaigns 480. The campaign 480 may include one or more recipient names and corresponding recipient addresses. In one embodiment, the recipient names and corresponding recipient addresses correspond to one or more of the ranked potential buyers (see FIG. 7). In another embodiment, the recipient names and corresponding recipient addresses correspond to one or more of the ranked potential sellers (see FIG. 9). In another embodiment, the recipient names and corresponding recipient addresses correspond to a specific client type.

Figure 5:
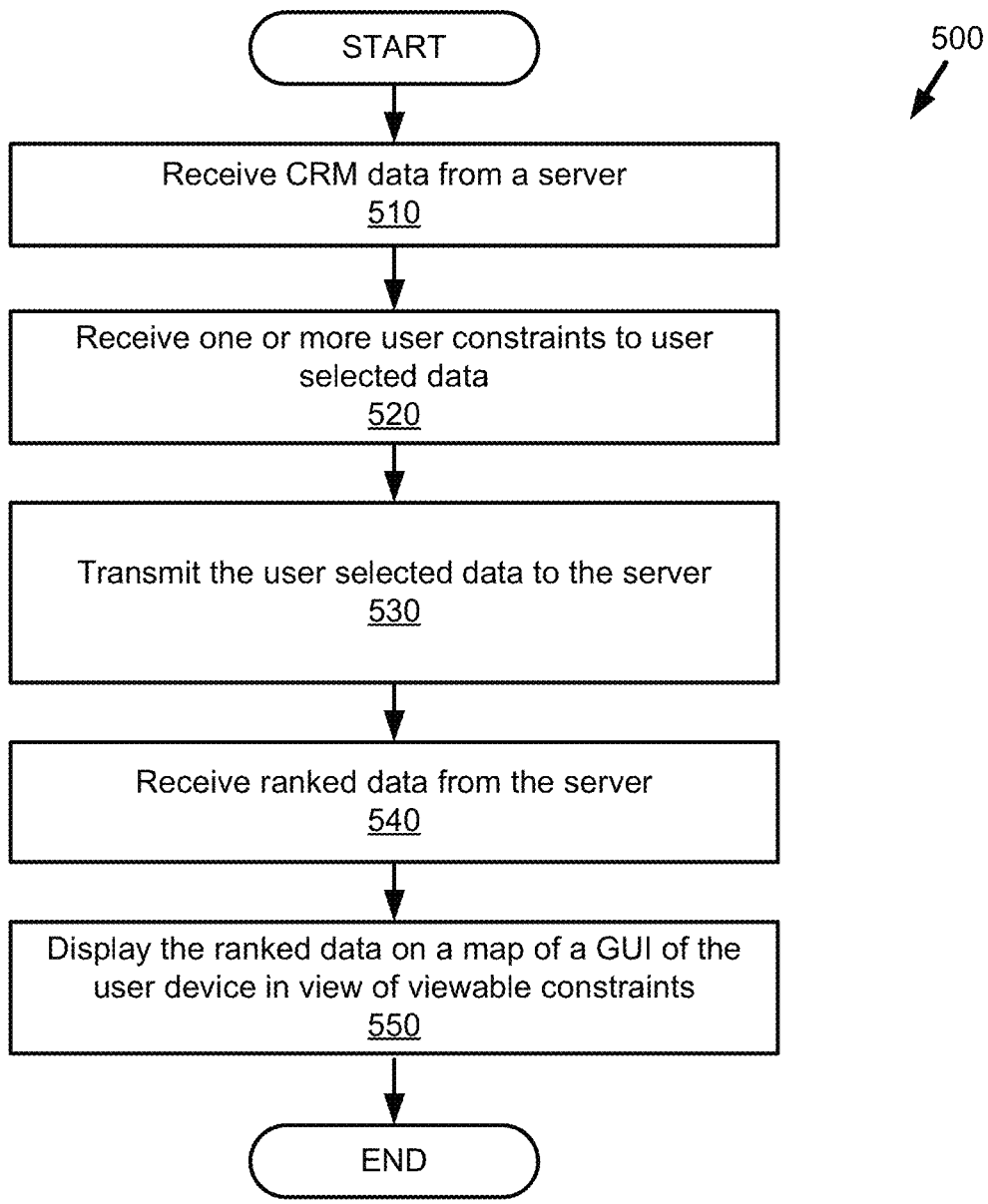
FIG. 5 is a flow diagram of a method of the application executing by the user device, in accordance with one embodiment.

FIG. 5 is a flow diagram of a method 500 of the application 160 (e.g., CRM client application 160A, consumer application 160N, and so forth) executing by the user device 150, in accordance with one embodiment. Method 500 may be performed by processing logic that may include hardware (e.g., circuitry, dedicated logic, programmable logic, microcode, etc.), software (such as instructions run on a processor, a general purpose computer system, or a dedicated machine), firmware, microcode, or a combination thereof. In one embodiment, method 500 may be performed, in part, by processor of user device 150 described above with respect to FIG. 1A or FIG. 1B. Alternatively, the method 500 may be performed by other components of the system as described herein.

For simplicity of explanation, the method 500 is depicted and described as a series of acts. However, acts in accordance with this disclosure can occur in various orders and/or concurrently and with other acts not presented and described herein. Furthermore, not all illustrated acts may be performed to implement the method 500 in accordance with the disclosed subject matter. In addition, those skilled in the art will understand and appreciate that the method 500 could alternatively be represented as a series of interrelated states via a state diagram or events.

Referring to FIG. 5, at 510 the processing logic receives CRM data 220 from the server 120 via the network 140. At block 520, the processing logic receives one or more user constraints to generate user selected data 230. The one or more user constraints may include one or more of viewable constraints 430, user constraints 410, GUI elements 450, subselection 462, and so forth. At block 530, the processing logic transmits the user selected data 230 to the server 120. At block 540, the processing logic receives ranked data 260 from the server 120. At block 550, the processing logic displays the ranked data 230 on a map of a GUI of the user device 150 in view of viewable constraints 430. In one embodiment, the processing logic performs dot-showing constraints (e.g., based on the quadkeys and zoom level) in view of the size of the GUI of the user device and the viewable constraints. If the GUI is small, the GUI may show one dot for multiple real estate properties (e.g., the real estate properties will be aggregated or clustered according to their quadkey and zoom level, real estate properties with the same quadkey will be displayed as one object on the GUI, and so forth). If the viewable constraints are zoomed out, the GUI may show one dot for multiple real estate properties.

In one embodiment, at block 530, the server device 120 receives a request including an indication of a region. At block 540, the server device 120 transmits a response to cause the user device to display property markers (e.g., including an aggregated property marker) overlaid on the map image. The property markers correspond to a ranked list of potential sellers corresponding to real estate properties located in the region.

Figure 6A:
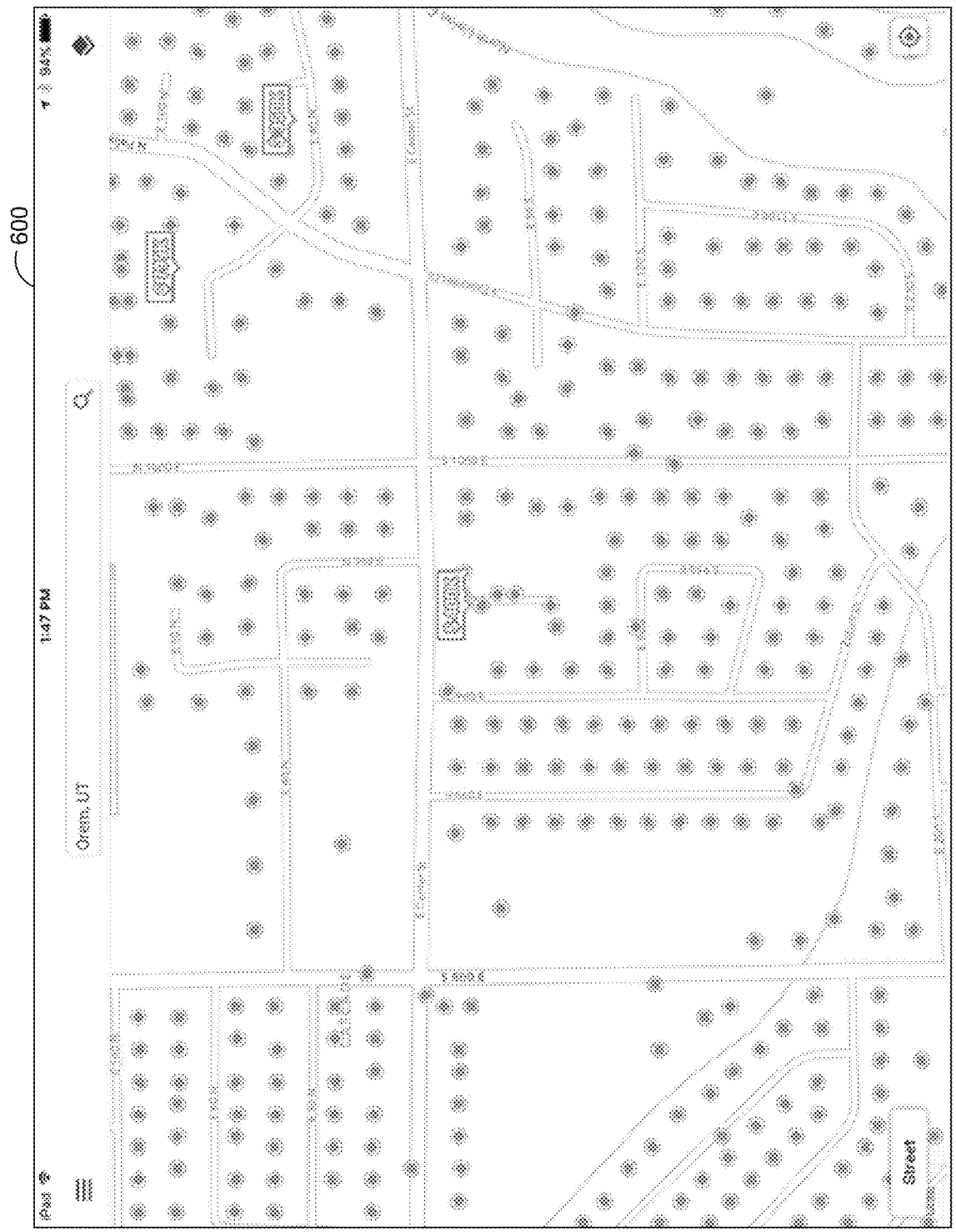
FIG. 6A is a screenshot of a view of a graphic user interface (GUI) for displaying CRM information, in accordance with one embodiment.

FIG. 6A is a screenshot of a view of a GUI 600 for displaying CRM information, in accordance with one embodiment. In one embodiment, the processing logic receives the viewable constraints 430 of a city (e.g., Orem, Utah). In another embodiment, the processing logic receives the viewable constraints 430 of zooming in on a specific location (e.g., Center St and 800 E in Orem, Utah).

The processing logic may display an object (e.g., a dot, a circle, an icon) representing one or more real estate properties. Each object may represent a different number of real estate properties. The number of real estate properties that each object represents may depend on the size of the GUI 600, the viewable constraints 430, the size of the display of the user device 150, the resolution of the user device 150, the density of real estate properties, and so forth. In one embodiment, each object (e.g., dot, circle, and so forth) may represent one real estate property. In another embodiment, each object represents one or more real estate properties located in the quadkey where the object is displayed. If the GUI is zoomed in, each quadkey may hold one or no real estate properties. If the GUI is zoomed out, each quadkey may represent zero, one, or multiple real estate properties. For example, if the GUI 600 is zoomed out on a geographic region that has a high density of real estate properties, each object may represent more real estate properties than when the GUI 600 is zoomed in on a geographic region that has a lower density of real estate properties. One or more of the objects may display information about the real estate property (e.g., sold price, asking price, estimated value, and so forth).

Figure 6B:
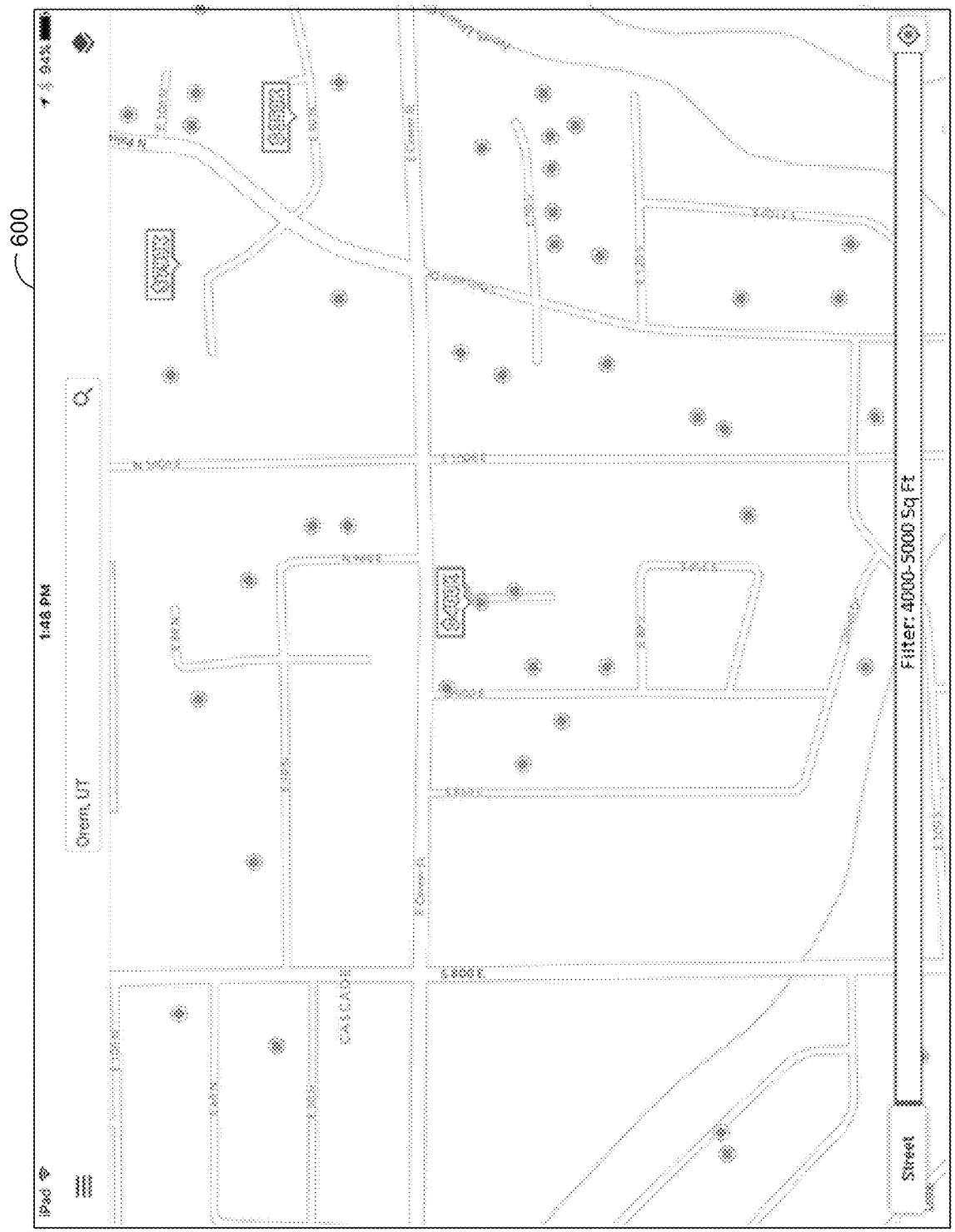
FIG. 6B is a screenshot of a view of the GUI displaying filtered CRM information, in accordance with one embodiment.

FIG. 6B is a screenshot of a view of the GUI 600 displaying filtered CRM information, in accordance with another embodiment. In one embodiment, the processing logic receives user constraints 410 (e.g., filter 4000-5000 $ft^2$). The processing logic generates viewable useful data in view of the user constraints 410 and constrained map data (e.g., CRM data 220 in view of the viewable constraints 430). For example, if the user constraint 410 is "filter 4000-5000 $ft^2$," the GUI 600 may display only real estate properties that are 4000 to 5000 $ft^2$. The GUI 600 may display the one or more user constraints selected (e.g., text at the bottom of the GUI of "Filter: 4000-5000 sq ft").

The user constraints 410 allow users to filter the properties displayed on the map using raw data 110 such as demographics and lifestyles. Filters also display data such as potential buyers, sellers, and sphere of influence (past buyers and seller).

Figure 6C:
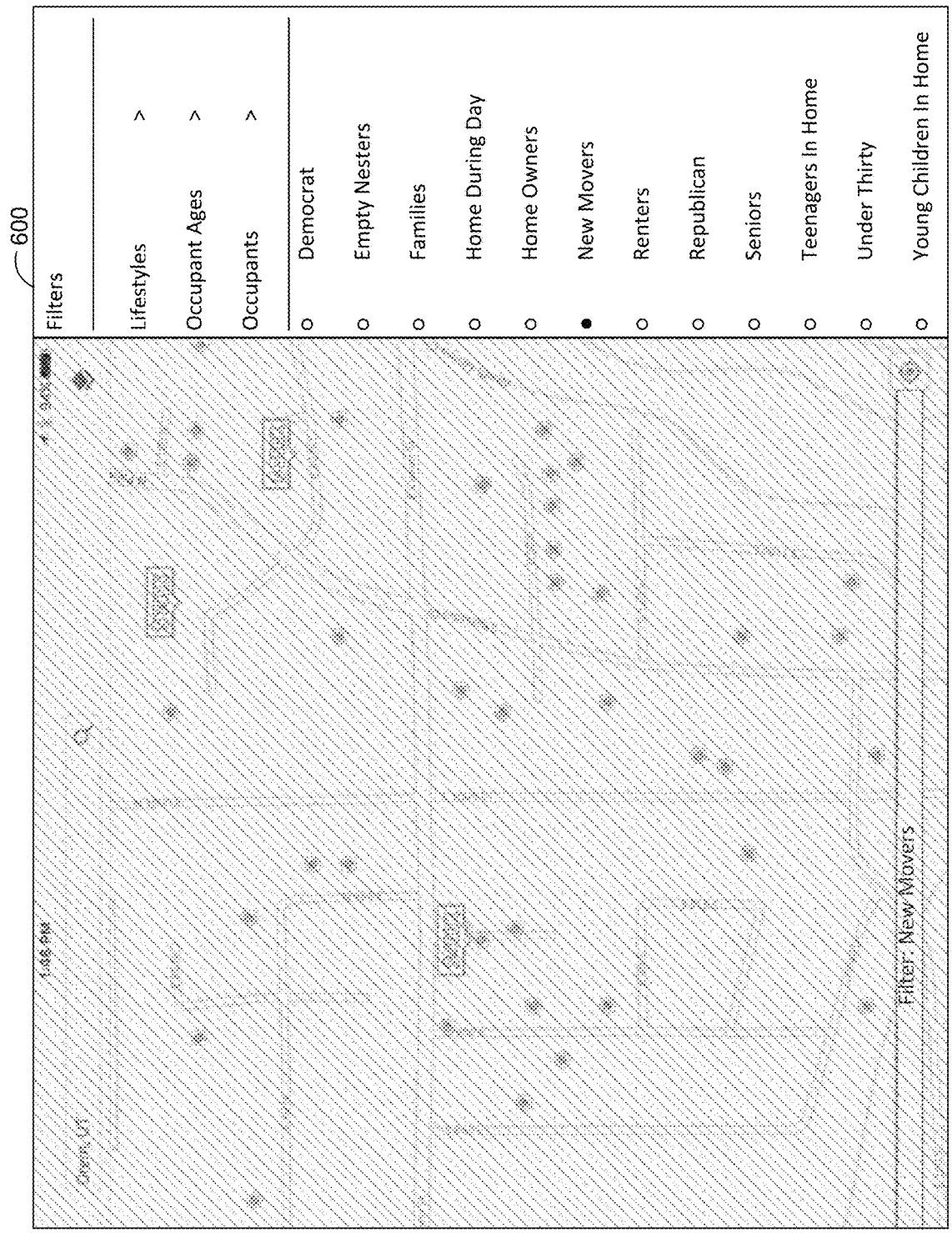
FIG. 6C is a screenshot of a view of a GUI element of the GUI with predefined filters for filtering CRM information, in accordance with another embodiment.

FIG. 6C is a screenshot of a view of a GUI element of the GUI 600 with predefined filters for filtering CRM information, in accordance with another embodiment. The GUI element may display one or more filter categories (e.g., lifestyles, occupant ages, occupants, and so forth). The one or more filter categories may have individual filters (e.g., democrat, empty nesters, families, home during day, home owners, new movers, renters, republican, seniors, teenagers in home, under thirty, young children in home, homeowner, high income, green/eco-friendly, impulse buyer, and so forth). In one embodiment, the processing logic receives a user constraint 410 (e.g., new movers) and the processing logic generates viewable useful data in view of the user constraint 410 and the constrained map data.

Figure 7:
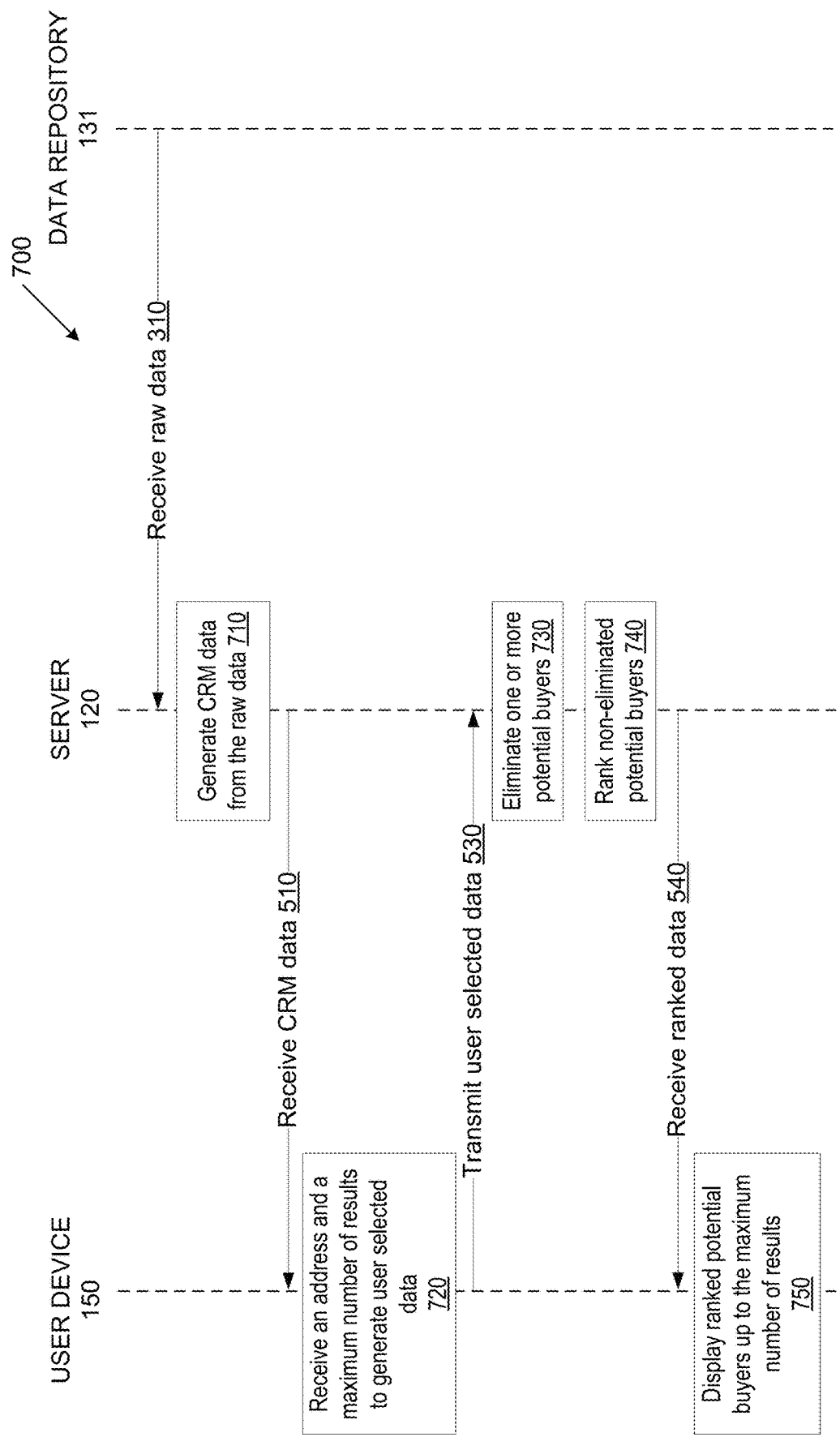
FIG. 7 is a sequence diagram of finding potential buyers, in accordance with one embodiment.

FIG. 7 is a sequence diagram 700 of finding potential buyers, in accordance with one embodiment.

At 310, server 120 receives raw data 110 from data repository 131 (see FIG. 3).

At 710, server 120 generates CRM data 220 from the raw data 110. One or more of processing engine 202, relating engine 204, duplicate removal engine 206, active occupant identifying engine 208, non-active occupant removal engine 210, census block identifying engine 212, and geospatial layer engine 214 may access the raw data 110 to generate CRM data 220 (see FIG. 2).

At 510, user device 150 receives CRM data 220 from server 120 (see FIG. 5).

At 720, user device 150 receives an address and a maximum amount of results to generate user selected data 230. One or more of the address and the maximum amount of results may be selected via a GUI of user device 150. In one embodiment, the default number of results is 270.

At 530, user device 150 transmits the user selected data 230 to the server 120 (see FIG. 5).

At 730, server 120 eliminates one or more potential buyers Eliminating engine 240 may access the user selected data 230 to eliminate one or more potential buyers (see FIG. 2). The eliminating may include one or more of eliminating potential buyers that live within a minimum distance of the address, eliminating potential buyers that live beyond a maximum distance from the address, eliminating potential buyers who moved to a corresponding real estate property within less than a threshold period of time, and eliminating potential buyers who do not meet other standards of an average potential buyer.

At 740, server 120 ranks the non-eliminated potential buyers. Ranking engine 250 may access the user selected data 230 to rank the non-eliminated potential buyers (see FIG. 2). The server 120 may perform a ranking of potential home buyers that are likely to be eligible to and desire to purchase the real estate property. In one embodiment, the server uses data such as credit scores, income, employment, and so forth. The server may rank the non-eliminated potential buyers according to one or more factors such as increasing the rank in view of similarity of the potential buyer to residents of real estate properties in the region of the real estate property, increasing the rank when the real estate property is larger than the current real estate property of the potential buyer, increasing the rank when the real estate property is at least 1,000 ft$^2$ larger than the current real estate property of the potential buyer, increasing the rank in view of sufficient rooms for each member of the household size of the potential buyer (e.g., one room per person of the household of the potential buyer, one room per two people of the household of the potential buyer, and so forth), and increasing the rank in view of similarity of family makeup of the potential buyer to family makeup of the residents of real estate properties in the region of the real estate property. The server 120 may give a numerical score to the non-eliminated potential buyers according to the one or more factors.

At 540, user device 150 receives the ranked data from server 120. In one embodiment, the ranked data is potential buyers (see FIG. 5).

At 750, user device 150 displays ranked potential buyers up to the maximum number of results. In one embodiment, the processing logic places an object (e.g., push pin, a ranking number) on the real estate property of each of the ranked potential buyers up to the maximum number of results. In another embodiment, a list of the ranked potential buyers may be saved to create a call or mail campaign 480 to the ranked potential buyers.

In one embodiment, at block 530, the server device 120 receives a request including an address of a seller real estate property and a maximum number of results. At block 540, the server device 120 transmits a response to cause the user device to display property markers (e.g., including an aggregated property marker) overlaid on the map image. The property markers correspond to a ranked list of potential buyers up to the maximum number of results.

Figure 11:
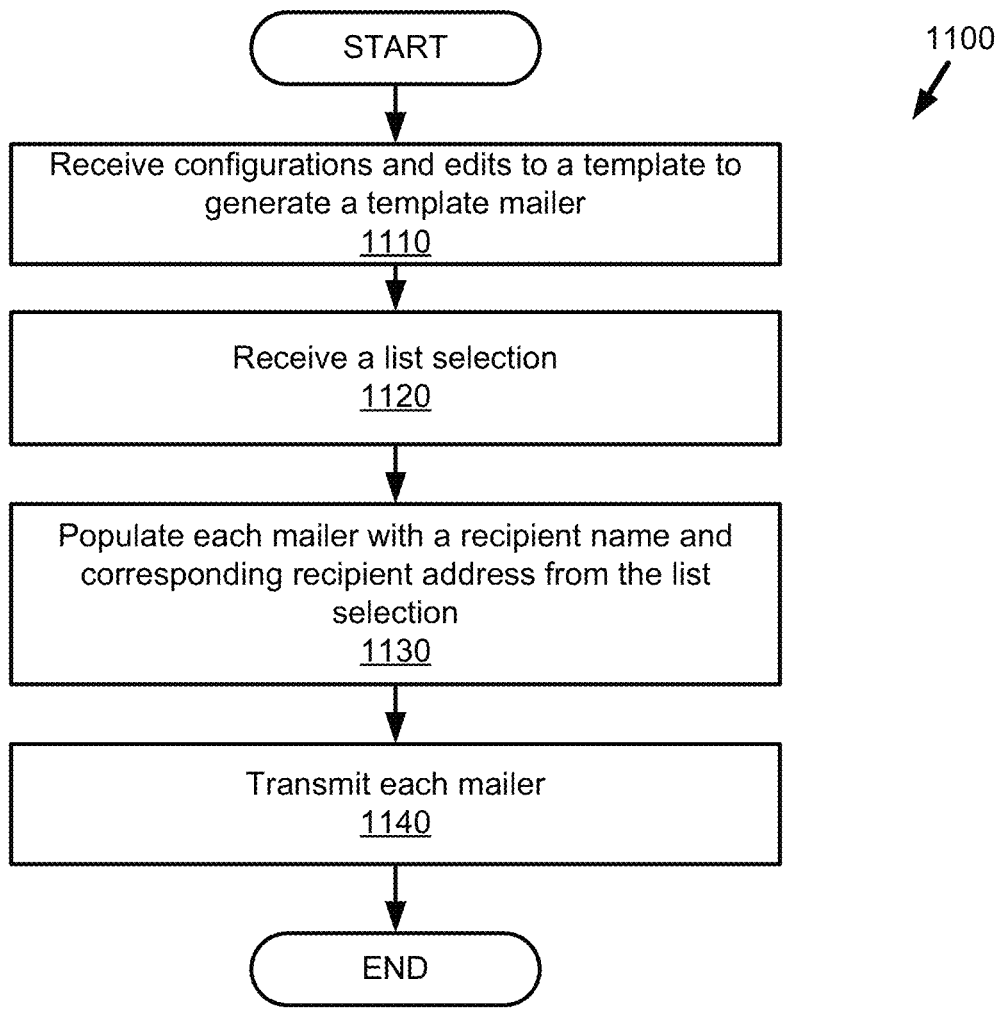
FIG. 11 is a flow diagram of a method of fulfillment of a campaign, in accordance with one embodiment.

Sequence 700 uses situational awareness to put the power of geospatial data at the fingertips of the agent and lender. The user and lender may have a very educated view based on trends, lifestyles, income, and family units that identifies people who are ready to sell and don't even know it yet or who would be a great candidates to purchase a home an agent is marketing. FIG. 11 shows fulfillment of mail campaigns 480 to intelligently selected groups of buyers (e.g., selected by FIG. 7) and sellers (e.g., selected by FIG. 9). Situational awareness is the ability to virtually place yourself anywhere you would like to see a view of the actual area and its relative raw data 110 in real-time.

FIG. 8A is a screenshot of a view of a GUI 800 for initiating a buyer finder campaign, a seller finder campaign, or a mail campaign, and displaying past campaigns, in accordance with one embodiment. The user device 150 may receive selection of buyer finder campaign to find potential buyers per sequence 700. The user device 150 may receive selection of seller finder campaign to find potential sellers per sequence 900. The user device 150 may receive selection of mailer campaign to send mailers to potential buyers or sellers per method 1100.

Figure 8B:
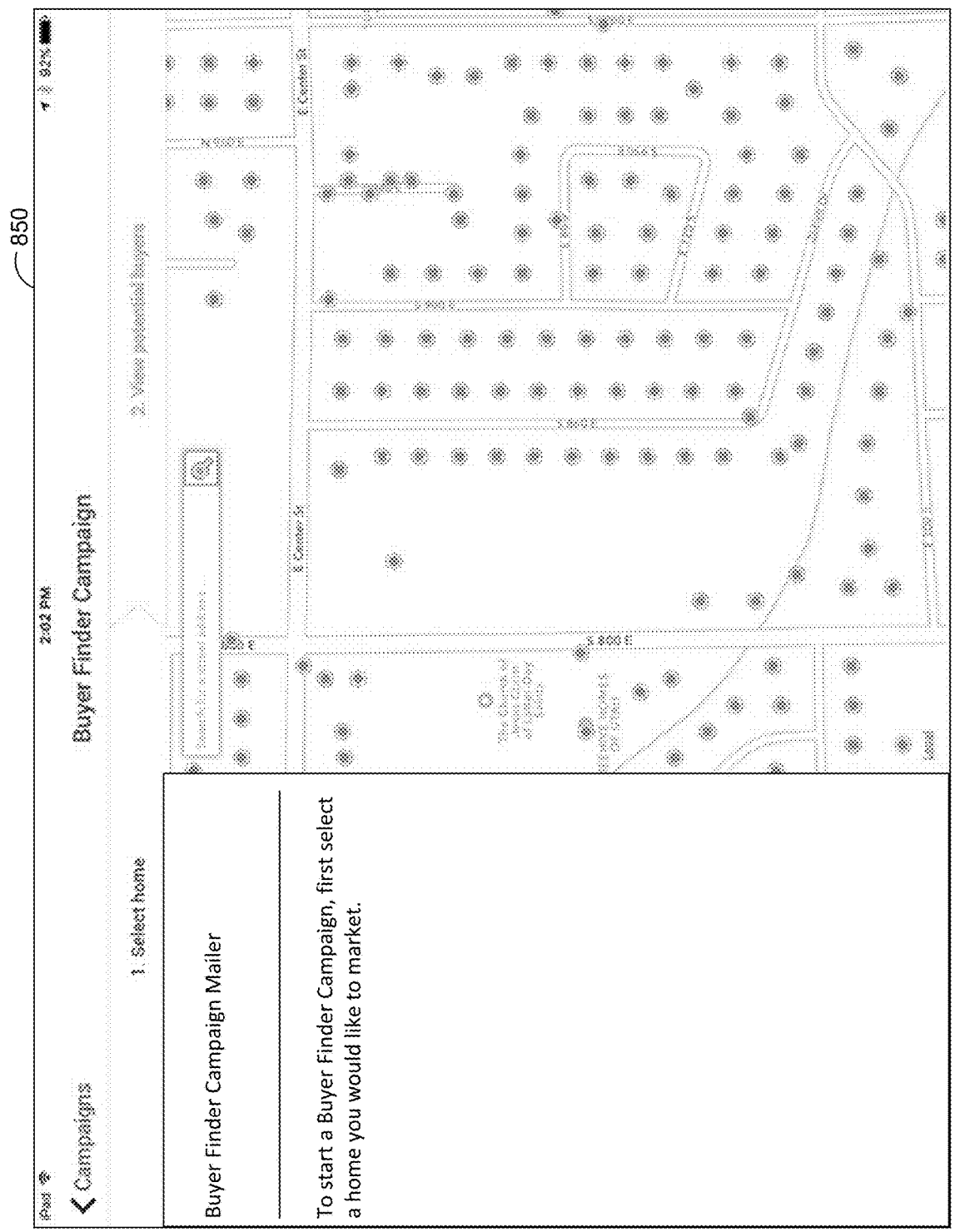
FIG. 8B is a screenshot of a view of a GUI for selecting a home in the buyer finder campaign, in accordance with one embodiment.

FIG. 8B is a screenshot of a view of a GUI 850 for selecting a home in the buyer finder campaign, in accordance with one embodiment. The user device 150 may receive selection of an address. In one embodiment, the user device 150 may display a searchable map. In another embodiment, the user device 150 may display a search box to receive input of an address.

Figure 8C:
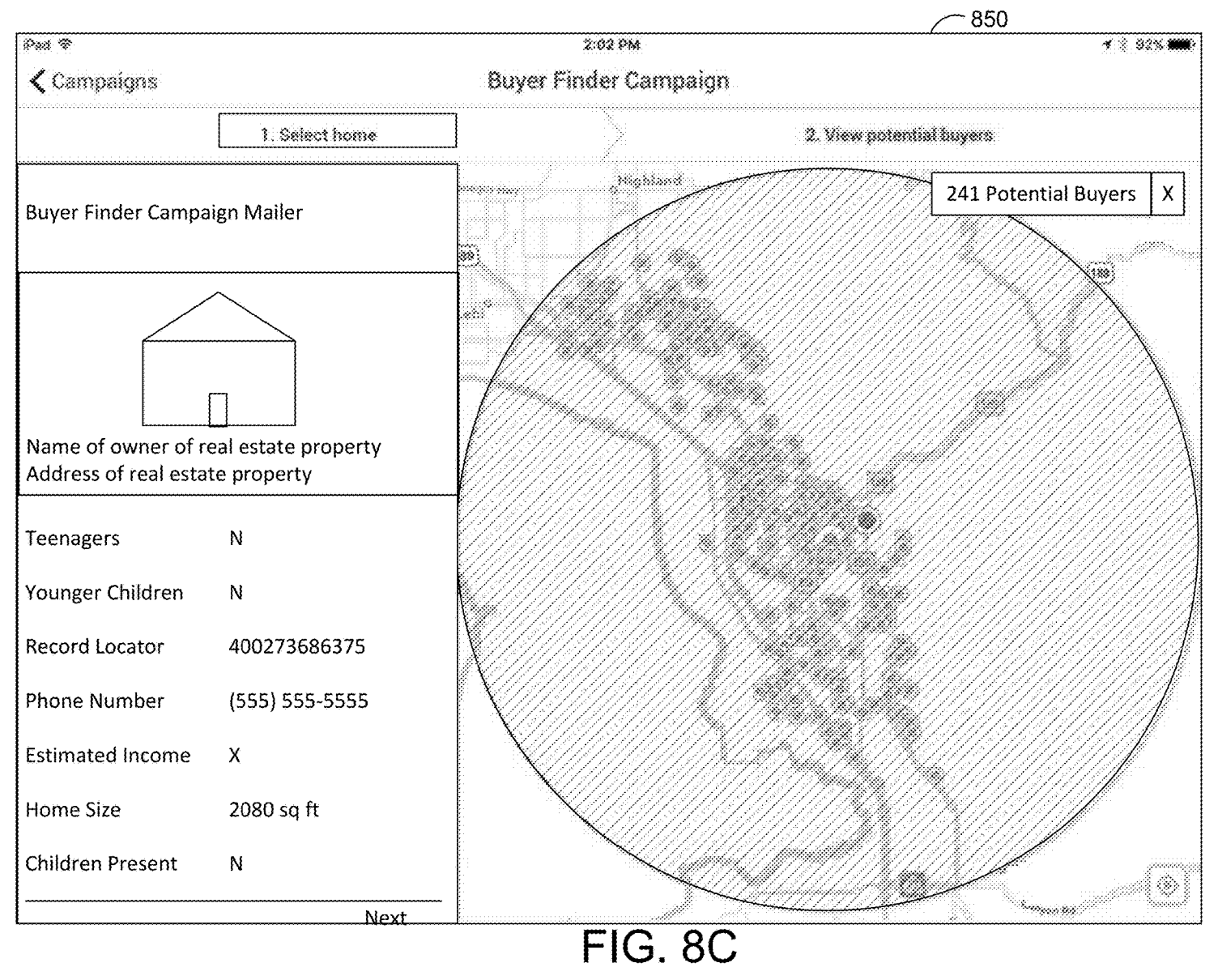

FIG. 8C is a screenshot of a view of the GUI 850 for viewing potential buyers in the buyer finder campaign, in accordance with one embodiment. After user device 150 receives selection of an address, the user device 150 may display information regarding the real estate property at the address. The information may include one or more of a photo of the real estate property, name of the owner, the address, if there are teenagers that live in the real estate property, if younger children live in the real estate property, if children are present in the real estate property, a record locator identifier, a phone number of the owner, estimated income of the owner, home size, and so forth. The user device 150 may display an area surrounding the address and potential buyers within the area. In one embodiment, the area surrounding the address is a radius. In another embodiment, the area surrounding the address is editable. In another embodiment, the user device 150 shows an object (e.g., a dot) at each address where a potential buyer resides. The objects may be aggregated or clustered according to the quadkeys of each real estate property at the zoom level (e.g., multiple real estate properties with the same quadkey at the zoom level on the GUI will share the same object on the GUI). In another embodiment, the user device 150 shows a number of potential buyers.

In one embodiment, the user selects a home to be sold and the map displays an area around the home where potential buyers are located. The GUI 850 may display a first number representing the total number of potential buyers (e.g., 241 potential buyers), but the map may display a plurality of objects that is less than the first number (e.g., 100 objects). The application 160 may group (e.g., aggregate, cluster) real estate properties with the same quadkey at the zoom level (e.g., real estate properties with the same truncated quadkey) to generate the plurality of objects shown on GUI 850. The application 160 may generate the plurality of objects shown on GUI 850 in view of the display resolution (e.g., viewable constraints 430, pixel size, and so forth). For example, if a display has a lower resolution, the real estate properties shown may be aggregated (less objects shown on the display, each object represents more real estate properties) than if a display has a higher resolution.

Figure 8D:
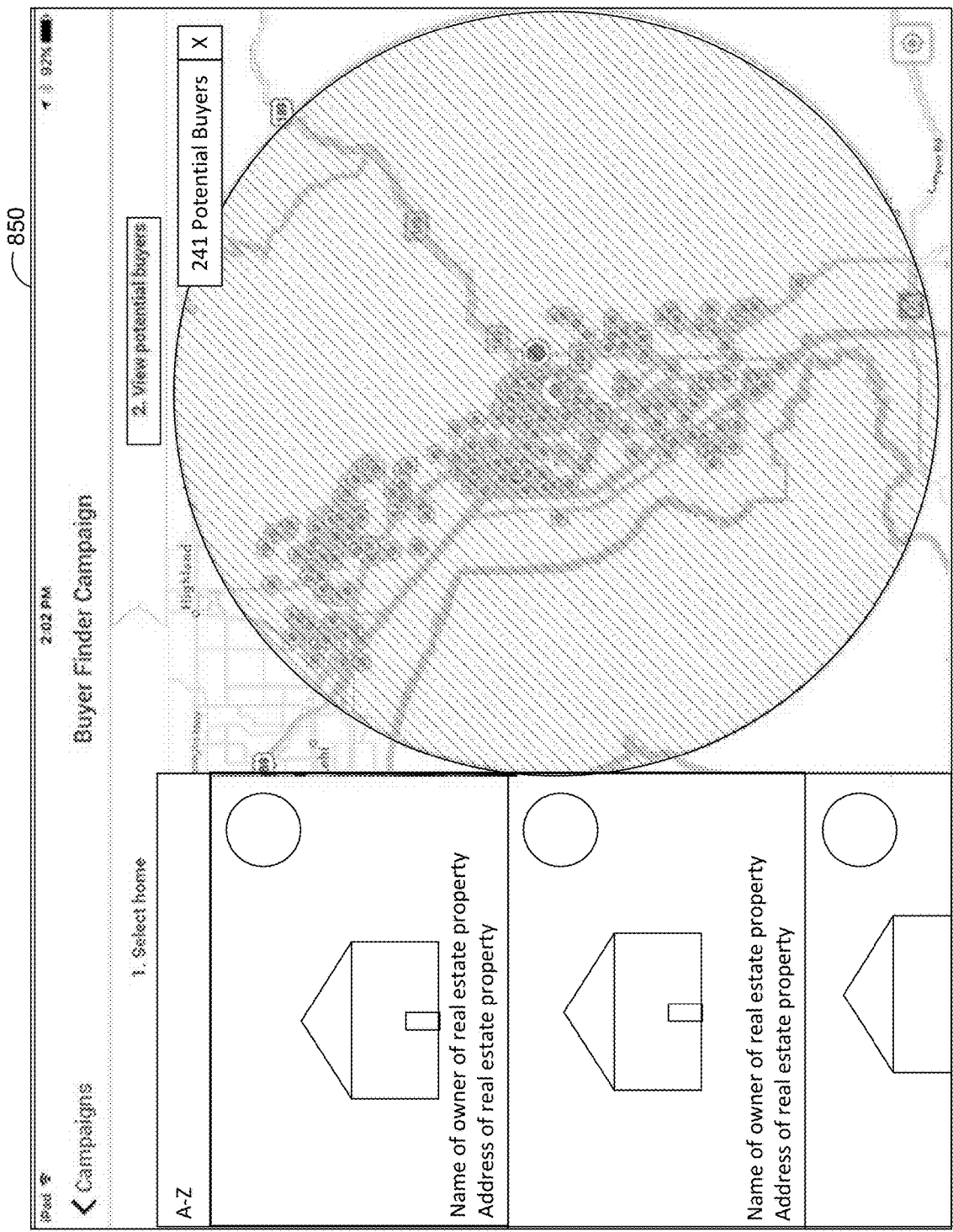
FIG. 8D is a screenshot of a view of the GUI for viewing potential buyers in the buyer finder campaign, in accordance with another embodiment.

FIG. 8D is a screenshot of a view of the GUI 850 for viewing potential buyers in the buyer finder campaign, in accordance with another embodiment. In one embodiment, the user device 150 displays a list of potential buyers. In another embodiment, the list of potential buyers includes information such as one or more of a photo of the real estate property where the potential buyer resides, the name of the potential buyer, or the address of the real estate property where the potential buyer resides. In another embodiment, the list of potential buyers allows selection of one or more of the potential buyers. In another embodiment, the list of potential buyers is ranked as per sequence 700.

Figure 9:
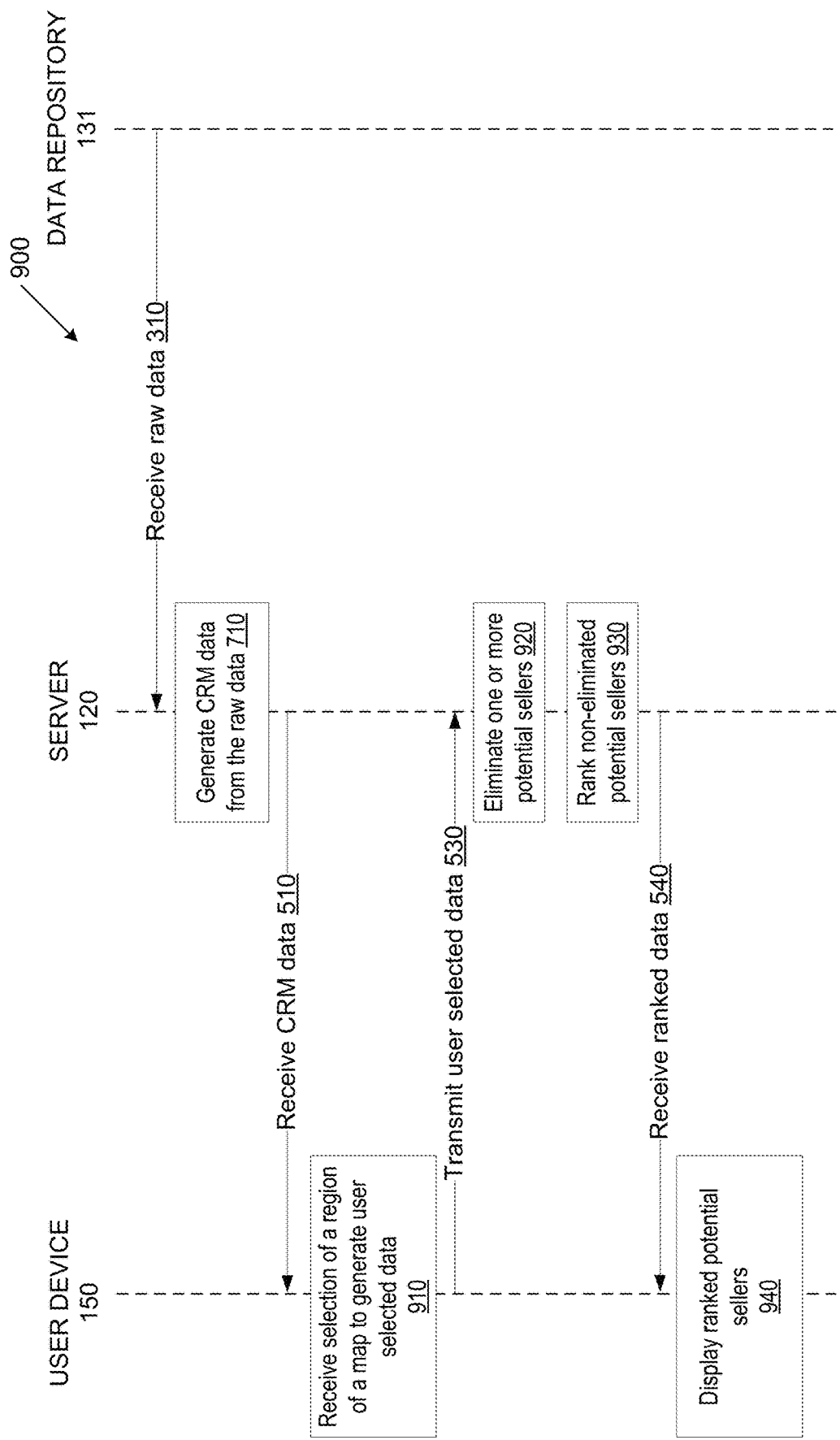
FIG. 9 is a sequence diagram of finding a potential seller, in accordance with one embodiment.

FIG. 9 is a sequence diagram 900 of finding potential sellers, in accordance with one embodiment.

At 310, server 120 receives raw data 110 from data repository 131 (see FIG. 3).

At 710, server 120 generates CRM data 220 from the raw data 110 (see FIG. 7).

At 510, user device 150 receives CRM data 220 from server 120 (see FIG. 5).

At 910, user device 150 receives a selection of a region of a map to generate user selected data 230. The selection of the region of the map may be selected via a GUI of user device 150. In one embodiment, the region is selected by drawing a region by touching the screen of the user device 150. The region may be an area where the user desires to find a potential home to purchase. The GUI may display all of the homes on the map in the selected region.

At 530, user device 150 transmits the user selected data 230 to the server 120 (see FIG. 5).

At 920, server 120 eliminates one or more potential sellers Eliminating engine 240 may access the user selected data 230 to eliminate one or more potential sellers (see FIG. 2). In one embodiment, the ranking includes eliminating one or more of potential sellers that are renting, potential sellers who moved to a corresponding real estate property within less than a threshold period of time, and so forth.

At 930, server 120 ranks the non-eliminated potential sellers. Ranking engine 250 may access the user selected data 230 to rank the non-eliminated potential sellers (see FIG. 2). In another embodiment, the ranking includes increasing the rank in accordance with one or more of similarity of the potential seller to residents of real estate properties in the region of the real estate property, when the real estate property is larger than the current real estate property of the potential seller, when the real estate property is at least 1000 ft$^2$ larger than the current real estate property of the potential seller, in view of sufficient rooms for household size of the potential seller (e.g., one room per person of the household of the potential seller, one room per two people of the household of the potential seller, and so forth), in view of similarity of family makeup of the potential seller to family makeup of the residents of real estate properties in the region of the real estate property.

At 540, user device 150 receives the ranked data from server 120 (see FIG. 5). In one embodiment, the ranked data is potential sellers.

At 940, user device 150 displays ranked potential sellers. In one embodiment, the processing logic presents the real estate properties of each of the ranked potential sellers via the GUI. In one embodiment, the real estate properties may be displayed by placing an object (e.g., a pushpin, a number, a dot, and so forth) on the corresponding real estate property on the map on the GUI. In another embodiment, the processing logic saves the ranked subset into a campaign 480 to create a call or mail campaign 480 to the potential sellers. In another embodiment, the processing logic displays a photo of a front view of each real estate property and the user selects one or more of the real estate properties by examining the photos. In another embodiment, the processing logic may generate a subset of the constrained plurality of real estate properties in view of the selection of one or more of the constrained plurality of real estate properties.

Sequence 900 uses situational awareness to put the power of geospatial data at the fingertips of the agent and lender. The user and lender may have a very educated view based on trends, lifestyles, income, and family units that identifies people who are ready to sell and don't even know it yet or who would be a great candidates to purchase a home an agent is marketing. FIG. 11 shows fulfillment of mail campaigns to intelligently selected groups of buyers (e.g., selected by FIG. 7) and sellers (e.g., selected by FIG. 9). Situational awareness is the ability to virtually place yourself anywhere you would like to see a view of the actual area and its relative raw data 110 in real-time.

Figure 10A:
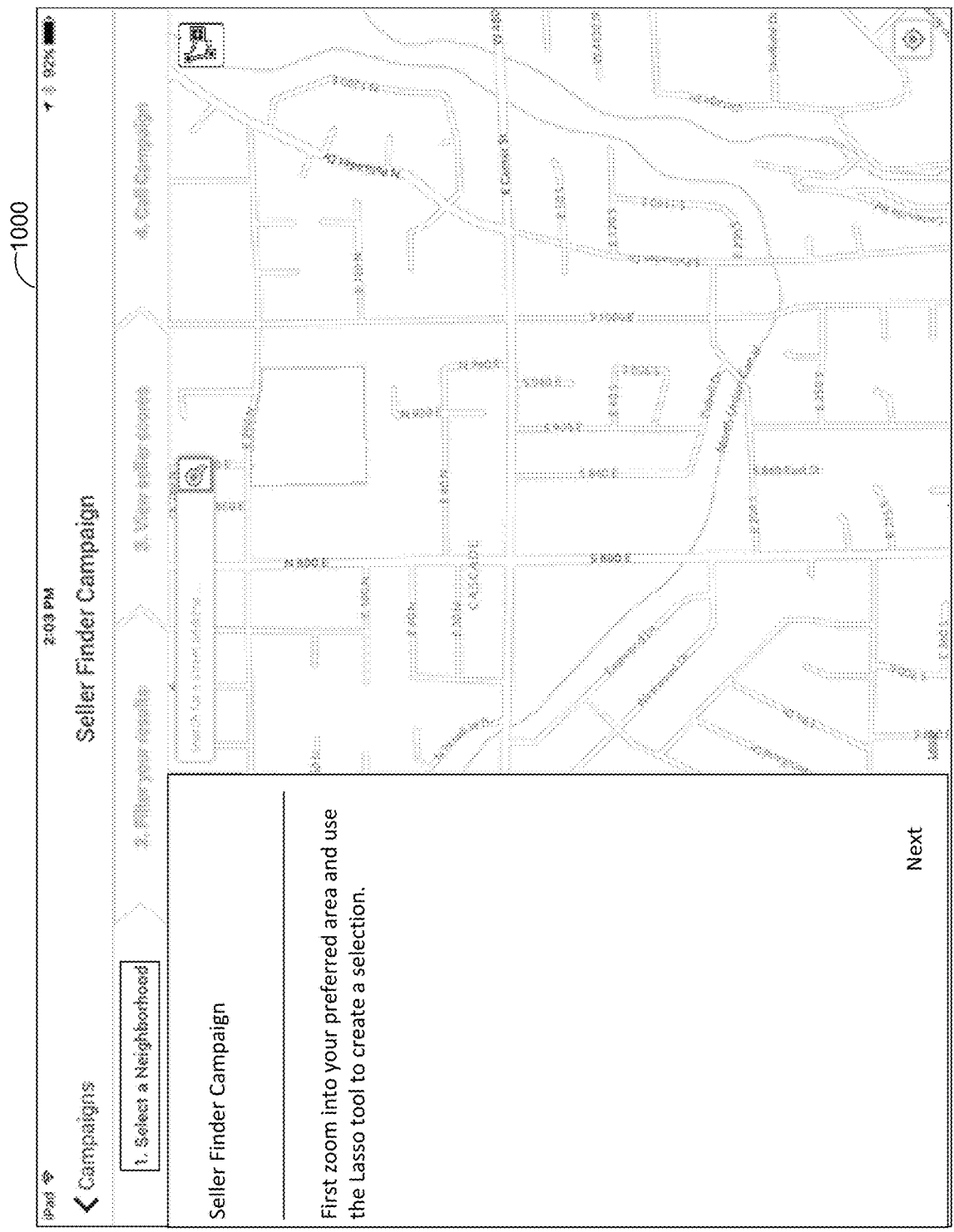
FIG. 10A is a screenshot of a view of a GUI for selecting a neighborhood in the seller finder campaign, in accordance with one embodiment.

FIG. 10A is a screenshot of a view of a GUI 1000 for selecting a neighborhood in the seller finder campaign, in accordance with one embodiment. The user device 150 may receive selection to initiate a seller finder campaign as shown in FIG. 8A to initiate sequence 900. In one embodiment, the user device 150 receives selection of an address. In another embodiment, the user device 150 receives a zoom in function to display a region (e.g., a neighborhood, an area at a level where each street or real estate property can be displayed). In another embodiment, the user device 150 displays a searchable map. In another embodiment, the user device 150 displays a search box to receive input of an address.

Figure 10B:
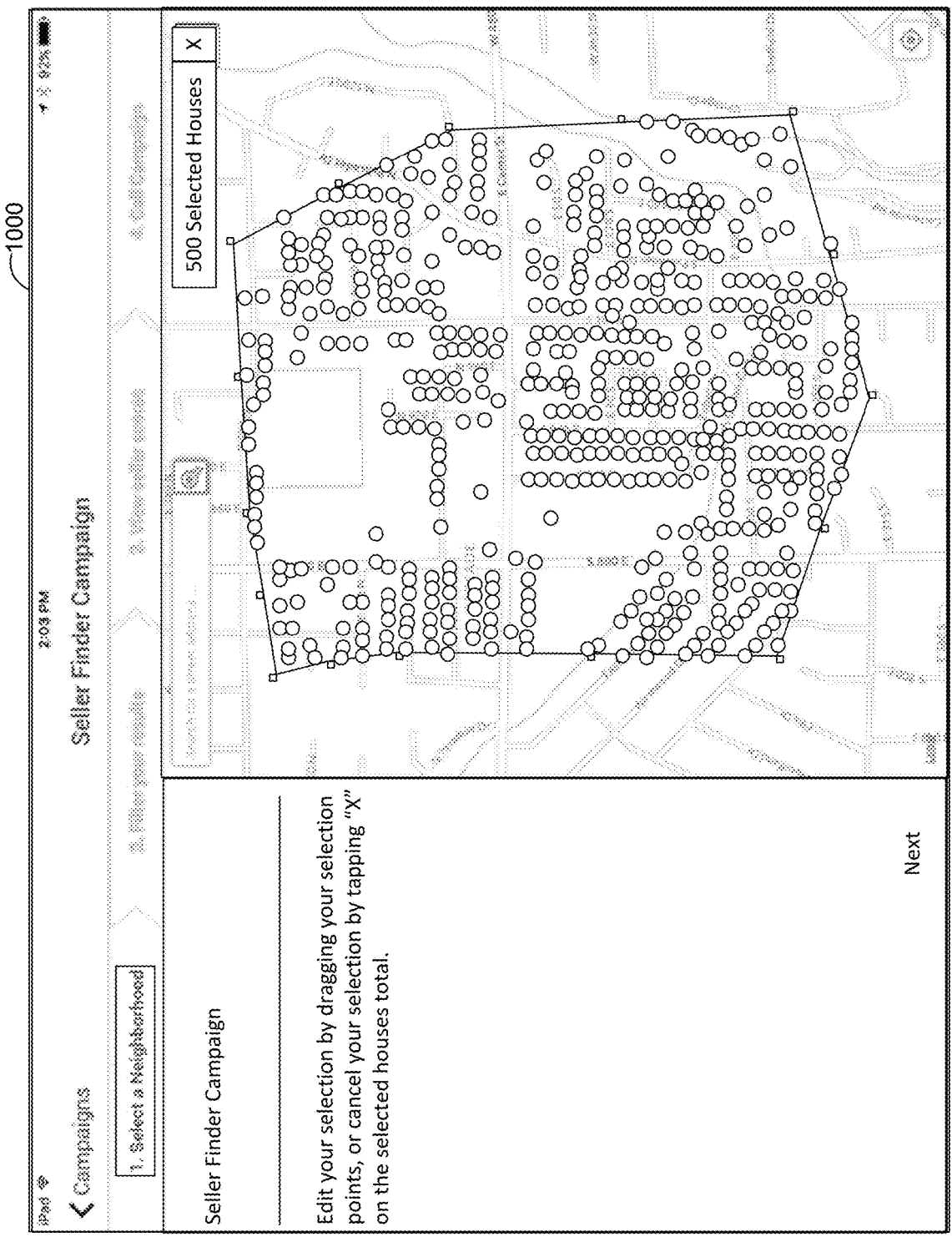
FIG. 10B is a screenshot of a view of the GUI for selecting a neighborhood in the seller finder campaign, in accordance with another embodiment.

FIG. 10B is a screenshot of a view of the GUI 1000 for selecting a neighborhood in the seller finder campaign, in accordance with another embodiment. The user device 150 may receive a selection of a region. In one embodiment, the selection is by drawing a shape around the region. In another embodiment, the shape drawn around the region can be edited by dragging selection points. In another embodiment, the shape drawn can be canceled. In another embodiment, the user device 150 may display the number of houses in the selected region.

Figure 10C:
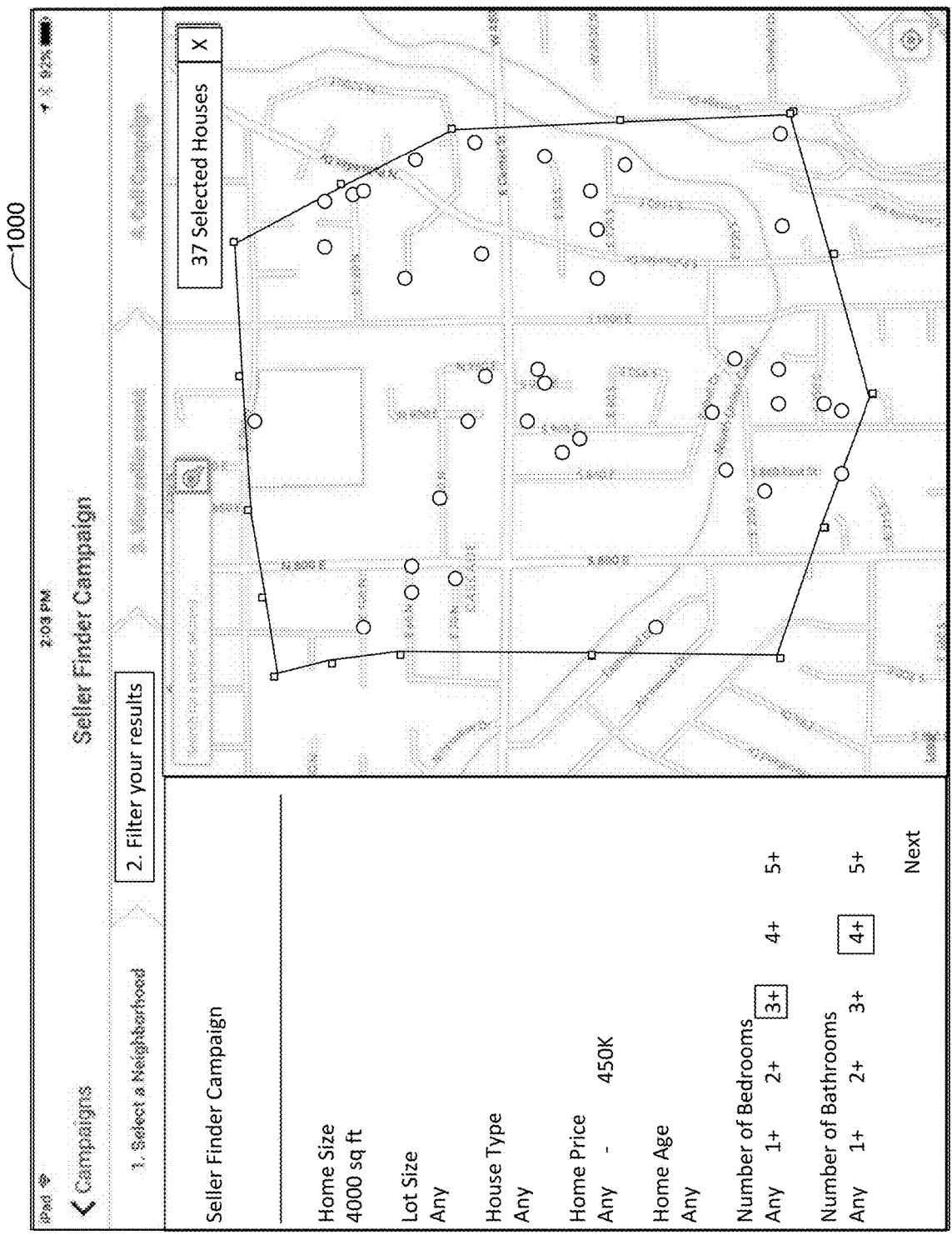
FIG. 10C is a screenshot of a view of the GUI for filtering potential sellers in the seller finder campaign, in accordance with another embodiment.

FIG. 10C is a screenshot of a view of the GUI 1000 for filtering potential sellers in the seller finder campaign, in accordance with another embodiment. In one embodiment, the user device 150 may receive one or more of home size, lot size, house type, home price, home age, number of bedrooms, number of bathrooms, and so forth. The GUI 1000 may display only the potential sellers whose real estate properties meet the selected requirements. In one embodiment, the GUI 1000 only displays the real estate properties with quadkeys with bit masks that match the selected categories.

Figure 10D:
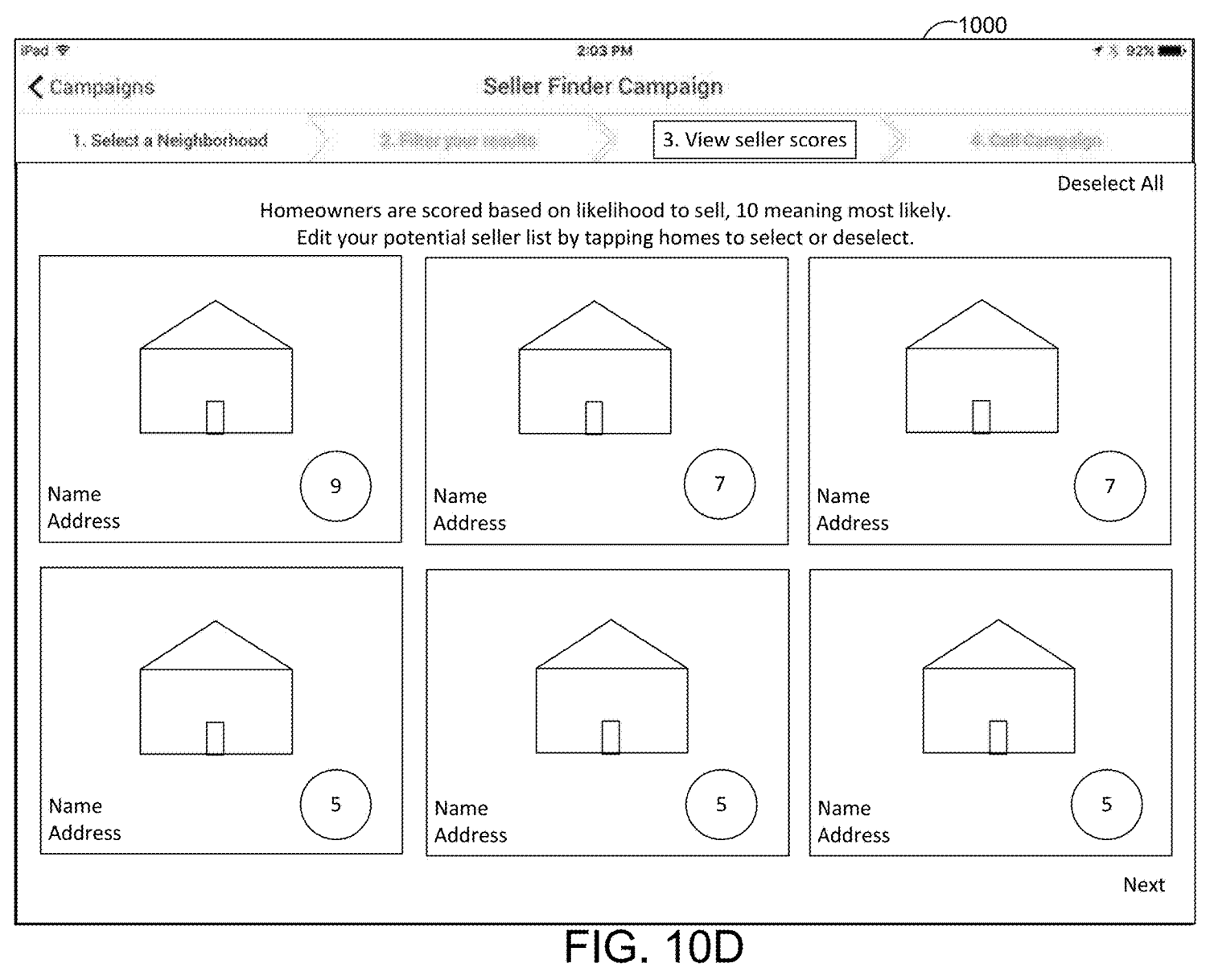

FIG. 10D is a screenshot of a view of the GUI 1000 for viewing seller scores in the seller finder campaign, in accordance with another embodiment. In one embodiment, the user device 150 displays the ranked potential sellers. In another embodiment, the user device 150 displays a photo of the real estate, the address of the real estate, and the name of the corresponding prospective seller. In another embodiment, the user device 150 displays a score for each ranked potential seller (e.g., 9, 7, 5, and so forth). In another embodiment, the user device 150 receives selection of one or more of the ranked potential sellers.

Figure 10E:
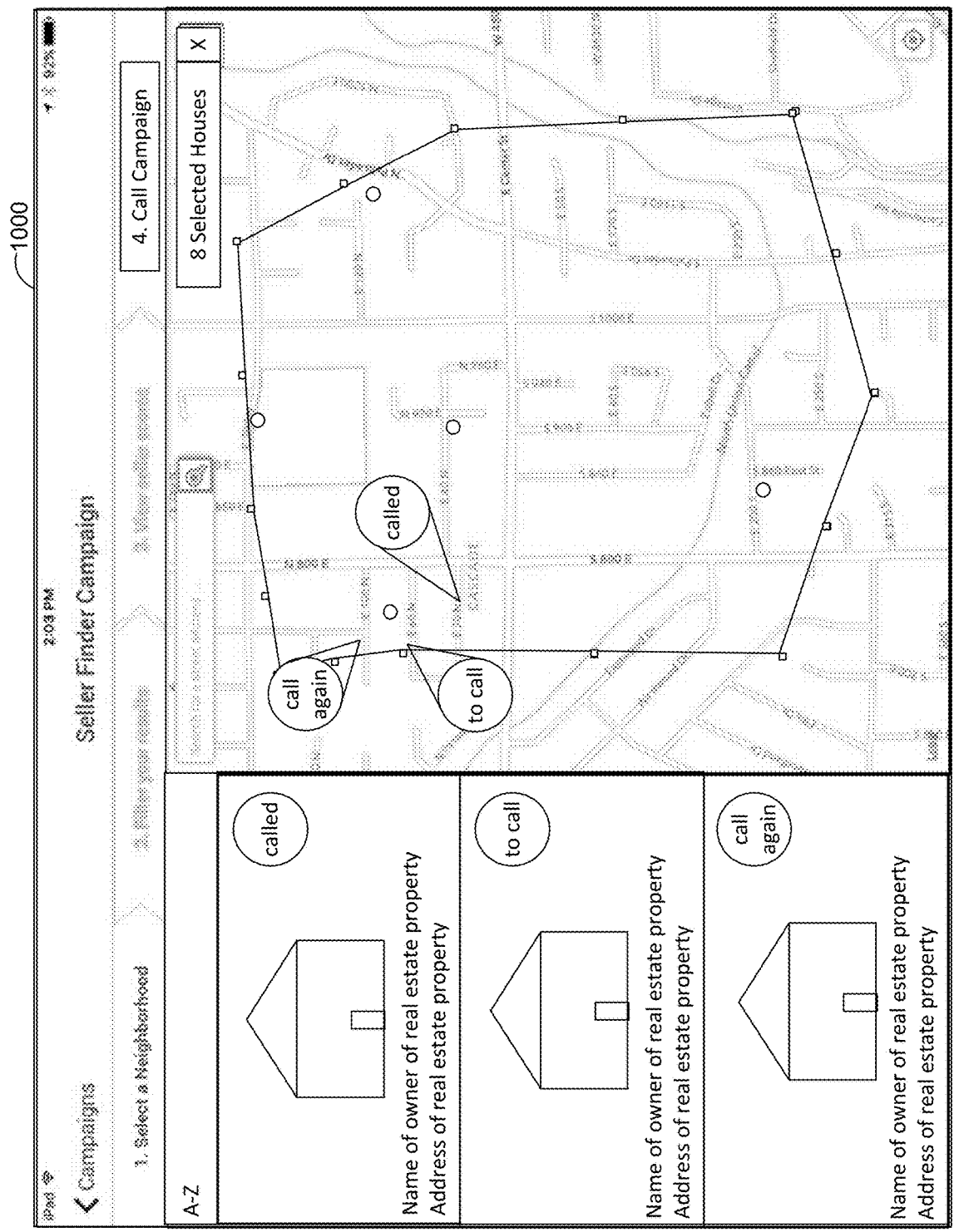
FIG. 10E is a screenshot of a view of the GUI for initiating a call campaign in the seller finder campaign, in accordance with another embodiment.

FIG. 10E is a screenshot of a view of the GUI 1000 for initiating a call campaign in the seller finder campaign, in accordance with another embodiment. In one embodiment, the user device 150 shows the selected ranked potential sellers on a map. In another embodiment, the user device 150 shows a list of the ranked potential sellers. In another embodiment, the user device 150 shows one or more of an image of the real estate, the address, the phone number, and the name of the corresponding potential seller. In another embodiment, the user device 150 displays an object on at least one of the list of the potential sellers or the map indicating the status of the potential seller (e.g., a check mark if an attempt to contact the potential seller was successful, a replay arrow if the attempt to contact the potential seller was unsuccessful, an ellipsis (three periods) if the potential seller has not been attempted to be contacted, and so forth).

FIG. 11 is a flow diagram of a method of fulfillment of a campaign, in accordance with one embodiment. Method 1100 may be performed by processing logic that may include hardware (e.g., circuitry, dedicated logic, programmable logic, microcode, etc.), software (such as instructions run on a processor, a general purpose computer system, or a dedicated machine), firmware, microcode, or a combination thereof. In one embodiment, method 1100 may be performed, in part, by processor of user device 150 described above with respect to FIG. 1A or FIG. 1B. Alternatively, the method 1100 may be performed by other components of the system (e.g., the server device 120) as described herein.

For simplicity of explanation, the method 1100 is depicted and described as a series of acts. However, acts in accordance with this disclosure can occur in various orders and/or concurrently and with other acts not presented and described herein. Furthermore, not all illustrated acts may be performed to implement the method 1100 in accordance with the disclosed subject matter. In addition, those skilled in the art will understand and appreciate that the method 1100 could alternatively be represented as a series of interrelated states via a state diagram or events.

Referring to FIG. 11, at 1110 the processing logic receives configuration and edits to a template to generate a template mailer. In one embodiment, the processing logic is to generate a plurality of mailers in view of the template mailer. In another embodiment, the configuration and edits to a template include the mailer design selection 472.

At block 1120, the processing logic receives a list selection 474 for a campaign 480. The list selection 474 may include one or more recipient names and corresponding recipient addresses. In one embodiment, the recipient names and corresponding recipient addresses correspond to one or more of the ranked potential buyers (see FIG. 7). In another embodiment, the recipient names and corresponding recipient addresses correspond to one or more of the ranked potential sellers (see FIG. 7). In another embodiment, the recipient names and corresponding recipient addresses correspond to a specific client type.

At block 1130, the processing logic populates each mailer with a recipient name and corresponding recipient address from the list selection 474.

At block 1140, the processing logic transmits each mailer. The transmission of the mailers may be a campaign 480. In one embodiment, the processing logic receives selection of a checkout button. In another embodiment, the processing logic receives payment for the fulfillment of the campaign 480 (e.g., transmission of each mailer). In another embodiment, the processing logic contacts a fulfillment shop (e.g., a third party that performs the printing and mailing) to place the order.

In one implementation, method 1110 may include the server device receiving a request including an indication of a region. The server device may transmit a response to cause the user device to display property markers (corresponding to real estate properties) including an aggregate property marker based on the indication of the region. The server device may receive a second request for campaign mailers and a selection of a subset of the real estate properties displayed via the GUI. The server device may access the data store to retrieve a template mailer and to retrieve recipient names and recipient addresses corresponding to the subset. The server device may populate each mailer with the recipient name and recipient address. The server device may transmit a second response to cause the mailers to be transmitted to the subset of real estate properties.

Figure 12A:
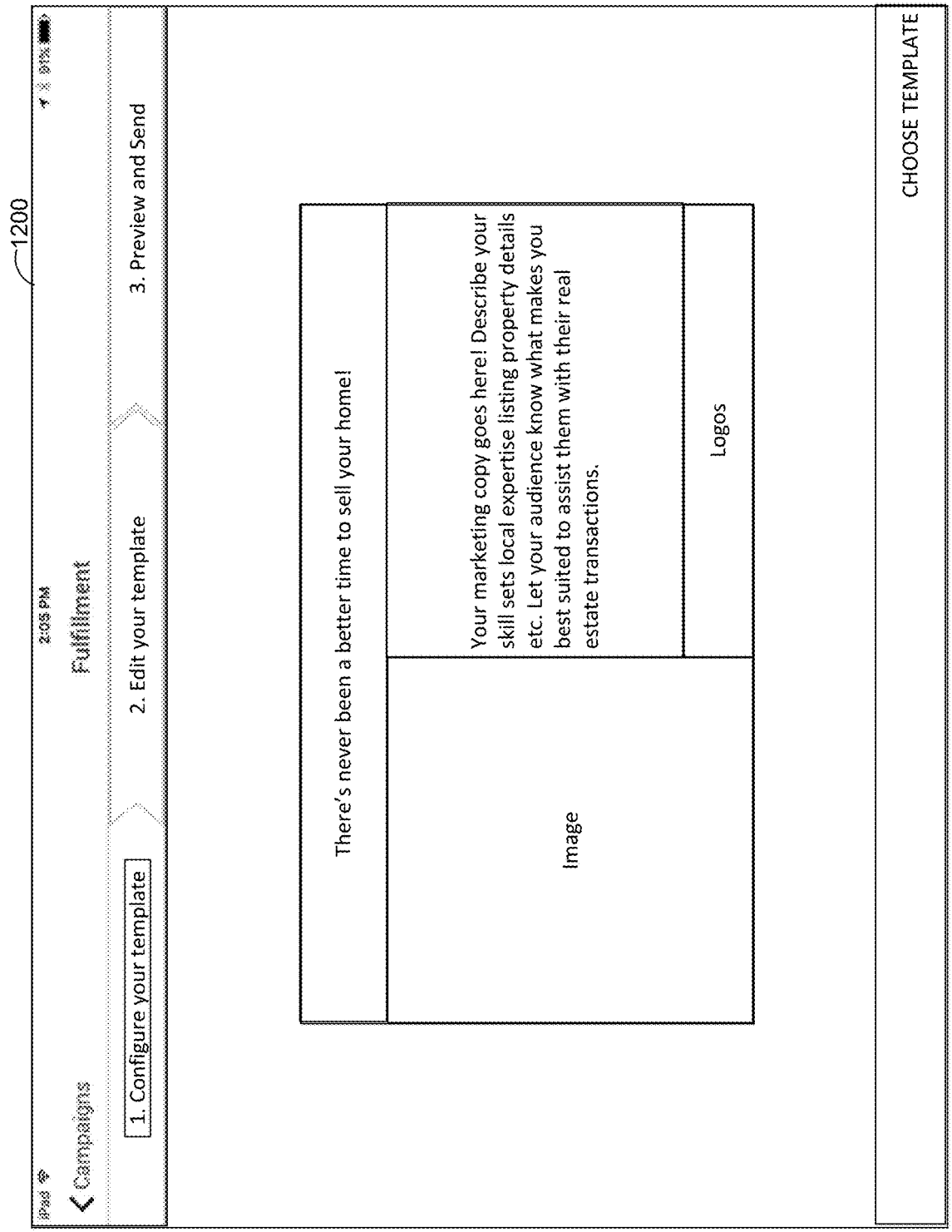
FIG. 12A is a screenshot of a view of a GUI for configuring a template for a mail campaign, in accordance with one embodiment.

FIG. 12A is a screenshot of a view of a GUI 1200 for configuring a template, in accordance with one embodiment. The user device 150 may receive selection to initiate a mailer campaign as shown in FIG. 8A to initiate method 1100. The configuration may include one or more of mailer design selection 472, layout of the template, fields of the template, and so forth.

Figure 12B:
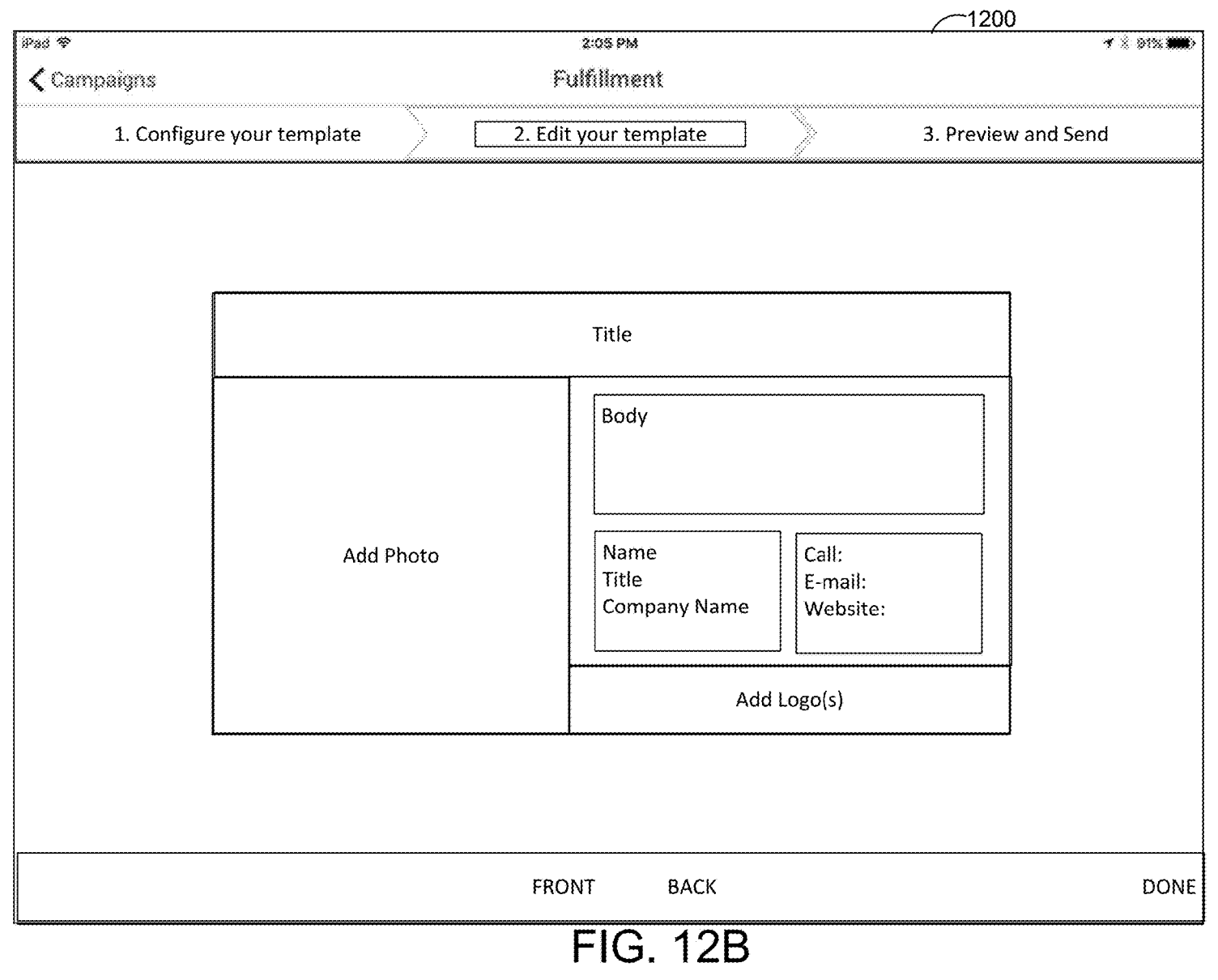

FIG. 12B is a screenshot of a view of the GUI 1200 for editing the template, in accordance with one embodiment. Edits to the template may include one or more of adding mailer design selection 472, adding a photo, adding a logo, adding a header, adding body text, adding a name, adding a title, adding a company name, adding a phone number, adding an email, adding a website, and so forth.

Figure 12C:
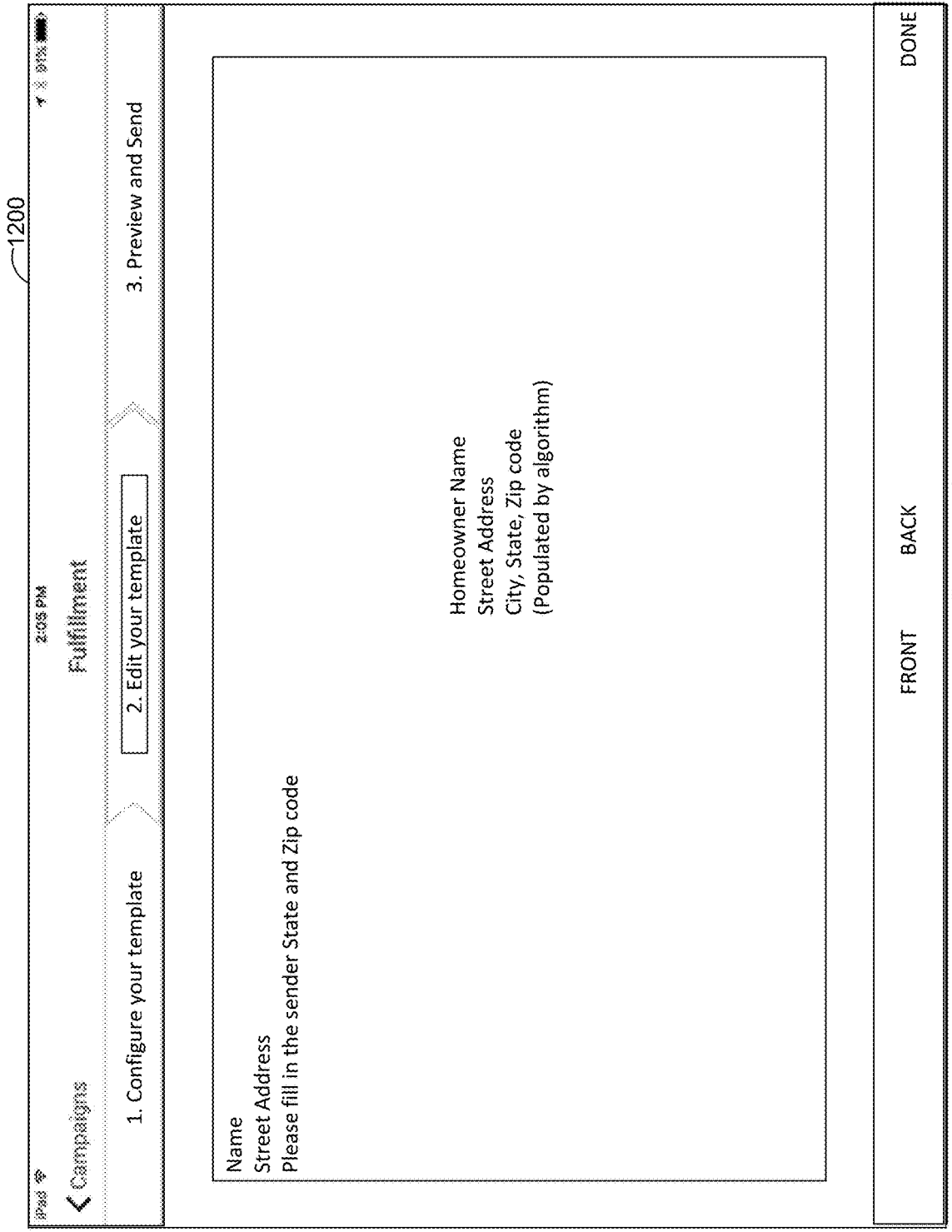
FIG. 12C is a screenshot of a view of the GUI for editing the template for a mail campaign, in accordance with another embodiment.
Figure 12D:
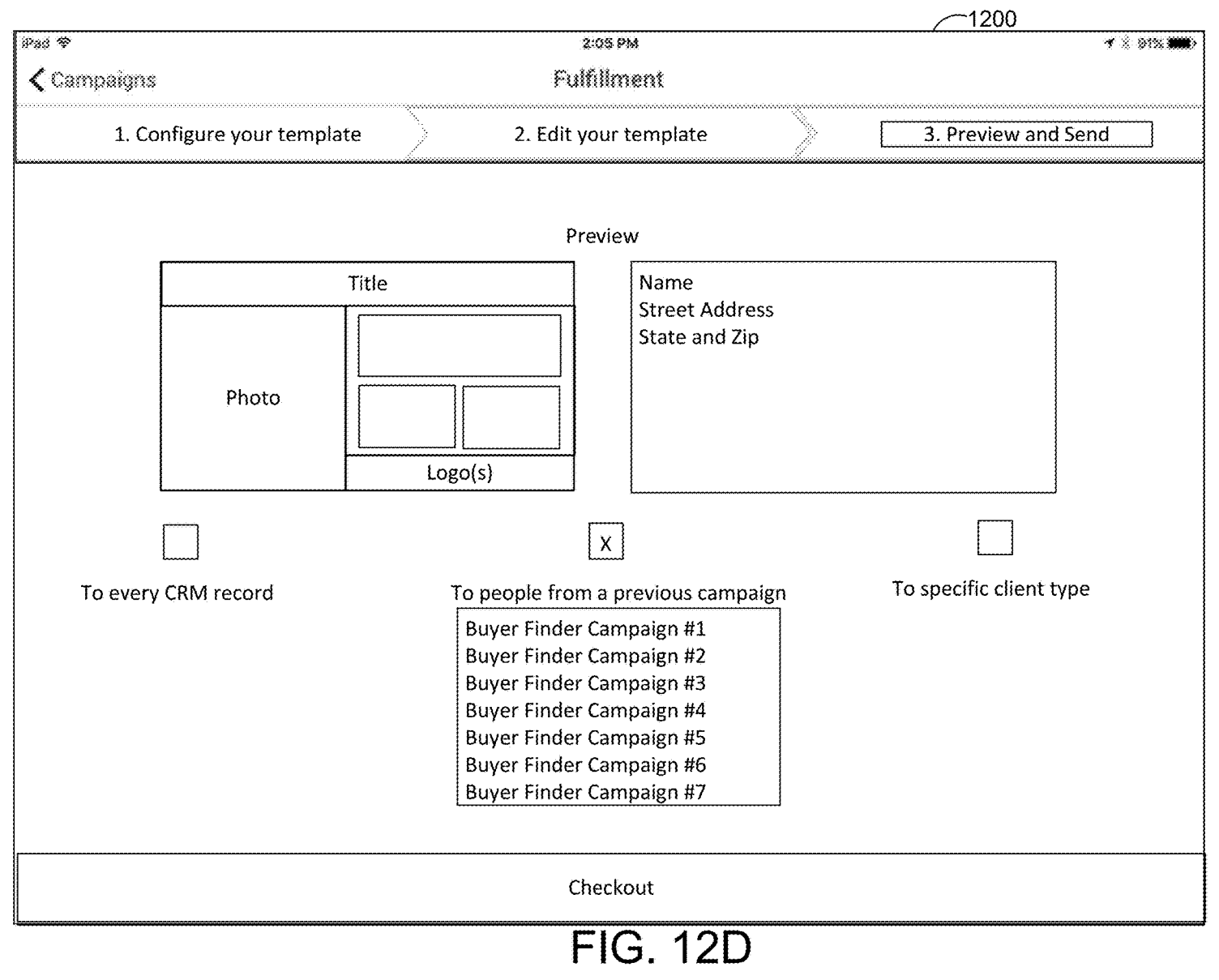

FIG. 12C is a screenshot of a view of the GUI 1200 for editing the template, in accordance with another embodiment. Edits to the template may include one or more of adding mailer design selection 472, adding a sender street address, adding a sender state, adding a sender zip, and so forth FIG. 12D is a screenshot of a view of the GUI 1200 for sending the fulfillment to a list selection 474, in accordance with one embodiment. In one embodiment, the list selection 474 includes the ranked potential buyers generated from sequence 700. In another embodiment, the list selection 474 includes the ranked potential sellers from sequence 900.

Figure 12E:
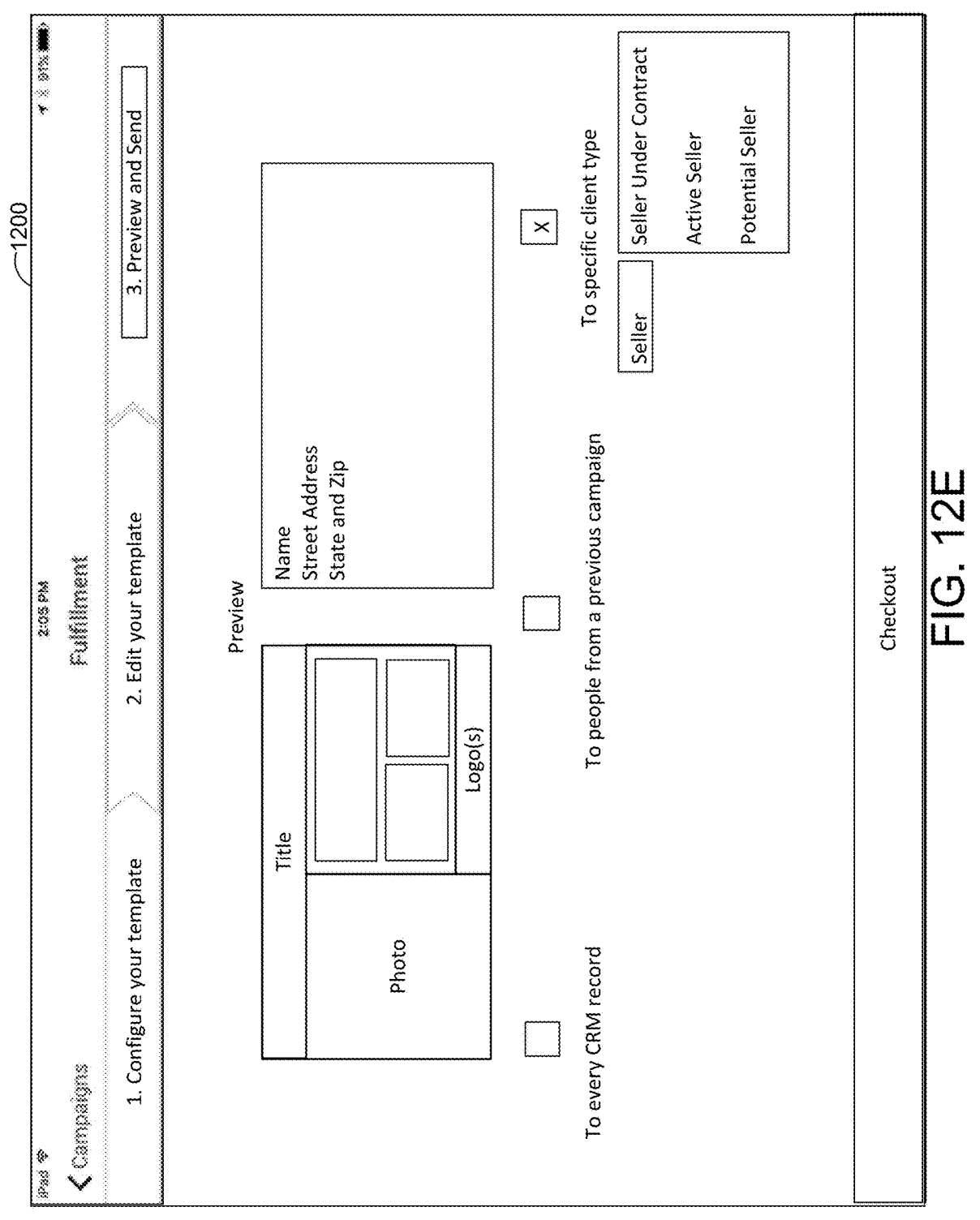

FIG. 12E is a screenshot of a view of the GUI 1200 for sending the fulfillment to a specific client type, in accordance with one embodiment. The specific client type may be one or more of a list selection 474, a seller under contract, an active seller, a potential seller, a buyer under contract, an active buyer, a potential buyer, and so forth.

Figure 13:
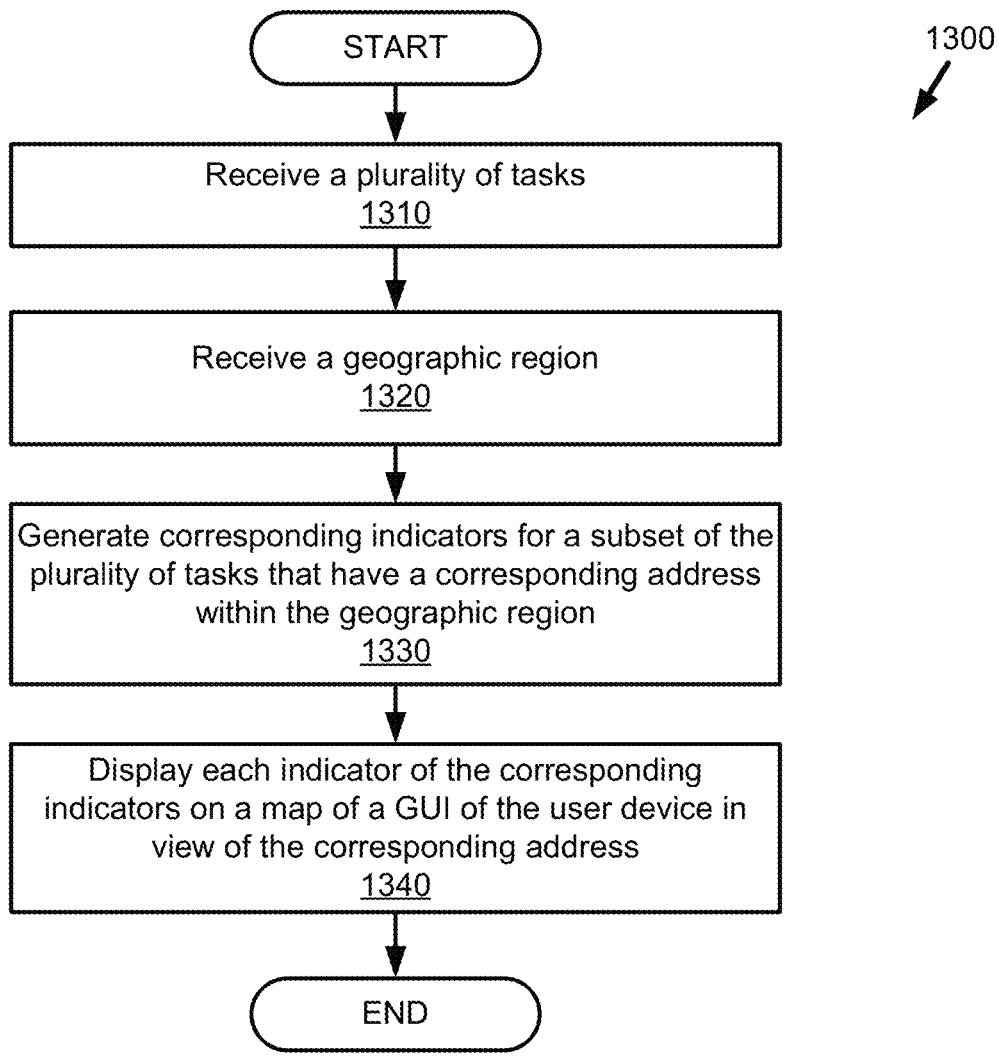
FIG. 13 illustrates a flow diagram of a method of visual CRM, in accordance with one embodiment.

FIG. 13 is a flow diagram of a method of visual CRM, in accordance with one embodiment. Method 1300 may be performed by processing logic that may include hardware (e.g., circuitry, dedicated logic, programmable logic, microcode, etc.), software (such as instructions run on a processor, a general purpose computer system, or a dedicated machine), firmware, microcode, or a combination thereof. In one embodiment, method 1300 may be performed, in part, by processor of user device 150 described above with respect to FIG. 1A or FIG. 1B. Alternatively, the method 1300 may be performed by other components of the system (e.g., server device 120) as described herein.

For simplicity of explanation, the method 1300 is depicted and described as a series of acts. However, acts in accordance with this disclosure can occur in various orders and/or concurrently and with other acts not presented and described herein. Furthermore, not all illustrated acts may be performed to implement the method 1300 in accordance with the disclosed subject matter. In addition, those skilled in the art will understand and appreciate that the method 1300 could alternatively be represented as a series of interrelated states via a state diagram or events.

Referring to FIG. 13, at 1310 the processing logic receives a plurality of tasks. In one embodiment, each task of the plurality of tasks includes a corresponding date and a corresponding address. In another embodiment, each task of the plurality of tasks includes a person. In another embodiment, each task of the plurality of tasks includes an activity (e.g., verify signatures & email to Seller's Agent, confirm pre-approval letter has been sent to Seller's Agent, give buyer house warming gift, verify signatures on referral form, confirm or add closing contacts in CRM, complete broker's submission cover page, email title with addendums, and so forth.) In another embodiment, the plurality of tasks includes one or more leads.

At block 1320, the processing logic receives a geographic region. In one embodiment, the geographic region is the geographic region surrounding the current location of the user device. In another embodiment, the geographic region is selected by the user. In another embodiment, the geographic region is viewable constraints 430.

At block 1330, the processing logic generates corresponding indicators for a subset of the plurality of tasks. In one embodiment, each task of the subset of the plurality of tasks has a corresponding address within the geographic region. In another embodiment, each task of the subset of the plurality of tasks is due within a threshold amount of time. In one embodiment, the threshold amount of time is the same day. In one embodiment, each indicator corresponds to the status of the individual (e.g., B for buyer, S for seller, star for high priority, a number for rank of priority, prices of the real estate property, and so forth).

At block 1340, the processing logic displays each indicator of the corresponding indicators on a map of a GUI of the user device in view of the corresponding address.

In one embodiment, the server device receives a geographic region and tasks. The server device may generate property markers including an aggregate property marker for the tasks. The server device filters the tasks per quadkey and generates an aggregate property marker the represents tasks within the same quadkey. The server device transmits a response to cause the user device to display, via the GUI, property markers overlaid on the map image based on corresponding quadkeys and corresponding map quadkeys.

In one embodiment, the processing logic generates a list of tasks per individual. In another embodiment, the processing logic generates a notification message to notify when an action is required. The notification message may be a PUSH. A PUSH is a notification messages automatically notify the application user when an action is required.

In one embodiment, method 1300 is a visual CRM. Through the visual CRM, users see their next business task visually using situational awareness. This information is always ready for the user with no need to dig through data. For example, after an agent meets with a new seller, the tool shows the agent every other contact or upcoming task on a moving map. In on embodiment, users can also search the maps by address and name.

The real time transaction and information management implements PUSH technology, and changes how professionals work. Instead of searching an antiquated CRM for the next task, everything the subscriber needs to act on is automatically pushed to the application screen. Method 1300 may be integrated with many Multiple Listing Services (MLSs) nationwide, and have access to over a million listings that are updated daily. This means that an agent can not only see raw data 110, but also overlay it with currently marketed properties, and provide that information instantly to their buyers and sellers. The first time an agent walks into a cul-de-sac with a buyer, holds up their phone, and instantly begins to see photos of the home inside and out, views demographics about the occupants, and learns about the neighborhood, the way the agent works will be changed forever.

In one embodiment, one or more of the plurality of tasks includes one or more leads. In one embodiment, the leads are exclusive to one user device 150A. In another embodiment, the leads are geographically selected (e.g., sent to one user device 150A that is within a threshold distance of the lead).

In another embodiment, the leads are delivered within a threshold amount of time (e.g., less than 60 seconds old, only a few seconds old, within 10 seconds of consumer inquiry, and so forth). In another embodiment, the leads are generated when a prospective consumer calls or texts for automated information (e.g., about a real estate property). In another embodiment, a PUSH notice is sent to the user device 150A when a lead is generated.

In one embodiment, a lead is offered via the user device 150A and the user may purchase the lead or pass on the purchase. In another embodiment, an auto-purchase module also allows users to purchase a number of leads as they become available without manual approval. Leads may come from multiple sources and are preselected by quality, geographic boundary, and type of lead. The leads are viewable using situational awareness, and are also scrubbed in multiple ways to eliminate false leads, unqualified leads, and poor quality leads.

In another embodiment, the method 1300 includes a lead follow-up service that sends ongoing soft sell messages to leads received in the system. The ongoing messages may be configured by the agent and/or lender, and may be stopped at any time by the agent or lender, or by the prospect. In another embodiment, method 1300 tracks leads from inception to closed loan.

In one embodiment, the leads are scrubbed for quality. The user will have an educated view of the prospect based on an analysis of raw data 110. An example might be knowing the person has had a recent foreclosure, if their income has dropped, etc.

User device 150 may generate a map and task list. A user may use the map and task list to help manage clients and stay in touch with a sphere of influence, allowing for taking care of new and existing clients, along with getting referrals for more clients and business.

For example, a user may use the map on user device 150 to travel to the home of a new listing—the address and tasks show up for that listing in two different ways—geographically on the map showing the location of the listing and with a task view. When the user arrives at the home, the user will easily be able to go through the items he needs to do to get the home listed (e.g., sign paperwork, place the keybox and sign, take pictures, etc.). With each item being completed, it is checked off of the task list and recorded as the date that it is done—there is no need to worry any more about whether items have been completed or not.

Next, the user may have 30 minutes before the next appointment to show homes to a new buyer. The user may use the map to be able to quickly look up those listed in the sphere of influence and do a quick drop by just to say hello and see if there is anything that they need. They let him know that they have a friend who is looking to sell their home and ask the user if the user would be willing to help them out. The user enters the contact information in the CRM and adds them as a potential seller. When the user gets back to the office, the user will be able to quickly find out what he needs to do to get them started in selling their home.

The user could then use the map to find the location of the next appointment with buyers. The user and the buyers go from home to home and are able to see that there are a couple of other homes that they had not noticed on the map that were just listed. On the map, the user is able to quickly pull up the listing of the new home listings and has the details of what that home has to offer. The buyers are excited and want to see one of the homes that just came on the market. The user then gets the information from the listing in the tool, contacts the listing agent, and is able to take the buyers through the home in the next 30 minutes and they love the home. They make an offer on the home. The user then contacts the Loan Officer (a partner in the tool) and the user sends the document of a pre-approval letter, allowing for the user to send the letter and offer to the listing agent.

Getting back to the office, the user gets confirmation that the offer has been accepted and he changes the status on the buyers to show under contract and is able to share the documents with the Loan Officer (a partner in the tool). The user will easily mark off each item on the checklist of the buyer under contract to get the transaction moving smoothly and have the buyers be well taken care of.

On the way home, the user has a few extra minutes and wants to see if there are any tasks that need to be completed. The user pulls up his map and sees that he has a task to pick up a key of from a seller that the user is listing an investment property for the next day.

The user arrives home being able to rest easy, knowing that the user has taken care of the clients and the sphere of influence and his business is growing.

Figure 14A:
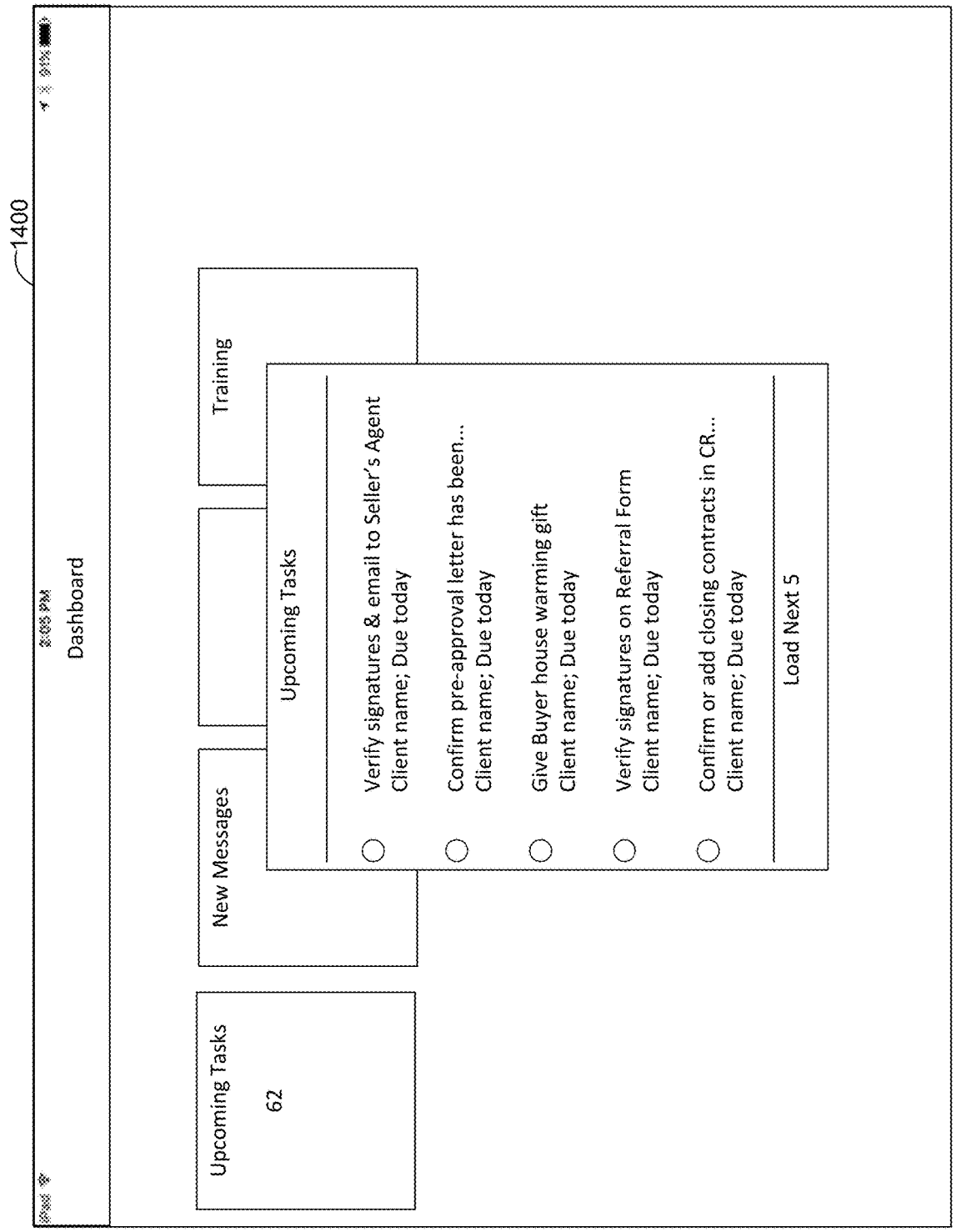
FIG. 14A is a screenshot of a view of a GUI for displaying upcoming tasks, in accordance with one embodiment.

FIG. 14A is a screenshot of a view of a GUI 1400 for displaying upcoming tasks, in accordance with one embodiment. In one embodiment, the tasks are listed by tasks that are due within a threshold amount of time (e.g., tasks due today). In another embodiment, the tasks are listed per consumer (e.g., a potential buyer, a potential seller, and so forth).

Figure 14B:
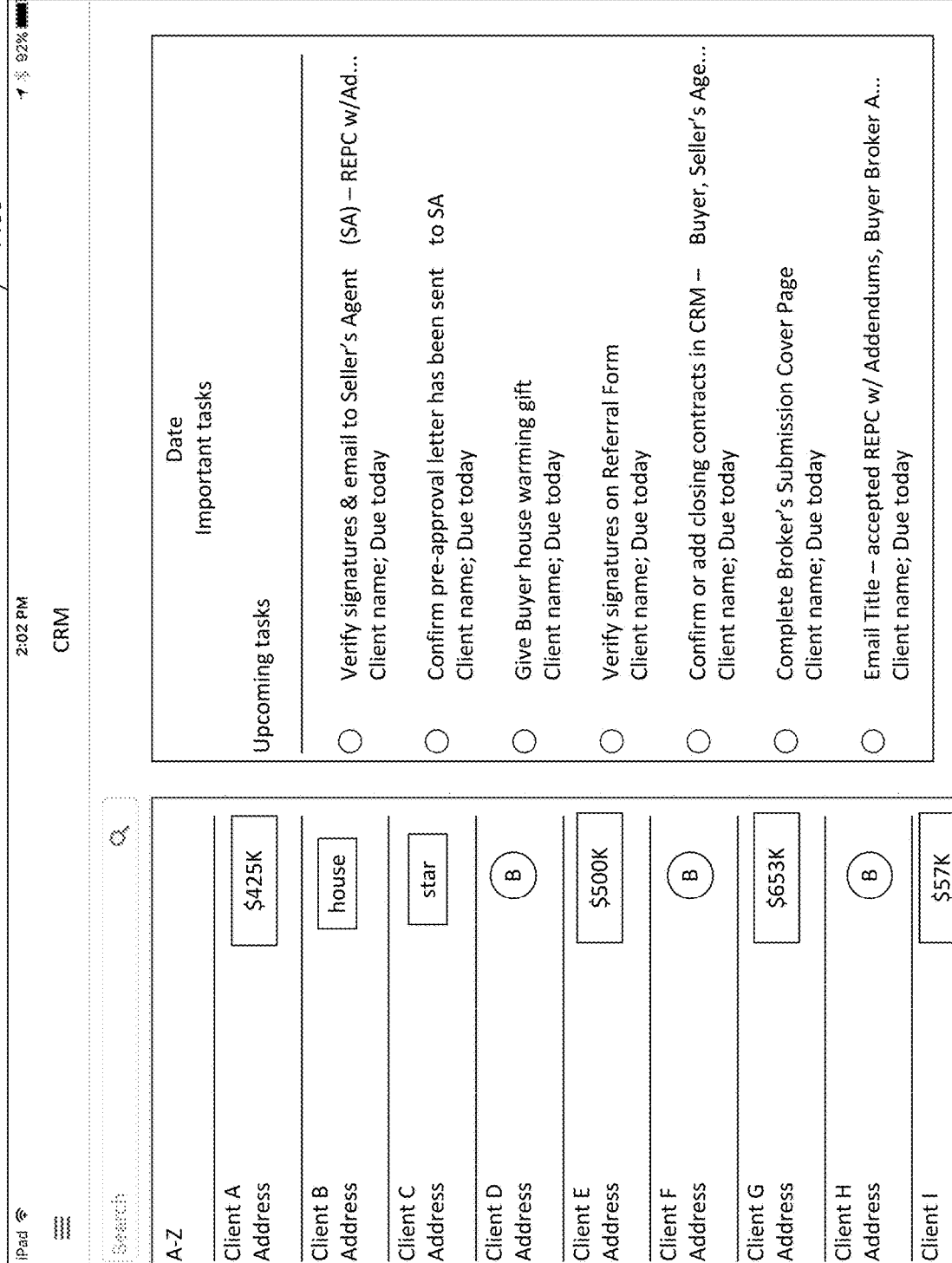
FIG. 14B is a screenshot of a view of the GUI for displaying upcoming tasks by day, in accordance with one embodiment.

FIG. 14B is a screenshot of a view of the GUI 1400 for displaying upcoming tasks by day, in accordance with one embodiment. In one embodiment, user device 150 displays a selectable list of consumers (e.g., by clicking on a consumer, a list of tasks specific to the consumer may be listed).

Figure 14C:
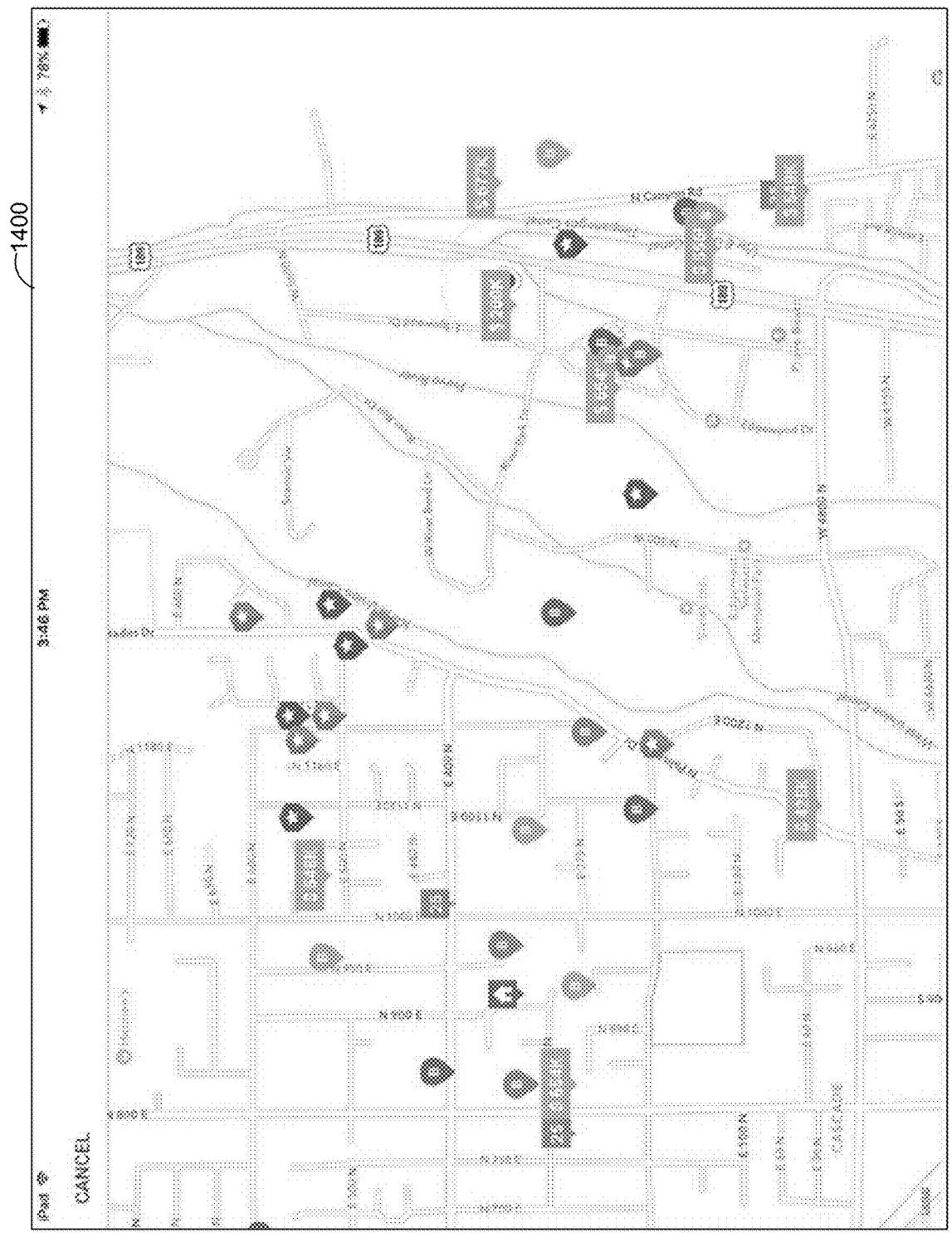
FIG. 14C is a screenshot of a view of the GUI for displaying upcoming tasks on a map, in accordance with one embodiment.

FIG. 14C is a screenshot of a view of the GUI 1400 for displaying upcoming tasks on a map, in accordance with one embodiment. A plurality of indicators is displayed that correspond to a task in view of the corresponding address. In one embodiment, the tasks may be assigned the quadkey of the corresponding real estate property and the tasks may be aggregated according to tasks with the same truncated quadkey in view of the zoom level. In another embodiment, the tasks may not be aggregated. In one embodiment, the tasks may be assigned to categories by adding one or more bit masks to the quadkeys so that the tasks can be filtered.

Figure 14D:
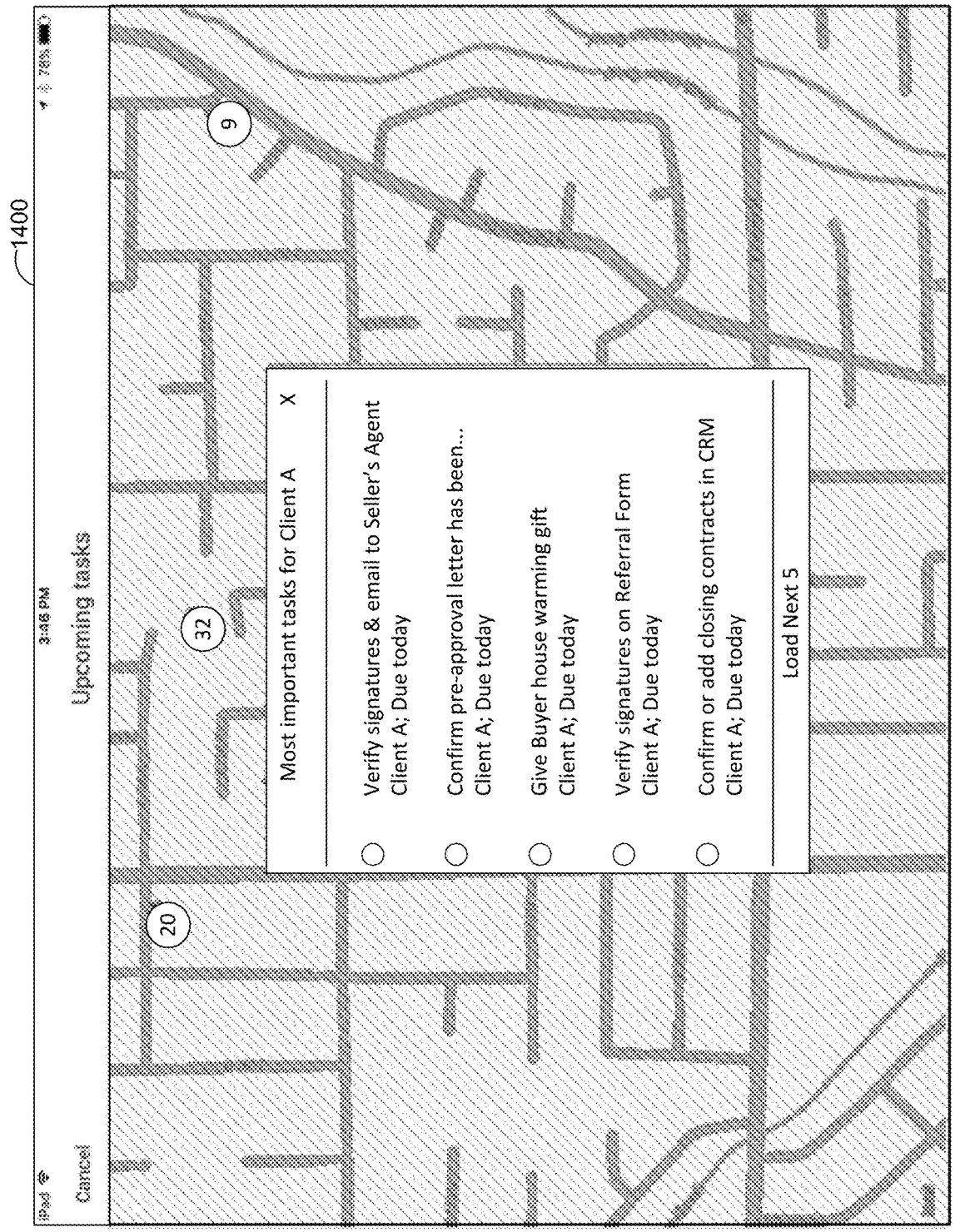
FIG. 14D is a screenshot of a view of the GUI for displaying upcoming tasks by client, in accordance with one embodiment.

FIG. 14D is a screenshot of a view of the GUI 1400 for displaying upcoming tasks by client, in accordance with one embodiment. In one embodiment, a list of most important tasks (e.g., most urgent, due soonest, non-optional, and so forth) for a consumer may be displayed.

In one embodiment, application 160 (e.g., CRM client application 160A, consumer application 160N, and so forth) includes additional services such as one or more of a pre-list tool, vendor tool, a learning tool, or a CRM enhancements tool.

In one embodiment, the application 160 includes a communication tool. Ultimately building relationships that last is important for long-term success. And, not only relationships with buyers and sellers, but loyalty between agents and lenders. By working together in the tool, agents and lenders communicate efficiently, close transactions faster, and create a team effort that leads to bi-directional success. The communication tool may provide multiple party messaging and template emails. The communication tool may allow a plurality of individuals to communicate via the communication tool, email, text, and so forth, all through the same communication tool. For example, a user may send, via the communication tool, a message to an email address, a phone number (e.g., via text), and a second user of the communication tool. The user may receive, via the communication tool, a message from an email address, a message from a phone number (e.g., via text), and a message from a second user of the communication tool.

The built-in communications attaches every action to a transaction. Whether a document is being shared with a quick in-app photo, a message is being sent, or an automated action is managed by the application, the information is connected to a transaction and all parties involved. This information can be accessed quickly and easily.

In another embodiment, the application 160 includes a pre-listing tool to allow an agent to "pre-list" a property during their listing presentation. The listing information is pushed to other individuals (e.g., agents in the same brokerage as the agent, users of the application 160, and so forth) to give them an advantage (e.g., an in-house advantage, an in-application advantage) prior to posting the listing on the MLS.

In another embodiment, the application 160 includes a reseller system that allows resellers to view the sales, commission amounts, and historical data in real time. Tier based commissions may be configured. The feature greatly enhances our sales effort and takes commission work off our accounting department.

In another embodiment, the application 160 includes a vendor program that allows vendors to advertise through the application 160. The advertising will be tied to geographic boundaries and directly to lender or brokerage office locations. This will not be an intrusive service, but rather an invitation for special offers.

The vendor program allows vendors to efficiently market to potential home buyers and sellers, and to past clients of agents and lenders. Vendors choose a geographic boundary, and their services are offered with every service the disclosure provides. Vendors will range from large companies like home improvement stores to locally owned service businesses.

At the same time, industry vendors can market their products and services to a much broader market spectrum—companies, MLOs, REALTORS®, and consumers alike.

In another embodiment, the application 160 includes a teaching module to provide industry training for agents and lenders. Current industry articles will be shared. Professional speakers, trainers, and coaches will be contracted directly or as resellers to teach agents and lenders how to effectively run and grow their businesses using the application 160.

In another embodiment, the application 160 includes CRM enhancements that include transaction task list templates (editable), sphere of influence templates (editable), multiple party attachments to transactions, attaching alternate lender to transaction, PUSH task lists, and milestones.

Figure 15:
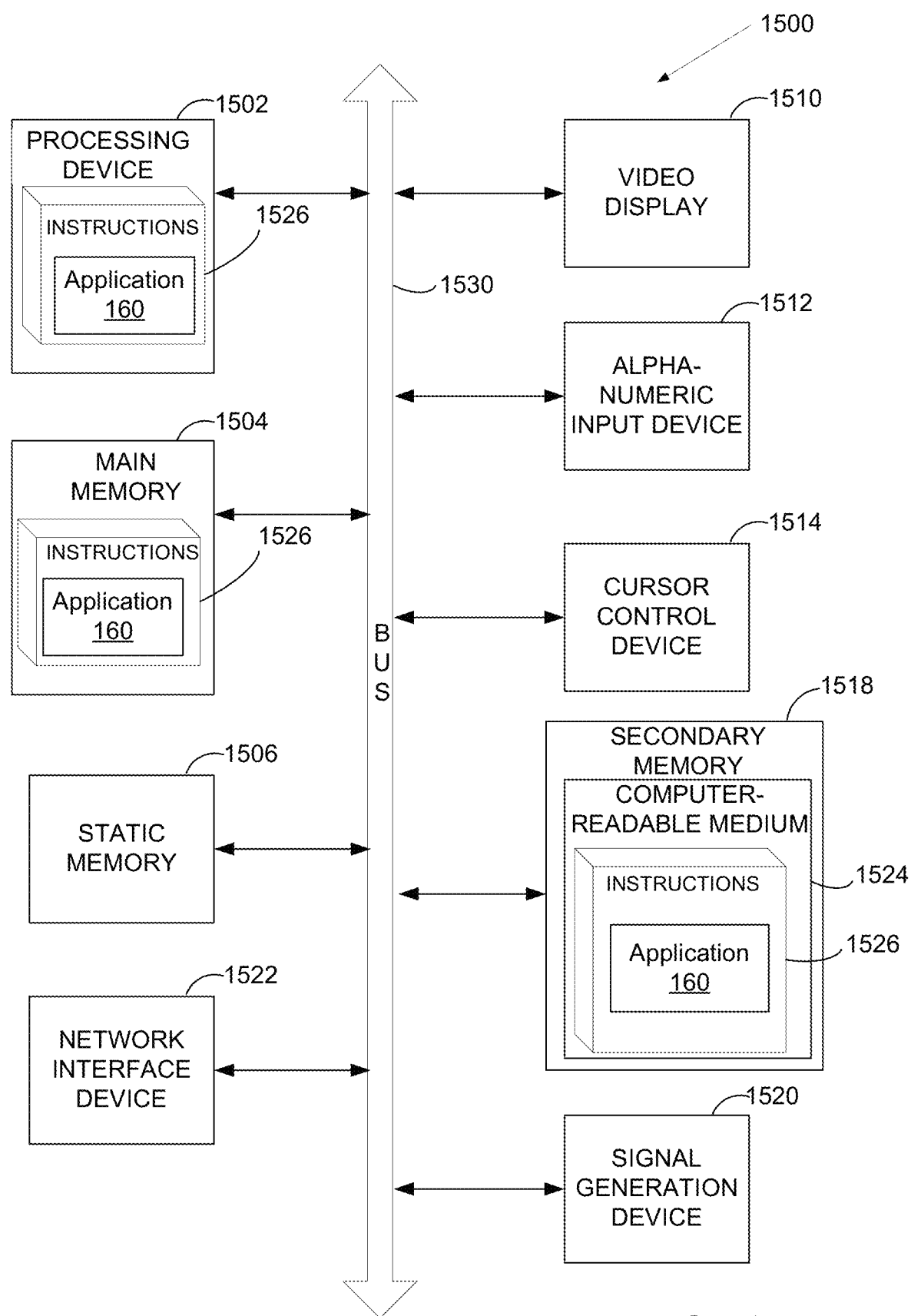
FIG. 15 illustrates a diagrammatic representation of a machine in the exemplary form of a computing system within which a set of instructions, for causing the machine to perform any one or more of the methodologies described herein, may be executed.

FIG. 15 illustrates a diagrammatic representation of a machine in the exemplary form of a computing system 1500 within which a set of instructions, for causing the machine to perform any one or more of the methodologies discussed herein, may be executed. Within the computer system 500 is a set of instructions for causing the machine to perform any one or more of the methodologies discussed herein. In alternative embodiments, the machine may be connected (e.g., networked) to other machines in a LAN, an intranet, an extranet, or the Internet. The machine can be a host in a cloud, a cloud provider system, a cloud controller or any other machine. The machine can operate in the capacity of a server or a client machine in a client-server network environment, or as a peer machine in a peer-to-peer (or distributed) network environment. The machine may be a personal computer (PC), a tablet PC, a console device or set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 500 includes a processing device 502, a main memory 504 (e.g., read-only memory (ROM), flash memory, dynamic random access memory (DRAM) such as synchronous DRAM (SDRAM) or DRAM (RDRAM), etc.), a static memory 506 (e.g., flash memory, static random access memory (SRAM), etc.), and a secondary memory 518 (e.g., a data storage device in the form of a drive unit, which may include fixed or removable computer-readable storage medium), which communicate with each other via a bus 530.

Processing device 502 represents one or more general-purpose processing devices such as a microprocessor, central processing unit, or the like. More particularly, the processing device 502 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. Processing device 502 is configured to execute the instructions 526 for performing the operations and steps discussed herein.

The computer system 500 may further include a network interface device 522. The computer system 500 also may include a video display unit 510 (e.g., a liquid crystal display (LCD) or a cathode ray tube (CRT)) connected to the computer system through a graphics port and graphics chipset, an alphanumeric input device 512 (e.g., a keyboard), a cursor control device 514 (e.g., a mouse), and a signal generation device 520 (e.g., a speaker).

The secondary memory 518 may include a machine-readable storage medium (or more specifically a computer-readable storage medium) 524 on which is stored one or more sets of instructions 526 embodying any one or more of the methodologies or functions described herein. In one embodiment, the instructions 526 include instructions for the Application 160 as described herein. The instructions 526 may also reside, completely or at least partially, within the main memory 504 and/or within the processing device 502 during execution thereof by the computer system 500, the main memory 504 and the processing device 502 also constituting machine-readable storage media.

The computer-readable storage medium 524 may also be used to store the instructions 526 persistently. While the computer-readable storage medium 524 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media.

The instructions 526, components and other features described herein can be implemented as discrete hardware components or integrated in the functionality of hardware components such as ASICS, FPGAs, DSPs or similar devices. In addition, the instructions 526 can be implemented as firmware or functional circuitry within hardware devices. Further, the instructions 526 can be implemented in any combination hardware devices and software components.

In the above description, numerous details are set forth. It will be apparent, however, to one of ordinary skill in the art having the benefit of this disclosure, that embodiments of the present invention may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving," "transmitting," "displaying," "constraining," "eliminating," "increasing," "populating," "transmitting," "generating," "relating," "removing," "identifying," "assigning," "creating," "compiling," "correcting," "standardizing," "calculating," "normalizing," "monitoring," "storing," "providing," "selecting," "obtaining," "receiving," "deleting," "executing," "requesting," "communicating," or the like, refer to the actions and processes of a computing system, or similar electronic computing device, that manipulates and transforms data represented as physical (e.g., electronic) quantities within the computing system's registers and memories into other data similarly represented as physical quantities within the computing system memories or registers or other such information storage, transmission or display devices.

The words "example" or "exemplary" are used herein to mean serving as an example, instance or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such.

Embodiments descried herein may also relate to an apparatus for performing the operations herein. This apparatus may be specially constructed for the required purposes, or it may comprise a general-purpose computer selectively activated or reconfigured by a computer program stored in the computer. Such a computer program may be stored in a non-transitory computer-readable storage medium (e.g., non-transitory machine-readable storage medium), such as, but not limited to, any type of disk including floppy disks, optical disks, CD-ROMs and magnetic-optical disks, read-only memories (ROMs), random access memories (RAMs), EPROMs, EEPROMs, magnetic or optical cards, flash memory, or any type of media suitable for storing electronic instructions. The term "computer-readable storage medium" should be taken to include a single medium or multiple media (e.g., a centralized or distributed database and/or associated caches and servers) that store the one or more sets of instructions. The term "computer-readable medium" shall also be taken to include any medium that is capable of storing, encoding or carrying a set of instructions for execution by the machine and that causes the machine to perform any one or more of the methodologies of the present embodiments. The term "computer-readable storage medium" shall accordingly be taken to include, but not be limited to, solid-state memories, optical media, magnetic media, any medium that is capable of storing a set of instructions for execution by the machine and that causes the machine to perform any one or more of the methodologies of the present embodiments.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present embodiments are not described with reference to any particular programming language. It will be appreciated that a variety of programming languages may be used to implement the teachings of the embodiments as described herein.

The above description sets forth numerous specific details such as examples of specific systems, components, methods and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth above are merely exemplary. Particular implementations may vary from these exemplary details and still be contemplated to be within the scope of the present invention.

It is to be understood that the above description is intended to be illustrative and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A server device to:
receive, from a user device, a request to display a map image via a graphical user interface (GUI) of the user device, the request comprising an indication of a zoom level, the map image being divided into a plurality of map quadkeys;
access a data store to retrieve a plurality of property data items corresponding to the map image, each of the plurality of property data items corresponding to a real estate property of a plurality of real estate properties;
generate and assign, for each of the plurality of property data items, a property quadkey to obtain a plurality of property quadkeys;
filter, using a first map quadkey of the plurality of map quadkeys, the plurality of property data items to obtain two or more property data items of the plurality of property data items, the two or more property data items corresponding to two or more real estate properties of the plurality of real estate properties;
aggregate the two or more property data items into an aggregate property marker, the aggregate property marker identifying a location of the two or more real estate properties;
generate an aggregate quadkey for the aggregate property marker, wherein the aggregate quadkey is a truncated portion of corresponding property quadkeys of the two or more property data items; and
transmit, to the user device, a response to cause the user device to display, via the GUI, the aggregate property marker overlaid on the map image based on the aggregate quadkey and the first map quadkey;
wherein the request further comprises a second indication of a geographic region and a plurality of tasks, each of the plurality of tasks comprising a corresponding deadline and a corresponding address;
wherein the server device is to filter the plurality of tasks to obtain two or more of the plurality of tasks that have corresponding addresses within the geographic region and that have corresponding deadlines within a threshold amount of time;
wherein the server is to generate one or more property markers for the two or more of the plurality of tasks, the one or more property markers comprising the aggregate property marker; and
wherein the response is to cause the user device to display, via the GUI, the one or more property markers overlaid on the map image based on corresponding property quadkeys and corresponding map quadkeys.

2. The server device of claim 1, wherein the server device is further to:
receive, from the user device, a second request to display a second map image via the GUI of the user device, the second request comprising a second indication of a second zoom level, the second map image being divided into a second plurality of map quadkeys;
filter, using a second map quadkey of the second plurality of map quadkeys, the plurality of property data items to obtain three or more property data items of the plurality of property data items, the three or more property data items corresponding to three or more real estate properties of the plurality of real estate properties, the three or more property data items comprising the two or more property data items and one or more additional property data items;
aggregate the three or more property data items into the aggregate property marker, the aggregate property marker identifying a second location of the three or more real estate properties;
generate a second aggregate quadkey for the aggregate property marker, wherein the second aggregate quadkey is a second truncated portion of corresponding property quadkeys of the three or more property data items; and
transmit, to the user device, a second response to cause the user device to display, via the GUI, the aggregate property marker overlaid on the second map image based on the second aggregate quadkey and the second map quadkey.

3. The server device of claim 2, wherein:
the second aggregate quadkey and the second map quadkey correspond to a second level of detail;
the aggregate quadkey and the first map quadkey correspond to a first level of detail that is greater than the second level of detail; and
the plurality of property quadkeys correspond to a third level of detail that is greater than the first level of detail.

4. The server device of claim 1, wherein the server device is further to:
receive, from the user device, a third request to display a third map image via the GUI of the user device, the third request comprising a third indication of a third zoom level, the third map image being divided into a third plurality of map quadkeys;
filter, using a third map quadkey of the third plurality of map quadkeys, the plurality of property data items to obtain a first property data item of the two or more property data items, the first property data item corresponding to a first real estate property of the two or more real estate properties;
filter, using a fourth map quadkey of the third plurality of map quadkeys, the plurality of property data items to obtain a second property data item of the two or more property data items, the second property data item corresponding to a second real estate property of the two or more real estate properties;
de-aggregate the two or more property data items into a first property marker and a second property marker, the first property marker identifying a third location of the first real estate property and the second property marker identifying a fourth location of the second real estate property;
identify a third property quadkey for the first property marker and a fourth property quadkey for the second property marker; and
transmit, to the user device, a third response to cause the user device to display, via the GUI, the first property marker and the second property marker overlaid on the third map image based on the third property quadkey, the fourth property quadkey, the third map quadkey, and the fourth map quadkey.

5. The server device of claim 1, wherein:
the request further comprises visual constraints of the user device and a second indication of a geographic area;
the map image is based on the indication of the zoom level, the second indication of the geographical area, and the visual constraints; and a level of detail of the first map quadkey is based on the zoom level and the visual constraints.

6. The server device of claim 1, wherein the server device is to:
receive, from the user device, a fourth request to display the map image via the GUI of the user device, the fourth request comprising an active occupant request;
access the data store to retrieve a plurality of buyer records and a plurality of property records;
match the plurality of buyer records with the plurality of property records to generate, for each of the plurality of real estate properties, corresponding occupant data comprising a plurality of occupants and a corresponding event data for each of the occupants; and
identify, for each of the plurality of real estate properties, a corresponding active occupant of the plurality of occupants that has the corresponding event date that is most recent; and
transmit, to the user device a fourth response to cause the user device to display, via the GUI, a third indication of the corresponding active occupant for one or more of the plurality of real estate properties.

7. The server device of claim 1, wherein:
the request further comprises an address of a seller real estate property and a maximum number of results; and
the response is to cause the user device to display, via the GUI, one or more property markers overlaid on the map image based on corresponding property quadkeys and corresponding map quadkeys, the one or more property markers corresponding to a ranked list of potential buyers up to the maximum number of results, the one or more property markers comprising the aggregate property marker.

8. The server device of claim 1, wherein:
the request further comprises a second indication of a region, wherein real estate properties are located in the region; and
the response is to cause the user device to display, via the GUI, one or more property markers overlaid on the map image based on corresponding property quadkeys and corresponding map quadkeys, the one or more property markers corresponding to a ranked list of potential sellers corresponding to two or more real estate properties of the real estate properties located in the region, the one or more property markers comprising the aggregate property marker.

9. The server device of claim 1, wherein:
the request further comprises a second indication of a region;
the response is to cause the user device to display one or more property markers comprising the aggregate property marker based on the second indication of the region, the one or more property markers corresponding to the plurality of real estate properties; and
the server device is to:
receive, from the user device, a second request for campaign mailers and a selection of a subset of the plurality of real estate properties;
access the data store to retrieve a template mailer for producing a plurality of mailers;
access the data store to retrieve a plurality of recipient names and a plurality of corresponding recipient addresses corresponding to the subset of the plurality of real estate properties;
populate each mailer of the plurality of mailers with a recipient name of the plurality of recipient names and a corresponding recipient address of the plurality of recipient addresses; and transmit a second response to cause the plurality of mailers to be transmitted to the subset of the plurality of real estate properties.

10. A non-transitory machine-readable storage medium storing instructions which, when executed cause a processing device of a server device to perform operations comprising:

receiving, from a user device, a request to display a map image via a graphical user interface (GUI) of the user device, the request comprising an indication of a zoom level, the map image being divided into a plurality of map quadkeys;

accessing a data store to retrieve a plurality of property data items corresponding to the map image, each of the plurality of property data items corresponding to a real estate property of a plurality of real estate properties;

generating and assign, for each of the plurality of property data items, a property quadkey to obtain a plurality of property quadkeys;

filtering, using a first map quadkey of the plurality of map quadkeys, the plurality of property data items to obtain two or more property data items of the plurality of property data items, the two or more property data items corresponding to two or more real estate properties of the plurality of real estate properties;

aggregating the two or more property data items into an aggregate property marker, the aggregate property marker identifying a location of the two or more real estate properties;

generating, by the processing device, an aggregate quadkey for the aggregate property marker, wherein the aggregate quadkey is a truncated portion of corresponding property quadkeys of the two or more property data items; and transmitting, to the user device, a response to cause the user device to display, via the GUI, the aggregate property marker overlaid on the map image based on the aggregate quadkey and the first map quadkey;

wherein the request further comprises a second indication of a geographic region and a plurality of tasks, each of the plurality of tasks comprising a corresponding deadline and a corresponding address;

wherein the server device is to filter the plurality of tasks to obtain two or more of the plurality of tasks that have corresponding addresses within the geographic region and that have corresponding deadlines within a threshold amount of time;

wherein the server is to generate one or more property markers for the two or more of the plurality of tasks, the one or more property markers comprising the aggregate property marker; and wherein the response is to cause the user device to display, via the GUI, the one or more property markers overlaid on the map image based on corresponding property quadkeys and corresponding map quadkeys.

11. The non-transitory machine-readable storage medium claim 10, wherein the processing device is to perform further operations comprising:

receiving, from the user device, a second request to display a second map image via the GUI of the user device, the second request comprising a second indication of a second zoom level, the second map image being divided into a second plurality of map quadkeys;

filtering, using a second map quadkey of the second plurality of map quadkeys, the plurality of property data items to obtain three or more property data items of the plurality of property data items, the three or more property data items corresponding to three or more real estate properties of the plurality of real estate properties, the three or more property data items comprising the two or more property data items and one or more additional property data items;

aggregating the three or more property data items into the aggregate property marker, the aggregate property marker identifying a second location of the three or more real estate properties;

generating a second aggregate quadkey for the aggregate property marker, wherein the second aggregate quadkey is a second truncated portion of corresponding property quadkeys of the three or more property data items; and transmiting, to the user device, a second response to cause the user device to display, via the GUI, the aggregate property marker overlaid on the second map image based on the second aggregate quadkey and the second map quadkey.

12. The non-transitory machine-readable storage medium claim 10, wherein the processing device is to perform further operations comprising:

receiving, from the user device, a third request to display a third map image via the GUI of the user device, the third request comprising a third indication of a third zoom level, the third map image being divided into a third plurality of map quadkeys;

filtering, using a third map quadkey of the third plurality of map quadkeys, the plurality of property data items to obtain a first property data item of the two or more property data items, the first property data item corresponding to a first real estate property of the two or more real estate properties;

filtering, using a fourth map quadkey of the third plurality of map quadkeys, the plurality of property data items to obtain a second property data item of the two or more property data items, the second property data item corresponding to a second real estate property of the two or more real estate properties;

de-aggregating the two or more property data items into a first property marker and a second property marker, the first property marker identifying a third location of the first real estate property and the second property marker identifying a fourth location of the second real estate property;

identifying a third property quadkey for the first property marker and a fourth property quadkey for the second property marker; and transmiting, to the user device, a third response to cause the user device to display, via the GUI, the first property marker and the second property marker overlaid on the third map image based on the third property quadkey, the fourth property quadkey, the third map quadkey, and the fourth map quadkey.

13. The non-transitory machine-readable storage medium claim 10, wherein the processing device is to perform further operations comprising:

receiving, from the user device, a fourth request to display the map image via the GUI of the user device, the fourth request comprising an active occupant request;

accessing the data store to retrieve a plurality of buyer records and a plurality of property records;

matching the plurality of buyer records with the plurality of property records to generate, for each of the plurality of real estate properties, corresponding occupant data comprising a plurality of occupants and a corresponding event data for each of the occupants; and identifying, for each of the plurality of real estate properties, a corresponding active occupant of the plurality of occupants that has the corresponding event date that is most recent; and transmitting, to the user device a fourth response to cause the user device to display, via the GUI, a third indication of the corresponding active occupant for one or more of the plurality of real estate properties.

14. The non-transitory machine-readable storage medium claim 10, wherein:

the request further comprises an address of a seller real estate property and a maximum number of results; and the response is to cause the user device to display, via the GUI, one or more property markers overlaid on the map image based on corresponding property quadkeys and corresponding map quadkeys, the one or more property markers corresponding to a ranked list of potential buyers up to the maximum number of results, the one or more property markers comprising the aggregate property marker.

15. A method comprising:

receiving, from a user device, a request to display a map image via a graphical user interface (GUI) of the user device, the request comprising an indication of a zoom level, the map image being divided into a plurality of map quadkeys;

accessing a data store to retrieve a plurality of property data items corresponding to the map image, each of the plurality of property data items corresponding to a real estate property of a plurality of real estate properties;

generating and assign, for each of the plurality of property data items, a property quadkey to obtain a plurality of property quadkeys;

filtering, using a first map quadkey of the plurality of map quadkeys, the plurality of property data items to obtain two or more property data items of the plurality of property data items, the two or more property data items corresponding to two or more real estate properties of the plurality of real estate properties;

aggregating the two or more property data items into an aggregate property marker, the aggregate property marker identifying a location of the two or more real estate properties;

generating an aggregate quadkey for the aggregate property marker, wherein the aggregate quadkey is a truncated portion of corresponding property quadkeys of the two or more property data items; and transmitting, to the user device, a response to cause the user device to display, via the GUI, the aggregate property marker overlaid on the map image based on the aggregate quadkey and the first map quadkey;

wherein the request further comprises a second indication of a geographic region and a plurality of tasks, each of the plurality of tasks comprising a corresponding deadline and a corresponding address;

wherein the server device is to filter the plurality of tasks to obtain two or more of the plurality of tasks that have corresponding addresses within the geographic region and that have corresponding deadlines within a threshold amount of time;

wherein the server is to generate one or more property markers for the two or more of the plurality of tasks, the one or more property markers comprising the aggregate property marker; and wherein the response is to cause the user device to display, via the GUI, the one or more property markers overlaid on the map image based on corresponding property quadkeys and corresponding map quadkeys.

16. The method of claim 15 further comprising:

receiving, from the user device, a second request to display a second map image via the GUI of the user device, the second request comprising a second indication of a second zoom level, the second map image being divided into a second plurality of map quadkeys;

filtering, using a second map quadkey of the second plurality of map quadkeys, the plurality of property data items to obtain three or more property data items of the plurality of property data items, the three or more property data items corresponding to three or more real estate properties of the plurality of real estate properties, the three or more property data items comprising the two or more property data items and one or more additional property data items;

aggregating the three or more property data items into the aggregate property marker, the aggregate property marker identifying a second location of the three or more real estate properties;

generating a second aggregate quadkey for the aggregate property marker, wherein the second aggregate quadkey is a second truncated portion of corresponding property quadkeys of the three or more property data items; and transmiting, to the user device, a second response to cause the user device to display, via the GUI, the aggregate property marker overlaid on the second map image based on the second aggregate quadkey and the second map quadkey.

17. The method of claim 15 further comprising:

receiving, from the user device, a third request to display a third map image via the GUI of the user device, the third request comprising a third indication of a third zoom level, the third map image being divided into a third plurality of map quadkeys;

filtering, using a third map quadkey of the third plurality of map quadkeys, the plurality of property data items to obtain a first property data item of the two or more property data items, the first property data item corresponding to a first real estate property of the two or more real estate properties;

filtering, using a fourth map quadkey of the third plurality of map quadkeys, the plurality of property data items to obtain a second property data item of the two or more property data items, the second property data item corresponding to a second real estate property of the two or more real estate properties;

de-aggregating the two or more property data items into a first property marker and a second property marker, the first property marker identifying a third location of the first real estate property and the second property marker identifying a fourth location of the second real estate property;

identifying a third property quadkey for the first property marker and a fourth property quadkey for the second property marker; and transmitting, to the user device, a third response to cause the user device to display, via the GUI, the first property marker and the second property marker overlaid on the third map image based on the third property quadkey, the fourth property quadkey, the third map quadkey, and the fourth map quadkey.

18. The method of claim 15 further comprising:
receiving, from the user device, a fourth request to display the map image via the GUI of the user device, the fourth request comprising an active occupant request;
accessing the data store to retrieve a plurality of buyer records and a plurality of property records;
matching the plurality of buyer records with the plurality of property records to generate, for each of the plurality of real estate properties, corresponding occupant data comprising a plurality of occupants and a corresponding event data for each of the occupants; and
identifying, for each of the plurality of real estate properties, a corresponding active occupant of the plurality of occupants that has the corresponding event date that is most recent; and
transmitting, to the user device a fourth response to cause the user device to display, via the GUI, a third indication of the corresponding active occupant for one or more of the plurality of real estate properties.

19. The method of claim 15, wherein:
the request further comprises a second indication of a region, wherein real estate properties are located in the region; and
the response is to cause the user device to display, via the GUI, one or more property markers overlaid on the map image based on corresponding property quadkeys and corresponding map quadkeys, the one or more property markers corresponding to a ranked list of potential sellers corresponding to two or more real estate properties of the real estate properties located in the region, the one or more property markers comprising the aggregate property marker.

* * * * *